United States Patent
Ng et al.

(10) Patent No.: US 12,367,467 B2
(45) Date of Patent: Jul. 22, 2025

(54) INTEGRATED INTERACTIVE ELEMENTS FOR MULTI-USER TRANSACTIONS

(71) Applicant: Block, Inc., Oakland, CA (US)

(72) Inventors: Claudia Ng, San Francisco, CA (US); Kyle Snavely, San Francisco, CA (US); Suegene Park, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/565,224

(22) Filed: Dec. 29, 2021

(65) Prior Publication Data

US 2023/0196319 A1    Jun. 22, 2023

Related U.S. Application Data

(60) Provisional application No. 63/291,716, filed on Dec. 20, 2021.

(51) Int. Cl.
*G06Q 20/12* (2012.01)
*G06Q 20/06* (2012.01)
(Continued)

(52) U.S. Cl.
CPC .......... *G06Q 20/12* (2013.01); *G06Q 20/065* (2013.01); *G06Q 20/102* (2013.01);
(Continued)

(58) Field of Classification Search
None
See application file for complete search history.

(56) References Cited

U.S. PATENT DOCUMENTS

| 5,844,572 A | 12/1998 | Schott |
| 5,991,749 A | 11/1999 | Morrill |

(Continued)

FOREIGN PATENT DOCUMENTS

| JP | 2005-182338 A | 7/2005 |
| KR | 10-2008-0053056 A | 6/2008 |

(Continued)

OTHER PUBLICATIONS

Gneezy, Uri, Ernan Haruvy, and Hadas Yafe. "The inefficiency of splitting the bill." The Economic Journal 114.495 (2004): 265-280. (Year: 2004).*

(Continued)

*Primary Examiner* — David P Sharvin
*Assistant Examiner* — Brock E Turk
(74) *Attorney, Agent, or Firm* — Polsinelli PC

(57) ABSTRACT

Technology related to processing multi-customer transactions is disclosed. In an example, an interactive element is generated for a transaction and an indication that a device of a first customer captured the interactive element is received. In response to receiving the indication, at least a portion of a listing of items associated with the transaction are presented via a user interface of the device of the first customer. A request to initiate a payment for one or more first items selected by the first customer from at least the portion of the listing of the items can be received and payment for an amount of the one or more first items using funds associated with an account of the first customer can be initiated, wherein a remaining balance associated with one or more remaining items associated with the transaction is payable by at least a second customer.

19 Claims, 21 Drawing Sheets

(51) Int. Cl.
*G06Q 20/10* (2012.01)
*G06Q 20/22* (2012.01)
*G06Q 20/32* (2012.01)

(52) U.S. Cl.
CPC ....... *G06Q 20/227* (2013.01); *G06Q 20/3224* (2013.01); *G06Q 20/3276* (2013.01)

(56) References Cited

U.S. PATENT DOCUMENTS

| | | | |
|---|---|---|---|
| 6,157,927 | A | 12/2000 | Schaefer et al. |
| 6,173,272 | B1 | 1/2001 | Thomas et al. |
| 6,513,018 | B1 | 1/2003 | Culhane |
| 6,847,942 | B1 | 1/2005 | Land et al. |
| 7,254,406 | B2 | 8/2007 | Beros et al. |
| 7,343,335 | B1 | 3/2008 | Olliphant |
| 7,376,587 | B1 | 5/2008 | Neofytides et al. |
| 7,383,226 | B2 | 6/2008 | Kight et al. |
| 7,606,734 | B2 | 10/2009 | Baig et al. |
| 7,620,404 | B2 | 11/2009 | Chesnais et al. |
| 7,668,766 | B1 | 2/2010 | Goodwin, III et al. |
| 8,010,601 | B2 | 8/2011 | Jennings et al. |
| 8,015,070 | B2 | 9/2011 | Sinha et al. |
| 8,020,763 | B1 | 9/2011 | Kowalchyk et al. |
| 8,055,564 | B2 | 11/2011 | Wehunt et al. |
| 8,065,190 | B2 | 11/2011 | Collas et al. |
| 8,090,616 | B2 | 1/2012 | Proctor, Jr. et al. |
| 8,090,656 | B2 | 1/2012 | Solomon et al. |
| 8,341,074 | B1 | 12/2012 | Reid |
| 8,385,964 | B2 | 2/2013 | Haney |
| 8,401,968 | B1 | 3/2013 | Schattauer et al. |
| 8,428,079 | B1 | 4/2013 | Lambert et al. |
| 8,498,900 | B1 | 7/2013 | Spirin et al. |
| 8,500,010 | B1 | 8/2013 | Marcus et al. |
| RE44,502 | E | 9/2013 | Boesch et al. |
| 8,615,445 | B2 | 12/2013 | Dorsey et al. |
| 8,655,837 | B2 | 2/2014 | Beckstrom et al. |
| 8,700,526 | B1 | 4/2014 | Cozens et al. |
| 9,092,776 | B2 | 7/2015 | Dessert |
| 9,092,828 | B2 | 7/2015 | Hosp |
| 9,264,850 | B1 | 2/2016 | Lee |
| 9,576,284 | B2 | 2/2017 | Runyan |
| 9,665,858 | B1 | 5/2017 | Kumar |
| 9,875,469 | B1 | 1/2018 | Chin et al. |
| 9,990,621 | B1 | 6/2018 | Ng et al. |
| 10,242,351 | B1 | 3/2019 | Wilson et al. |
| 10,410,184 | B2 | 9/2019 | Green et al. |
| 10,614,445 | B1 | 4/2020 | Dorsey et al. |
| 10,621,563 | B1 | 4/2020 | Spindel et al. |
| 10,636,019 | B1 * | 4/2020 | Abrons .............. G06Q 30/0207 |
| 10,902,416 | B1 | 1/2021 | Mcnamara et al. |
| 11,023,869 | B1 | 6/2021 | Kumar |
| 11,270,278 | B2 | 3/2022 | Kumar |
| 11,345,645 | B2 | 5/2022 | Koripelly et al. |
| 11,354,645 | B1 | 6/2022 | Dorsey et al. |
| 11,410,139 | B1 | 8/2022 | Spindel et al. |
| 11,829,964 | B2 | 11/2023 | Spindel et al. |
| 2002/0116331 | A1 | 8/2002 | Cataline et al. |
| 2002/0161630 | A1 | 10/2002 | Kern et al. |
| 2003/0028483 | A1 | 2/2003 | Sanders et al. |
| 2003/0045272 | A1 | 3/2003 | Burr |
| 2003/0115095 | A1 | 6/2003 | Yamauchi |
| 2003/0126076 | A1 | 7/2003 | Kwok et al. |
| 2004/0044616 | A1 | 3/2004 | Salter |
| 2004/0054592 | A1 | 3/2004 | Hernblad |
| 2004/0148252 | A1 | 7/2004 | Fleishman |
| 2004/0158494 | A1 | 8/2004 | Suthar |
| 2004/0230489 | A1 | 11/2004 | Goldthwaite et al. |
| 2004/0230526 | A1 | 11/2004 | Praisner |
| 2004/0248548 | A1 | 12/2004 | Niwa et al. |
| 2005/0165684 | A1 | 7/2005 | Jensen et al. |
| 2006/0064380 | A1 | 3/2006 | Zukerman |
| 2006/0106716 | A1 | 5/2006 | Hurwitz et al. |
| 2006/0111945 | A1 | 5/2006 | Tinsley et al. |
| 2006/0112006 | A1 | 5/2006 | Hurwitz et al. |
| 2006/0112007 | A1 | 5/2006 | Hurwitz et al. |
| 2006/0129484 | A1 | 6/2006 | Hurwitz et al. |
| 2006/0146839 | A1 | 7/2006 | Hurwitz et al. |
| 2006/0148532 | A1 | 7/2006 | Schnurr |
| 2006/0229984 | A1 | 10/2006 | Miyuki |
| 2006/0259358 | A1 | 11/2006 | Robinson et al. |
| 2006/0282660 | A1 | 12/2006 | Varghese et al. |
| 2006/0288367 | A1 | 12/2006 | Swix et al. |
| 2007/0078771 | A1 | 4/2007 | Allin et al. |
| 2007/0106558 | A1 | 5/2007 | Mitchell et al. |
| 2007/0124721 | A1 | 5/2007 | Cowing et al. |
| 2007/0174080 | A1 | 7/2007 | Outwater |
| 2007/0198382 | A1 | 8/2007 | Ferrari |
| 2007/0233615 | A1 | 10/2007 | Tumminaro |
| 2007/0244811 | A1 | 10/2007 | Tuminnaro |
| 2007/0255653 | A1 | 11/2007 | Tumminaro et al. |
| 2007/0265984 | A1 | 11/2007 | Santhana |
| 2008/0004989 | A1 | 1/2008 | Yi |
| 2008/0010190 | A1 | 1/2008 | Rackley et al. |
| 2008/0052176 | A1 | 2/2008 | Buchheit |
| 2008/0167980 | A1 | 7/2008 | Aaron et al. |
| 2008/0182591 | A1 | 7/2008 | Krikorian |
| 2008/0183619 | A1 | 7/2008 | Gould et al. |
| 2008/0201769 | A1 | 8/2008 | Finn |
| 2008/0320036 | A1 | 12/2008 | Winter |
| 2009/0006151 | A1 | 1/2009 | Zarghami et al. |
| 2009/0006398 | A1 | 1/2009 | Lam et al. |
| 2009/0024533 | A1 | 1/2009 | Fernandes et al. |
| 2009/0063353 | A1 | 3/2009 | Viidu et al. |
| 2009/0070263 | A1 | 3/2009 | Davis et al. |
| 2009/0099961 | A1 | 4/2009 | Ogilvy |
| 2009/0119190 | A1 | 5/2009 | Realini |
| 2009/0194584 | A1 | 8/2009 | Alexander et al. |
| 2009/0266884 | A1 | 10/2009 | Killian et al. |
| 2009/0288012 | A1 | 11/2009 | Hertel et al. |
| 2009/0299869 | A1 | 12/2009 | Cibanof |
| 2010/0010906 | A1 | 1/2010 | Grecia |
| 2010/0063893 | A1 | 3/2010 | Townsend |
| 2010/0069035 | A1 | 3/2010 | Johnson |
| 2010/0082481 | A1 | 4/2010 | Lin et al. |
| 2010/0121745 | A1 | 5/2010 | Teckchandani et al. |
| 2010/0280860 | A1 | 11/2010 | Iskold et al. |
| 2010/0312636 | A1 | 12/2010 | Coulter et al. |
| 2011/0029416 | A1 | 2/2011 | Greenspan |
| 2011/0071892 | A1 | 3/2011 | Dickelman |
| 2011/0078073 | A1 | 3/2011 | Annappindi |
| 2011/0106698 | A1 | 5/2011 | Isaacson et al. |
| 2011/0145049 | A1 | 6/2011 | Hertel et al. |
| 2011/0177802 | A1 | 7/2011 | Gupta |
| 2011/0178883 | A1 | 7/2011 | Granbery et al. |
| 2011/0231292 | A1 | 9/2011 | Mccown |
| 2011/0238514 | A1 | 9/2011 | Ramalingam et al. |
| 2011/0238517 | A1 | 9/2011 | Ramalingam et al. |
| 2011/0246284 | A1 | 10/2011 | Chaikin et al. |
| 2011/0251892 | A1 | 10/2011 | Laracey |
| 2011/0283188 | A1 | 11/2011 | Farrenkopf et al. |
| 2011/0307282 | A1 | 12/2011 | Camp et al. |
| 2011/0313871 | A1 | 12/2011 | Greenwood |
| 2011/0313880 | A1 | 12/2011 | Paul et al. |
| 2012/0024607 | A1 | 2/2012 | Swope et al. |
| 2012/0030091 | A1 | 2/2012 | Hu et al. |
| 2012/0036754 | A1 | 2/2012 | Van Bortel |
| 2012/0054100 | A1 | 3/2012 | Pfohl |
| 2012/0115512 | A1 | 5/2012 | Grainger et al. |
| 2012/0130790 | A1 | 5/2012 | Lyons et al. |
| 2012/0130895 | A1 | 5/2012 | Granbery et al. |
| 2012/0130903 | A1 | 5/2012 | Dorsey et al. |
| 2012/0136754 | A1 | 5/2012 | Underwood |
| 2012/0143753 | A1 | 6/2012 | Gonzalez et al. |
| 2012/0143772 | A1 | 6/2012 | Abadir |
| 2012/0150643 | A1 | 6/2012 | Wolfe et al. |
| 2012/0158553 | A1 | 6/2012 | Sudhidhanakul et al. |
| 2012/0166311 | A1 | 6/2012 | Dwight |
| 2012/0166332 | A1 | 6/2012 | Naaman |
| 2012/0173349 | A1 | 7/2012 | Buckley |
| 2012/0173396 | A1 | 7/2012 | Melby et al. |
| 2012/0185355 | A1 | 7/2012 | Kilroy |
| 2012/0197794 | A1 | 8/2012 | Grigg et al. |
| 2012/0209749 | A1 | 8/2012 | Hammad et al. |
| 2012/0214416 | A1 | 8/2012 | Kent et al. |

(56) References Cited

U.S. PATENT DOCUMENTS

| | | |
|---|---|---|
| 2012/0239417 A1 | 9/2012 | Pourfallah et al. |
| 2012/0246074 A1 | 9/2012 | Annamalai et al. |
| 2012/0265676 A1 | 10/2012 | Gould et al. |
| 2012/0271707 A1 | 10/2012 | Harrison et al. |
| 2012/0296726 A1 | 11/2012 | Dessert et al. |
| 2012/0303425 A1 | 11/2012 | Katzin et al. |
| 2013/0003089 A1 | 1/2013 | Morovic et al. |
| 2013/0005433 A1 | 1/2013 | Holch |
| 2013/0006853 A1 | 1/2013 | Amundsen |
| 2013/0019284 A1 | 1/2013 | Pacyga et al. |
| 2013/0030890 A1 | 1/2013 | Richardson |
| 2013/0041824 A1 | 2/2013 | Gupta |
| 2013/0054330 A1 | 2/2013 | O'Donnell et al. |
| 2013/0060623 A1 | 3/2013 | Walker et al. |
| 2013/0085931 A1 | 4/2013 | Runyan |
| 2013/0090959 A1 | 4/2013 | Kvamme et al. |
| 2013/0132274 A1 | 5/2013 | Henderson et al. |
| 2013/0144707 A1 | 6/2013 | Isaacson et al. |
| 2013/0159081 A1 | 6/2013 | Shastry et al. |
| 2013/0159173 A1 | 6/2013 | Sivaraman et al. |
| 2013/0166445 A1 | 6/2013 | Isaacson et al. |
| 2013/0173407 A1 | 7/2013 | Killian et al. |
| 2013/0173464 A1 | 7/2013 | Quillian |
| 2013/0179330 A1 | 7/2013 | Quillian |
| 2013/0181045 A1 | 7/2013 | Dessert et al. |
| 2013/0218721 A1 | 8/2013 | Borhan et al. |
| 2013/0246220 A1 | 9/2013 | Hammad et al. |
| 2013/0246258 A1 | 9/2013 | Dessert |
| 2013/0254002 A1 | 9/2013 | Isaacson et al. |
| 2013/0290040 A1 | 10/2013 | Perry et al. |
| 2013/0317835 A1 | 11/2013 | Mathew |
| 2013/0317893 A1 | 11/2013 | Nelson et al. |
| 2013/0325663 A1 | 12/2013 | Scipioni et al. |
| 2013/0332354 A1 | 12/2013 | Rhee et al. |
| 2013/0339253 A1 | 12/2013 | Sincai |
| 2014/0006205 A1 | 1/2014 | Berry et al. |
| 2014/0032297 A1 | 1/2014 | Germann et al. |
| 2014/0052617 A1 | 2/2014 | Chawla et al. |
| 2014/0067557 A1 | 3/2014 | Willem et al. |
| 2014/0074569 A1 | 3/2014 | Francis et al. |
| 2014/0074658 A1 | 3/2014 | Sanchez |
| 2014/0074691 A1 | 3/2014 | Bank et al. |
| 2014/0081783 A1 | 3/2014 | Paranjape et al. |
| 2014/0089073 A1 | 3/2014 | Jacobs et al. |
| 2014/0089078 A1 | 3/2014 | Dessert et al. |
| 2014/0089135 A1 | 3/2014 | Linh et al. |
| 2014/0114775 A1 | 3/2014 | Cloin et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0129942 A1 | 5/2014 | Rathod |
| 2014/0136349 A1 | 5/2014 | Dave et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0172704 A1 | 6/2014 | Atagun et al. |
| 2014/0172727 A1 | 6/2014 | Abhyanker et al. |
| 2014/0180929 A1 | 6/2014 | Ohnishi et al. |
| 2014/0201067 A1 | 7/2014 | Lai et al. |
| 2014/0214652 A1 | 7/2014 | Zheng et al. |
| 2014/0222663 A1 | 8/2014 | Park et al. |
| 2014/0250002 A1 | 9/2014 | Isaacson et al. |
| 2014/0279098 A1 | 9/2014 | Ham |
| 2014/0351130 A1 | 11/2014 | Cheek et al. |
| 2015/0012388 A1 | 1/2015 | Kim et al. |
| 2015/0012426 A1 | 1/2015 | Purves et al. |
| 2015/0032567 A1 | 1/2015 | Bhatia |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0120418 A1 | 4/2015 | Cervenka et al. |
| 2015/0134528 A1 | 5/2015 | Fineman et al. |
| 2015/0149350 A1 | 5/2015 | Ananda Kumar et al. |
| 2015/0178755 A1 | 6/2015 | Barroso |
| 2015/0178835 A1 | 6/2015 | Quillian |
| 2015/0194023 A1 | 7/2015 | Brackenridge et al. |
| 2015/0278830 A1 | 10/2015 | Zamer et al. |
| 2015/0287006 A1 | 10/2015 | Hunter et al. |
| 2015/0339655 A1 | 11/2015 | Basheerahammed et al. |
| 2015/0348003 A1 | 12/2015 | Reader |
| 2016/0321663 A1 | 11/2016 | Batlle |
| 2017/0116608 A1 | 4/2017 | Forzley et al. |
| 2018/0349871 A1 | 12/2018 | Moshal |
| 2019/0034888 A1 | 1/2019 | Grassadonia et al. |
| 2019/0340586 A1 | 11/2019 | Sheng et al. |
| 2020/0005270 A1* | 1/2020 | Griffith .................. G06Q 20/20 |
| 2020/0160296 A1* | 5/2020 | Park .................. G06Q 20/3223 |
| 2020/0342429 A1 | 10/2020 | Lamba et al. |
| 2021/0056627 A1 | 2/2021 | Lee |
| 2021/0142302 A1 | 5/2021 | Anderson et al. |
| 2021/0182805 A1 | 6/2021 | Benkreira et al. |
| 2021/0241384 A1 | 8/2021 | Dal et al. |
| 2022/0156707 A1 | 5/2022 | Kumar |
| 2022/0222651 A1 | 7/2022 | Dorsey et al. |
| 2022/0292472 A1 | 9/2022 | Spindel et al. |
| 2023/0186285 A1 | 6/2023 | Mawson et al. |

FOREIGN PATENT DOCUMENTS

| | | |
|---|---|---|
| WO | 2011/153281 A2 | 12/2011 |
| WO | 2023/101768 A1 | 6/2023 |
| WO | 2023/121756 A1 | 6/2023 |

OTHER PUBLICATIONS https://apps.apple.com/us/app/tab-the-simple-bill-splitter/id595068606, Nov. 20, 2021 (Tab) (Year: 2021).*

De Artola, Andres, Jordan Buschman, and Ashley Sehatti. "OmniSplit: a mobile food ordering platform for restaurant staff and patrons." (2015). (Year: 2015).*

"Divvy makes splitting the check as easy as snap, drag, and pay," Divvy App Website, published May 11, 2013, Retrieved from Internet URL: http://web.archive.org/web/20130511015727/http://divvythatup.com/, on Sep. 6, 2017, pp. 1-2.

"Tab: A Seriously Useful Bill-Splitting App," The Huffington Post, published Aug. 27, 2013, Retrieved from Internet URL: http://www.huffingtonpost.com/2013/08/27 /bill-splitting-app-tab_n_3818225. html>, on Sep. 6, 2017, pp. 1-2.

"White Paper Near Field Communication" Nokia, 2007, pp. 1-8.

"Billr: Bill Splitting at the Table," Billr, iTunes Preview, Retrieved from the internet URL: https://itunes.apple.com/us/app/billr-bill-splitting-attable/id501889312?ls=l&mt=8, on Nov. 4, 2014, pp. 1-2.

"Divvy on the App Store on iTunes," iTunes, Helix Interactive, Retrieved from the internet URL: https://itunes.apple.com/us/app/divvy/id560503890?1s= 1 &mt=8, on Nov. 4, 2014, pp. 1-2.

"Sharing bills & expenses?," WeSplit.It., Retrieved from the internet URL : https://wesplit.it/, on Nov. 4, 2014, pp. 1-2.

"Split bills, share rent & expenses for your sharehouse or holiday, The best way to split bills," dapShare, Retrieved from the internet: URL<http://dapshare.com/, on Nov. 4, 2014, pp. 1-2.

"Split expenses with friends," Splitwise, Retrieved from the internet URL: https://www.splitwise.com/, on Nov. 4, 2014, pp. 1-2.

"Splitabill," Funkbit AS, iTunes Preview, dated Oct. 15, 2012, Retrieved from the internet URL: https://itunes.apple.com/us/app/splitabill/id485048203, on Nov. 4, 2014, pp. 1-2.

"splitabill.com: Take a tour," Splitabill, Retrieved from the internet URL: https://splitabill.com/tour/, on Nov. 4, 2014, pp. 1-2.

"Splitwise," Google Play, dated Oct. 15, 2014, Retrieved from the internet URL: ttps://play.google.com/store/aoos/details?id=com.Splitwise.SplitwiseMobile, on Nov. 4, 2014, pp. 1-2.

"The quickest way to split a bill and calculate the tip at restaurants and bars," Billr.me, Retrieved from the Internet URL: http://billr.me/, on Oct. 29, 2015, pp. 1-4.

"What is Divvy?," Divvy That Up, dated Sep. 17, 2013, Retrieved from the internet URL: http://www.divvythatup.com/, on Nov. 4, 2014, pp. 1-5.

Dodd, A., "dapShare Mobile—Andriod Apps on Google Play," dated Nov. 23, 2011, Retrieved from the internet URL: https://play.google.com/store/apps/details?id=com.dapshare&h1=en, on Nov. 4, 2014, pp. 1-2.

(56) References Cited

OTHER PUBLICATIONS

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

International Search Report and Written Opinion for International Patent Application No. PCT/US2022/047445, mailed on Jan. 31, 2023.

"Adyen Announces European Availability of Chip & PIN Mobile Point-of-Sale Solution," Business Wire, dated Dec. 3, 2012, retrieved from: https://www.businesswire.com/news/home/20121203005476/en/Adyen-Announces-European-Availability-Chip-PIN-Mobile, pp. 1-4.

"MeDeploy Launches a New Approach to Digital Pay-Media Distribution at DEMOfall 08", Science Letter, published on Sep. 23, 2008, pp. 1-2.

Nagasubramanian et al., "Online Payment—Innovation in Split Tender Payment", International Journal of Computer Applications, vol. 55, No. 10, Oct. 2012, pp. 35-41.

"Manage housemate expenses with Conmigo for Android | How To—CNET", May 21, 2012, pp. 1-12.

Ho A., "No. more deadbeat friends: PayDivvy launches social bill service | VentureBeat", Year 2011, 5 pages.

\* cited by examiner

INTEGRATED INTERACTIVE ELEMENTS FOR MULTI-USER TRANSACTIONS

PRIORITY

This application claims the benefit of U.S. Provisional Patent Application No. 63/291,716, filed Dec. 20, 2021, the entire contents of which are incorporated by reference herein.

TECHNICAL FIELD

Apportioning a payment for a transaction involves coordination between a merchant and multiple customers involved in the transaction. At a restaurant, a server brings a bill to the customers, and the customers provide the server with multiple payment instruments (e.g., credit cards or transaction cards), which often require customer signatures. Allocating the amounts owed by the customers requires manually calculating individual customer's contribution to the total cost or manually mapping items ordered by an individual customer to their respective payment instrument. In some instances, customers write down the amounts owed by an individual customer on the back of the bill or instruct the server to charge specific amounts to the payment instruments. Other times, customers have to instruct the server to apportion the bill according to certain percentages or specific items purchased by an individual customer.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and do not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
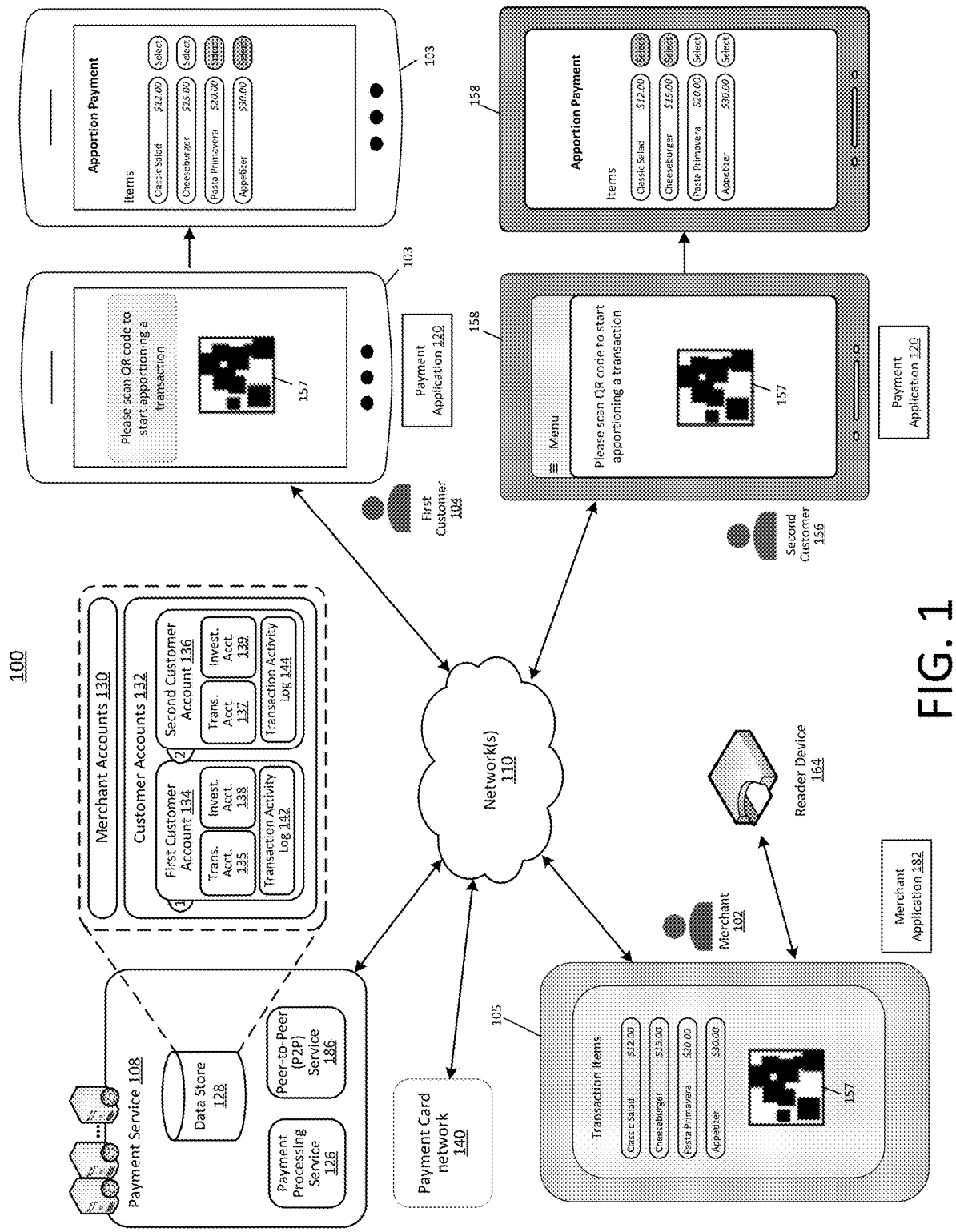
FIG. 1 is a schematic diagram of a payment service network according to one example described herein.

Techniques described herein relate to a service capable of automatically and intelligently apportioning items in a transaction between or among customers (alternatively referred to herein as "users") via detected interactions with interactive elements. Specifically, a service (e.g., a payment service, a music streaming service, a social networking service, etc.) described herein can leverage a network of connected computing devices to track transaction data of users of the payment service. The payment service can generate interactive elements to enable customers to apportion payment and conduct contactless payments for transactions. In an example, an interactive element can be a quick response (QR) code, a barcode, or the like that can be presented in association with a record of a transaction. In some examples, the record can be an order, a bill (e.g., a request for payment), a receipt (e.g., proof of payment), or a user interface presented via a computing device, such as a customer device or a merchant device. Capturing or scanning the interactive element can cause a listing of items associated with the transaction, or a portion thereof, to be presented to one or more customers via respective instances of a user interface presented via respective customer devices. A first customer can select one or more items from the listing of items, or portion thereof, and can authorize payment for the selected items. Funds from an account of the first customer can be used to process the payment automatically, without further input from the first customer. One or more other customers can similarly select items from the listing of items, or respective portions thereof, and can authorize payment for such items. In some examples, the customers can collaborate on apportioning items in the listing of items, with an individual customer being able to see the other customers' item selections in real time. In some examples, the payment service can utilize context data to selectively present listings of items, or portions thereof, for one or more of the customers. As such, techniques described herein offer improvements to existing payment technologies.

In conventional technologies, there are technical problems associated with integrating merchant and customer experiences to facilitate the apportioning of items in a transaction among or between customers. That is, conventional technologies lack the ability for merchant devices and customer devices to communicate and exchange data. As such, when multiple customers receive a bill (e.g., a request for payment) for items that they obtained from a merchant, there are no technical means to enable the customers or merchant to apportion payments according to the items individual of the customers obtained. Existing techniques for apportioning payments can involve considerable messaging and data exchanges among the customers and their associated customer devices. For example, the customers may be forced to track items to be purchased and then exchange messages with one another to determine appropriate reimbursements after the transaction has taken place. Alternatively, a merchant may be forced to track individual customers' purchases and then provide the customers with multiple bills (e.g., invoices) for the purchased items. In such examples, the merchant may process multiple payments for the multiple bills, which often can necessitate the use of multiple payment instruments, multiple authorizations, and the like.

In one implementation, a customer through their customer device can interact with an interactive element (e.g., QR code, barcode, or other transaction code) generated by a merchant device or a payment service in response to one or more payment transactions. The interactive element can be associated with a transaction involving one or more customers and a merchant. On interacting with the interactive element, the customer device presents a listing of items relevant to the customer interacting with the interactive element. At this time, the customer can either select items they want to pay for (e.g., from a full or partial listing of items associated with the transaction) or accept recommended item(s), as determined by the merchant device or payment service, that the customer is liable for. Once the customer authorizes the item(s) for payment, the customer device can present a user interface customized with payment information, including the customer's payment identifier and apportioned payment based on the approved items. This process is repeated for each of the customers of a transaction until a total payment amount of the transaction is distributed among customers. If a customer fails to pay for their portion of the transaction, or there are unclaimed items, the merchant device or payment service can automatically and predictively assign the leftover amount to one or all customer devices, for example, retroactively.

The systems and methods described herein greatly streamline processes for apportioning payments by enabling merchant devices and customer devices to exchange data via a payment service. As such techniques described herein, allow customers to use their computing devices to collaborate on payment through use of interactive elements presented on bills, receipts, or graphical user interfaces on computing devices, such as merchant devices or customer devices. Such techniques can significantly reduce data transmissions by allowing individual customers to claim individual items associated with a transaction and make a desired payment in association with such claimed items, for example, via individual instances of payment applications executing on individual user devices. In some examples, such payments can be made from within an instance of the payment application and without using conventional payment rails. In some examples, customers can allocate individual items to other customers such that individual customers are responsible for paying for the item(s) allocated to them. Instead of traditional methods that involve messaging and data exchanges in which the customers reimburse one another, systems and methods disclosed herein reduce network congestion, network calls, or bandwidth associated with reimbursement requests. Furthermore, by moving the allocation of items and, in some examples, payment to individual customer devices instead of the merchant device, techniques described herein eliminate, or substantially reduce, the need for merchants to generate and process multiple payments per transaction. This too, reduces network congestion, network calls, and bandwidth associated with processing multiple payments per transaction. Fewer messages and transactions can also reduce memory requirements, given that there are fewer messages and transactions to process and store. Moreover, by calculating amounts of payments for individual customers based on allocations of ordered or purchased items, techniques described herein relieve customers and merchants from having to perform error-prone math calculations (e.g., including tips or tax) and generally increases the accuracy and efficiency of payments.

Advantageously, techniques described herein can enable customers to "scan to pay," by using their computing devices to interact with an interactive element such as a QR code, barcode, radio frequency identification (RFID) tag, or other transaction code, encoded with data as described herein, to apportion items of transactions and, in some examples, to make contactless payments for transactions. In some examples, an interactive element can be generated for a transaction. That is, a payment service can generate an interactive element having information embedded therein. The interactive element may have embedded therein at least a subset of transaction data associated with the transaction, such as the transaction ID, items ordered/to be purchased with the transaction, the time of the transaction, etc. The information embedded in the interactive element can be editable or non-editable. That is, in some examples, an interactive element can be static, wherein the information embedded therein does not change and is not editable. In some examples, an interactive element can be dynamic, wherein the information embedded therein can change and may be editable. The use of interactive elements, as described herein, can provide a technical means to facilitate communication between merchant and customer devices in a payment ecosystem.

In an example, when multiple customers are purchasing items from a merchant in association with a transaction, an individual from the customers can scan, or otherwise capture, an interactive element associated with the transaction using a sensor, such as a camera, associated with his or her computing device. The scanning or other capturing of the interactive element can cause a listing of items to be presented on the customer's device such that the customer can choose which items to pay for or how to pay. In some examples, the sensor can be integrated into or accessed by an application executing on the computing device of the customer and the listing can be presented via a user interface presented by the application. In some examples, the sensor can be a native device and the listing can be presented via a user interface presented by the application, a web browser, an instant application (e.g., a portion of the full application), a progressive web application, or the like. This "scan to pay" technique enables customers to apportion items in a transaction and conduct contactless payments using their own computing devices, thereby offering an improvement over existing payment technologies.

Techniques described herein can utilize interactive elements, and interactions therewith, to improve conventional processes for apportioning payments between customers by securely and discretely sharing customer data and transaction data using a secure wireless communication protocol embedded in the customer devices. For example, in existing techniques, when a payment for a transaction is processed at a merchant device, sensitive credit card information for multiple customers may be exposed to the merchant. The merchant may also print some amount of personal information on receipts for the customers, and this can result in an undesirable leak of such information. Advantageously, techniques described herein can protect customers from such threats. Techniques described herein relate to secure data transfer using a convenient, localized, and secured method (e.g., NFC, Bluetooth, or other wireless technologies) that facilitates a transfer of customer data without the customer data being publicly exposed. For example, techniques described herein enable a customer to submit a selection of item(s) to be purchased or a payment directly to the trusted payment service, e.g., via an application securely installed on a customer device associated with the customer or based on user authorization and authentication. The payment service may then communicate with the merchant device to process the received selection or payment. As such, customer data may not be provided to the merchant at any point during the transaction. Therefore, the risk of public exposure of customer data is reduced, and the security and privacy of such payments are increased.

Techniques described herein utilize machine learning mechanisms to personalize or customize item listings as described herein. In some examples, a listing of items presented via a user interface in response to an interaction with an interactive element can include some or all of the items associated with a transaction. That is, the listing of items can include items associated with all customers of a transaction or a subset of all items associated with the transaction, which can be associated with individual customers associated with the transaction. The listing of items can be retrieved from the transaction data embedded in the interactive element or from a database storing such item data, using the transaction ID of the transaction mapped to the interactive element. In examples where less than all items associated with a transaction are presented as the listing of items (i.e., a subset of the items is presented), the subset of items can be selected based at least in part on context data associated with an interaction with the interactive element. Such context data can include prior transaction data associated with the customer(s) or other users of the payment service, customer preference(s), geographic data, computing device data, application data, time of day, date, calendar data, or the like.

In examples where context data is used to determine a subset of items to present via a listing of items, one or more models, trained via one or more machine learning mechanisms, can be used to determine the subset of items. That is, in some examples, the payment service can leverage context data and one or more machine learning models to intelligently determine which item(s) a particular customer is likely to be associated with and can cause such item(s) to be presented via the user interface for selection, or confirmation, by the customer. For instance, a model can be trained, using a machine learning mechanism, to determine particular item(s) for a particular customer. Training data used to train the model can include, for example, prior transaction history for one or more customers, prior item selections by one or more customers, preference data, location data, transaction time, data defining relationships between customers, etc. The model can be retrained or refined, as needed, with updated training data such as, for example, new item selections, user reactions to payment apportionments, additional transaction data, etc. The model can be a logic regression model, a support vector machine, a neural network model, a classifier, or other type of machine learning model.

By associating the items with respective customers as described above, more relevant suggestions for items associated with the respective customers can be presented for the customers. Using transaction data associated with the transaction, the merchant device or payment service can determine a cost of the item(s) selected by each customer and initiate or complete a payment based on the determined cost with little or no input from the customer. That is, in some examples, the merchant device or payment service can automatically process payment for the selected items with minimal friction. This reduces the user and system processing time and improves system performance. For example, a user can claim items suggested for allocation to them and pay for such claimed items in a single interaction with a user interface. This offers an improvement over existing payment technologies.

Techniques described herein offer improved user interfaces for reducing user interactions with computing devices. As described above, the "scan to pay" functionality described herein enables a customer to select or confirm items for payment and to perform a contactless payment via a minimum number of interactions with their customer device. In some examples, item selections from individual customers who are apportioning items associated with a transaction can be presented via respective instances of the user interface in real time, such that an individual customer can see what the other customers have chosen to pay for in real time. In some examples, device synchronization or real time collaboration techniques can be utilized by the payment service to facilitate such real time updates and collaboration. That is, techniques described herein can utilize real time collaboration techniques wherein the payment service can perform automatic, periodic, nearly instantaneous synchronization of edits or inputs of individual customers associated with a transaction and can push such edits or inputs to respective instances of the payment application executing on customer devices of each of the customers. This can mitigate conflicts and can enable the customers to collaborate on the apportioning process in real time. For example, the techniques can provide context for the customer to adjust his or her item selections in response to selections made by the other customers.

In some examples, items identified as being associated with a particular customer can be flagged for the customer in a complete, or more comprehensive, listing of the items associated with the transaction. A listing of items presented to the customer can include, for example, annotations or markings that identify one or more items as having been selected for payment by one or more other customers. In some examples, machine learning models can be used to determine which item(s) are likely to be associated with individual customers of a transaction, as described above, and can provide actionable recommendations to enable individual customers to "claim" or otherwise apportion such item(s). The techniques described herein can update payment apportioning and payment information in real-time, such that customers can collaborate and more quickly and easily reach agreement on how a payment should be apportioned. Techniques described herein not only improve the apportioning process from the customer's perspective (e.g., an indication/flag of another customer's selection may facilitate collaboration), but the techniques also improve network and processor efficiency by reducing the amount of data transferred or communications among the users or other system components to achieve the apportionment.

The techniques described herein can be applied to a wide variety of online and offline transactions that may or may not involve a merchant. While much of the present disclosure relates to the context of merchants and customers, it is understood that the techniques are applicable to transactions that involve a wide variety of payees and payors, which may or may not include a merchant or a customer, an artist and a listener, or the like. The terms "customer" and "merchant," as used herein, are therefore understood to represent a variety of other types of payors and payees. Furthermore, while the description references a customer being able to pay the merchant through merchant- or payment service-generated codes, in additional or alternative examples, the "scan-to-pay" method described herein may refer to, for example, a process of generating an interactive element on a customer device, and a merchant device reading information in the interactive element using a sensor device, and sending the information to the payment service to initiate a payment.

Furthermore, to the extent reference is made herein to apportioning items between or among customers associated with a transaction to allocate payment between or among such customers, techniques described herein can be similarly applicable to apportioning items between or among customers to facilitate fulfillment or shipping. For example, a first set of one or more items allocated to a first customer can be shipped to a first location and a second set of one or more items allocated to a second customer can be shipped to a second location. As another example, items associated with a transaction can be apportioned to accommodate different fulfillment methods, such as delivery or pick-up. As yet another example, items associated with a transaction can be apportioned to indicate which user account such items are to be associated with. As an example, if a transaction includes multiple non-fungible tokens (NFTs) or content items, individual users associated with the transaction can indicate which NFTs or content items to associate with each of their user accounts. As such, some techniques described herein are not limited to apportioning payment.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

FIG. 1 is a schematic diagram of a payment service network 100 in accordance with certain examples. In one embodiment, the payment service network 100 can monitor and process transactions occurring among or between merchants and customers (or other payees and payors) and can enable costs for a transaction to be apportioned among multiple customers associated with the transaction. In the depicted example, the payment service network 100 includes a payment service 108 connected via a network 110 (e.g., including the Internet) to a merchant device 105 of a merchant 102, a first customer device 103 of a first customer 104, a second customer device 158 of a second customer 156, and a payment card network 140. While illustrated as having a single merchant and two customers, the payment service network 100 can include any number of merchants, customers, or other users.

In at least one example, merchant 102 may be any business engaged in the offering of goods or services for acquisition by customers. Actions attributed to merchant 102 may include actions performed by owners, employees, website servers, or other agents of the merchant, and thus no distinction is made herein unless specifically discussed. In various examples, merchant 102 may utilize merchant device 105 for accepting payment from customers such as the first customer 104 or second customer 156.

Merchant device 105 may be any computing device that includes an instance of a merchant application 182 that executes on the merchant device 105. In some examples, the merchant device 105 can be a mobile device or a stationary device. For brick-and-mortar stores, for example, the merchant device 105 may be in a fixed location that does not change on a day-to-day basis. Alternatively, the location of merchant device 105 may change from time to time, such as when the merchant operates a food truck, is a street vendor, is a cab driver, or otherwise has a mobile business. The merchant device 105 can be a hand-held device that allows, for example, a waiter to bring the merchant device 105 to a table in a restaurant.

An instance of the merchant application 182 may be or include a downloadable application provided by the payment service 108, or embedded software running on an all-in-one merchant device 105 provided by the payment service 108. The merchant application 182 may be provided by the payment service 108 and provide functionality to merchant device 105 to perform a variety of tasks, including, for example, generating or receiving transaction data, generating or storing tickets or orders, generating or presenting interactive elements (e.g., QR code 157), receiving payment data from a payment instrument or payment application 120, initiating or processing payments associated with transactions, receiving indications that payments for transactions are complete, or any combination thereof. In some examples, such a merchant application 182 can be a "point-of-sale" application to facilitate transactions at points of sale.

Merchant 102 can interact with customers, such as first customer 104 and second customer 156. A customer may include any entity that acquires goods or services from a merchant, such as by purchasing, renting, leasing, borrowing, licensing, or the like. Thus, in an example, merchant 102 and at least first customer 104 may interact with each other to conduct a transaction in which at least first customer 104 acquires one or more items from merchant 102 and, in return, at least first customer 104 provides a payment to merchant 102. In some examples, first customer 104 and second customer 156 can both be parties to the transaction.

As used herein, a transaction may include a transaction for an exchange of items between at least one customer, such as first customer 104 or second customer 156, and merchant 102. For example, when paying for a transaction, a customer, such as first customer 104 or second customer 156, can provide the amount that is due to merchant 102 using cash or other payment instrument (e.g., a debit card, a credit card, a stored-value or gift card, a check, through an electronic payment application on a customer device carried by the customer, or the like). The merchant 102 can interact with merchant device 105 to process the transaction, such as by inputting (e.g., manually, via a magnetic card reader, NFC reader, or an RFID reader, etc.) one or more identifiers associated with a payment instrument. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, or Visa (EMV) standard (e.g., EMV cards). In other examples, other types of payment instruments can include cards or devices that communicate via radio frequencies such as radio frequency identification tags, near field communication devices, etc. In some examples, the payment instrument can be a payment identifier in a particular syntax or format, e.g., username prefixed by alphanumeric characters (e.g., currency indicator), which is associated with a financial account. Such a payment identifier is sufficient, in and of itself, to initiate or complete a transaction without the customer providing additional payment information. That is, the payment identifier can be provided in lieu of payment data.

During the transaction, merchant device 105, via the merchant application 182, can determine transaction data describing the transaction, including but not limited to, a transaction identifier (id), a merchant identifier, a merchant category class, item(s) to be purchased, a price for each item, an identification of a coupon or discount being used, a total cost, a time when the item(s) was purchased, a store (online store or physical store) where the item(s) was purchased, an identifier of a payment instrument (e.g., payment card number, account credentials, or other payment device identifier), a time, location (e.g., street address, GPS coordinates, IP address, etc.) and date of the transaction, the payment card network 140 associated with the payment instrument, an issuing bank of the payment instrument, a name or account of the customer, contact information of the customer, type of currency, IP address of merchant device 105, IP address of customer device, combinations of the foregoing, and so forth. Merchant device 105 can send the transaction data to payment service 108 over network 110 (e.g., including the Internet), either substantially contemporaneously with the conducting of the transaction (in the case of online transactions) or later when merchant device 105 is in the online mode (in the case of offline transactions).

In an offline transaction, merchant device 105 may store data related to the transaction, including, but not limited to, a cost of the transaction, a time of day at which the transaction occurred, a day of the week at which the transaction occurred, a location at which the transaction took place, an item that the customer obtained, an identity or contact information of the customer, and a payment instrument used in the transaction. After conducting an offline transaction with a customer, merchant device 105 may provide at least a subset of the stored data to the payment service 108 over the network 110. The network 110 may represent any one or more wired or wireless networks, such as a Wi-Fi network, a cellular network, or the like. In an online transaction, merchant device 105 may send this data to payment service 108 over network 110 substantially contemporaneously with the transaction with customer 104. After merchant 102 receives the payment information from customer 104, merchant 102 (e.g., using merchant device 105) may send one or more authorization requests, along with information related to the transaction, to payment service 108.

In at least one example, the payment service 108 may include payment processing service 126, a peer-to-peer (P2P) service 186, and data store 128. In at least one example, the payment service 108 can perform a variety of tasks, including, for example, receiving and storing transaction data, receiving payment data, processing payments using transaction data and payment data, or the like. In some examples, transaction data can be stored in a data structure particular to a transaction. The payment service 108 can monitor or track transaction data using applications, such as merchant application 182 and payment application 120. Such monitoring and tracking can enable the payment service 108 to update data structures associated with transactions in real time or near real time. In some examples, the payment service 108 can receive or generate interactive elements for transactions, generate listings of the items associated with transactions, cause the listing, or portions thereof, to be presented via user interfaces, receive customer selections of items for payment, synchronizing a display of selected items among devices, processing payments in response to the customer selections, or any combination thereof. Additional operations that can be performed by the payment service 108 are described herein.

The payment processing service 126 may function to receive information regarding a transaction from merchant device 105 of merchant 102 and attempt to authorize the payment instrument, or other payment data, used to conduct the transaction. Payment processing service 126 may then send an indication of whether the payment instrument has been approved or declined back to merchant device 105. In some examples, when a customer 104 and a merchant 102 enter into a transaction, the transaction is processed by electronically transferring funds from a financial account associated with the customer 104 to a financial account associated with the merchant 102. As such, the payment processing service 126 may communicate with one or more computing devices of a payment card network 140 (e.g., MasterCard® or VISA®) over network(s) 110 to conduct financial transactions electronically. Payment processing service 126 can also communicate with one or more computing devices of one or more banks, processing/acquiring services, or the like over the network 110. For example, payment processing service 126 may communicate with an acquiring bank, an issuing bank, or a bank maintaining customer accounts for electronic payments. Payment processing service 126 may also communicate with, or access user and merchant accounts maintained by payment service 108. In some examples, the payment processing service 126 can communicate with one or more entities that perform or manage securities transactions or cryptocurrency transactions.

The payment service 108 may also include a P2P service 186, as described above. Integration of P2P service 186 in the payment service 108 can enable one or more customers or users to engage in transactions with one another. For example, P2P service 186 can allow one user to send funds to another user (e.g., as a gift or for reimbursement). Such peer-to-peer transactions may or may not involve a merchant. In some examples, P2P service 186 or payment processing service 126 can be provided by a third party or can be communicatively coupled to payment service 108 to provide the integrative functionality described herein. Additional details associated with the P2P service 186 are provided below.

Techniques described herein are described as being performed by the payment service 108. In some examples, one or more operations can be performed by the payment processing service 126. In some examples, one or more operations can be performed by the P2P service 186. In some examples, one or more operations can be performed by the payment processing service 126 and the P2P service 186. That is, operations as described herein can be performed by a single service or a combination of services. In some examples, the payment processing service 126 and P2P service 186 can be integrated via one or more application programming interface(s) (API(s)), software developer kit(s) (SDK(s)), or the like.

According to one example, data store 128 may be used to store merchant accounts 130 and customer accounts 132, among other data. Customer accounts 132 may store records of customer accounts associated with each user of payment service 108. For example, customer accounts 132 may include a first customer account 134 and a second customer account 136, which can be associated with the first customer 104 and the second customer 156, respectively. Each of the accounts of customer accounts 132 may include information related to the respective balance and transaction history associated with each customer account. Each of the accounts of customer accounts 132 may include one or more balances associated with a payment service and further include access to external bank accounts. For example, first customer account 134 includes transaction account 135 and investment account 138. As a further example, second customer account 136 includes transaction account 137 and investment account 139. According to one example, transaction accounts 135 and 137 may include stored balances maintained by payment service 108 on behalf of its users (e.g., the first customer 104 and the second customer 156, respectively). Investment accounts 138 and 139 may be used by users to save a stored balance towards a particular goal or otherwise to allow payment service 108 to maintain an investment on behalf of its users. Each customer account 134 and 136 of customer accounts 132 may also include a loan account representing funds that are loaned to the user by the payment service 108. Each customer account 134 and 136 of customer accounts 132 may further include access to external payment card networks (e.g., payment card network 140) to facilitate transactions with credit cards, debit cards, and the like.

Furthermore, transaction history for each customer account may be stored using an individual log for each customer account. For example, first customer account 134 includes transaction activity log 142 and second customer account 136 includes transaction activity log 144. Transaction activity logs 142 and 144 may be used to store transaction history for each respective customer account, including debits and credits made to the balances thereof. Such transaction histories can be used to generate customized lists of transaction items for users, as described herein. Similarly, transaction histories for merchants may be stored in merchant accounts 130 using an individual log for each merchant.

According to one example, each of the accounts of customer accounts 132 may include stored values of multiple currencies, such as fiat currency, cryptocurrency, equity value, or other monetary value represented by digital assets. Each of the currencies may be stored directly in each account of customer accounts 132 or in a centralized wallet managed by the payment service 108. Each of the accounts of customer accounts 132 may further include access to external accounts that facilitate such currencies (e.g., third party cryptocurrency exchanges/wallets, equity holding accounts, etc.). In some examples, customer accounts 132 can include purchased content, NFTs, or other assets.

According to one example, merchant accounts 130 may store data associated with respective ones of merchants 102. For instance, merchant accounts 130 may indicate a class of items offered by respective merchants (e.g., coffee items, collectibles, apparel, etc.), a type of business of the merchant (e.g., restaurant, coffee shop, retail store, etc.), a geographical location of the merchant, and the like. In some examples, merchant accounts 130 can include transaction data, order data, inventory data, reservation data, appointment data, or the like.

The payment service 108 can provide applications to facilitate functionality as described herein. In an example, each customer device can have an instance of a payment application 120, which can include, but is not limited to, a mobile wallet application, a peer-to-peer payment application, a customer-facing banking application, a loyalty-tracking application, etc., provided by the payment service 108. In an example, payment service 108 may map an identification of the instance of payment application 120 to a customer account of the customer accounts 132. Payment service 108 may communicate with payment application 120 executing on customer device 103 or customer device 158 to monitor and track transactions, store transaction data in association with transaction records/data structures, generate interactive elements (e.g., QR codes), process user interactions with the interactive elements, and facilitate collaboration among customers during a payment apportionment process. Examples of payment apportionment processes are described in further detail with reference to FIGS. 3-7.

In some examples, an interactive element can be generated for a transaction. In some examples, the interactive element can be generated or received by the payment service 108, the merchant application 182, or the like. The interactive element can be or include, for example, a QR code, a barcode, an RFID tag, or other symbol or code used to identify the transaction (e.g., a transaction code). For simplicity, the interactive element may be referred to herein as a QR code, though it is understood that other types of interactive elements can be used. In at least one example, the interactive element can be presented on or in association with a record of a transaction, such as a bill, receipt, an order, a user interface of the merchant device 105, a user interface of the customer device 103 or 158, or the like.

In at least one example, the interactive element can be specific to a transaction and is generated to provide transaction details, location details, customer details, or the like to individual customer devices (e.g., customer device 103 of customer 104) to facilitate payment apportioning, and in some examples, contactless payments. In one example, the interactive element can be encoded with data that causes a listing of items to be presented via a user device that interacted with the interactive element. That is, the interactive element can have embedded therein a resource locator pointing to a portion of data stored in the data store 128 that is associated with a particular transaction.

The interactive element can be either dynamic or static. A dynamic interactive element can encode data that can be tracked and edited. For example, if a customer has changed an ordered item, returned an item, or made other modifications to the transaction, payment service 108 can track the customer's modifications and edit data of the interactive element to reflect the modifications. The dynamic interactive element can allow the number, time, location of scans/captures, users who scanned the element, as well as modifications to be tracked and monitored, which ensures data accuracy and hence increases accuracy of payment apportionment. A static interactive element, on the other hand, can contain non-editable data that may not be trackable. Although the data embedded or encoded in the static interactive element is not editable, the data to which the interactive element directs the computing device can be edited.

In at least one example, a customer can interact with the interactive element via a customer device. For example, a customer can scan or capture the interactive element using a sensor, such as a camera or other image capturing component, associated with their customer device. In some examples, the sensor can be a native device or integrated into the payment application 120. Capturing, scanning, or otherwise interacting with the interactive element can cause a listing of items associated with the transaction, or a portion thereof, to be presented to the customer via a user interface displayed on their customer device. The user interface can be presented by the payment application 120. The listing of items can be determined based on the portion of data stored in the data store 128 that is associated with the particular transaction (or transaction identifier embedded in the interactive element). That is, the payment service 108 can receive an indication of an interaction with the interactive element and can determine, based on the indication, the transaction to which the interactive element corresponds. The payment service 108 can decode data received with the indication of the interaction (e.g., the image captured or data read) to determine which transaction the interaction element is associated with. Such a determination can be based at least in part on data, such as a transaction identifier or resource locator, embedded in the interactive element. The payment service 108 can retrieve the transaction data and generate a listing of items associated with the transaction. In some examples, the full listing of items can be presented via a user interface of the customer device that interacted with the interactive element. In some examples, a portion of the full listing, which can be personalized or customized for the user, can be presented via the user interface of the customer device that interacted with the interactive element. In at least one example, each item associated with an item listing can be associated with a cost, which can be used in determining the total cost of the transaction and apportioned costs to be apportioned to individual customers using techniques described herein.

In some examples, multiple customers can each interact with an interactive element associated with a transaction using respective customer devices. In such an example, a listing of items, or portion thereof, can be presented via respective user interfaces of respective customer devices. Each customer can interact with a user interface presenting the listing of items, or portion thereof, to select individual item(s) and, in some examples, initiate a payment for their selected items using the payment application 120. For example, a first customer can select one or more items from the listing of items, or portion thereof, and can initiate payment for the selected item(s). In some examples, funds from an account of the first customer can be used to process the payment. As such, the first customer need not provide any additional or alternative payment data and payment for the selected item(s) can be automatically processed. One or more other customers can similarly select item(s) from the listing of items, or respective portions thereof, and can initiate payment for such item(s). The merchant application 105 or the payment service 108 can determine a cost of the selected item(s) and can process the payment for the selected item(s) based on the determined cost. In some examples, the determined cost can include taxes, gratuities, or other fees. In some examples, the customers can collaborate on the listing of items, with an individual customer being able to see the other customers' item selections in real time. In an example where the interactive element is dynamic, the updates of user selections or context data can be embedded directly in the interactive element, and an updated interactive element can be provided to the customers. If the interactive element is static, the updates can be reflected in the underlying data to which the static element is linked, but the interactive element itself may be unchanged.

In some examples, the payment service can utilize context data to selectively present listings of items, or portions thereof, for an individual of the one or more of the customers. In such examples, a first customer and second customer can be presented with different portions of the listing of items associated with the transaction. As described herein, each portion of the listing can be determined based at least in part on transaction history or the like. In some examples, the first customer and the second customer can interact with the same interactive element and the payment service 108 can cause the different portions to be presented based on context data indicating which customer interacts with the interactive element. Such context data can include prior transaction data associated with the customer(s) or other users of the payment service, customer preference(s), geographic data, computing device data, application data, time of day, date, calendar data, or the like.

FIG. 1 illustrates an example of a transaction involving the first customer 104, the second customer 156, and the merchant 102. In this specific example, the merchant 102 is a restaurant and the first and second customers 104 and 156 purchased a meal at the restaurant. Techniques described herein, however, are applicable to any number of transaction types. To request payment for the meal, the merchant 102 provides the customers 104 and 156 with a record of the transaction. Such a record can comprise a printed bill or receipt, an order, a user interface of a customer or merchant device, or the like. In some examples, the record of the transaction can include an interactive code that has data embedded therein identifying the transaction. In FIG. 1, the interactive element is represented as a QR code 157, which can be presented, for example, on a user interface of merchant device 105. The customers 104 and 156 can interact with the interactive element, for example, by capturing or scanning the QR code 157, using their respective customer devices 103 and 158.

Once the QR code 157 has been scanned, a listing of items associated with the transaction can be displayed on the customer devices 103 and 158. In at least one example, the listing of items can be presented within respective instances of the payment application 120 executing on the respective customer devices 103 and 158. In some examples, the listing of items can represent all of the items associated with the transaction. In some examples, the listing of items can represent a subset of all of the items associated with the transaction. The subset can be particular to a customer such that the listing is "customized" or "personalized" for the customer, as described below. First customer 104 and second customer 156 can use their respective customer devices 103 and 158 to select items for payment. In the depicted embodiment, for example, the first customer 104 can choose to pay for two meal items by selecting these items from a listing displayed on customer device 103. Likewise, the second customer 156 can choose to pay for two other meal items by selecting these items from a listing displayed on customer device 158. As such, each item is associated with the customer that "claimed" it and the cost of such item(s) is allocated to the first customer 104 and the second customer 156. That is, based on the selections indicated in FIG. 1, the cost of the pasta primavera and appetizer is apportioned to the first customer 140 and the cost of the classic salad and cheeseburger is apportioned to the second customer 156. As such, each customer can pay for the amount of the transaction apportioned to them. In additional or alternative examples, the customers 104 and 156 can select one or more of the same items for payment, in which case a cost for the same items can be shared, equally or otherwise, between the customers 104 and 156.

As described above, the customers 104 and 156 can use payment application 120 on their respective customer devices 103 and 158 to select items for payment. In some examples, each instance of the payment application 120 can display the listing of items for the customers 104 and 156 and can allow the customers 104 and 156 to collaborate on payment for the transaction, in real time or near real time. For example, as each customer 104 or 156 selects an item from the listing, the item can be identified (e.g., immediately) on the other customer's device as having been selected by the customer. Each customer can see and discuss the other customer's selections in real time or near real time, which can facilitate the payment apportionment process. Device synchronization or real time collaboration techniques can be used to facilitate such real time or near real time collaboration between customers.

Additionally or alternatively, the payment application 120 (via the payment service 108) can customize the listing of items presented for each customer 104 and 156. Such customization can include, for example, a listing that includes a subset of items from the transaction or a listing in which the items are presented in a customized order. For example, based on a history of transactions performed by the customer 104 or 156 using the payment service 108, the payment service can learn customer purchase preferences. The payment service 108 can review the listing of items from the transaction and associate each item with a respective customer or multiple customers, based on the purchase preferences. The payment service 108 can then cause the payment application 120 to present customized listings of items for the customers 104 and 156 according to a respective strength of association between one or more items and the purchase preferences of customers 104 and 156, as described herein. In some examples, additional or alternative data can be used to determine customer purchase preferences. For example, social network connections or interactions or other third-party data can be indicative of customer purchase preferences. In some examples, as described herein, such purchase preferences can be determined using machine learning models. Additional details are described below.

In at least one example, and as illustrated in FIG. 1, in response to receiving an indication that the first customer 104 interacted with the QR code 157, a listing of items associated with the transaction can be presented via a user interface on the customer device 103. The first customer 104 can interact with the user interface to select first item(s) from the listing that the first customer desires to pay for. When the second customer 156 associated with the transaction interacts with the QR code 157, a second listing of items can be generated and presented on the second customer device 158. The second listing can indicate that the first item(s) has been selected for payment by the first customer 104. This can allow the second customer 156 to take into consideration the first customer's item selections when the second customer 156 selects items for payment from the second listing. Such real time indications of item selections on the customer devices can help the customers collaborate and apportion items or payments in a desired and fair manner, while minimizing awkward disputes over payment amounts.

Once the customers' 104 and 156 item selections have been submitted to the payment service 108, the payment service 108 can initiate payments for the respective amounts apportioned to each of the customers 104 and 156. Such amounts can be determined by the merchant device 105 or payment service 108 based at least in part on transaction data associated with the transaction, which can include cost(s) of item(s). In at least one example, the payment service 108 can use funds (e.g., stored balances) from user accounts the customers 104 and 156 have with the payment service 108. In some examples, such payment processing can occur automatically, without further input from the customers 104 and 156. That is, funds based on the amount apportioned to the first customer 104 can be withdrawn from a stored balance of the user account of the first customer 104 and funds based on the amount apportioned to the second customer 156 can be withdrawn from a stored balance of the user account of the second user 156. The payment service 108 can receive the funds and provide the funds to an account of the merchant 102. In some examples, one or more integrations between the P2P service 186 and the payment processing service 126 can enable the movement of funds between customers, the payment service 108, and the merchant 102. In some examples, such funds can be withdrawn and moved between users of the payment service network 100 without using traditional payment rails.

In at least one example, once individual customers 104, 156 select and authorize the item(s) for payment, each respective customer device 103, 158 can present a user interface customized with payment information and apportioned payment based on the selected item(s). In some examples, the payment information can be a payment identifier, associated with a user account of a customer, that can be particular to the payment service 108. In such examples, the payment service 108 can use the payment identifier to identify the user account corresponding to the customer and can withdraw funds from a stored balance associated with the user account in an amount apportioned to the customer.

In some examples, one or more of the payments can be processed using payment instrument(s) provided by the customers 104 or 156 to merchant 102. In such an example, payment data can be obtained via a reader device 164 or the like. In some examples, cash, check, or other payment method can be used for providing payment for amounts of a transaction allocated to respective customers 104 and 156. In some examples, the payment service 108 can track individual payments and settle the transaction, as individual payments are received or when all payments have been received. In some examples, as described herein, the payment service 108 can determine gratuity, taxes, or other fees and can add such additional fees to individual payments. As such, customers, such as the first customer 104 and the second customer 156, need not manually compute gratuity, taxes, or other fees. In this way, techniques described herein offer improvements over existing payment technologies.

This process is repeated for each of the customers of a transaction until a total payment amount of the transaction is distributed among customers associated therewith. If a customer fails to pay for their portion of the transaction, or there are unclaimed items associated with the transaction, the merchant device or payment service can automatically and predictively assign the leftover amount to one or all customers, for example, retroactively.

Furthermore, while the description references a customer being able to pay the merchant through merchant- or payment service-generated codes, in additional or alternative examples, the "scan-to-pay" method described herein may refer to, for example, a process of generating an interactive element on a customer device, and the merchant device 105 reading information in the interactive element using a sensor device, and sending the information to the payment service 108 to initiate a payment. In such examples, when the merchant 102 interacts with the interactive element using their merchant device 105, the payment service 108 can receive an indication of the interaction. The merchant 102 can interact with the interactive element by scanning or otherwise capturing the interactive element, for example, using a sensor such as a camera or other reader device, or can receive the interactive element via a text or other message sent from the customer device. The interactive element can have embedded or encoded data indicating apportionment details (e.g., which item(s) have been selected by the customer) and payment information so when merchant 102 interacts with the interactive element via the merchant device 105, the payment service 108 can process payment for the apportioned amount of the transaction. That is, the payment service 108 can withdraw funds in the apportioned amount from a stored balance of the customer and cause funds in the apportioned amount to be deposited in the merchant account. In some examples, the merchant 102 can see the progress of payment transaction.

Figure 2:
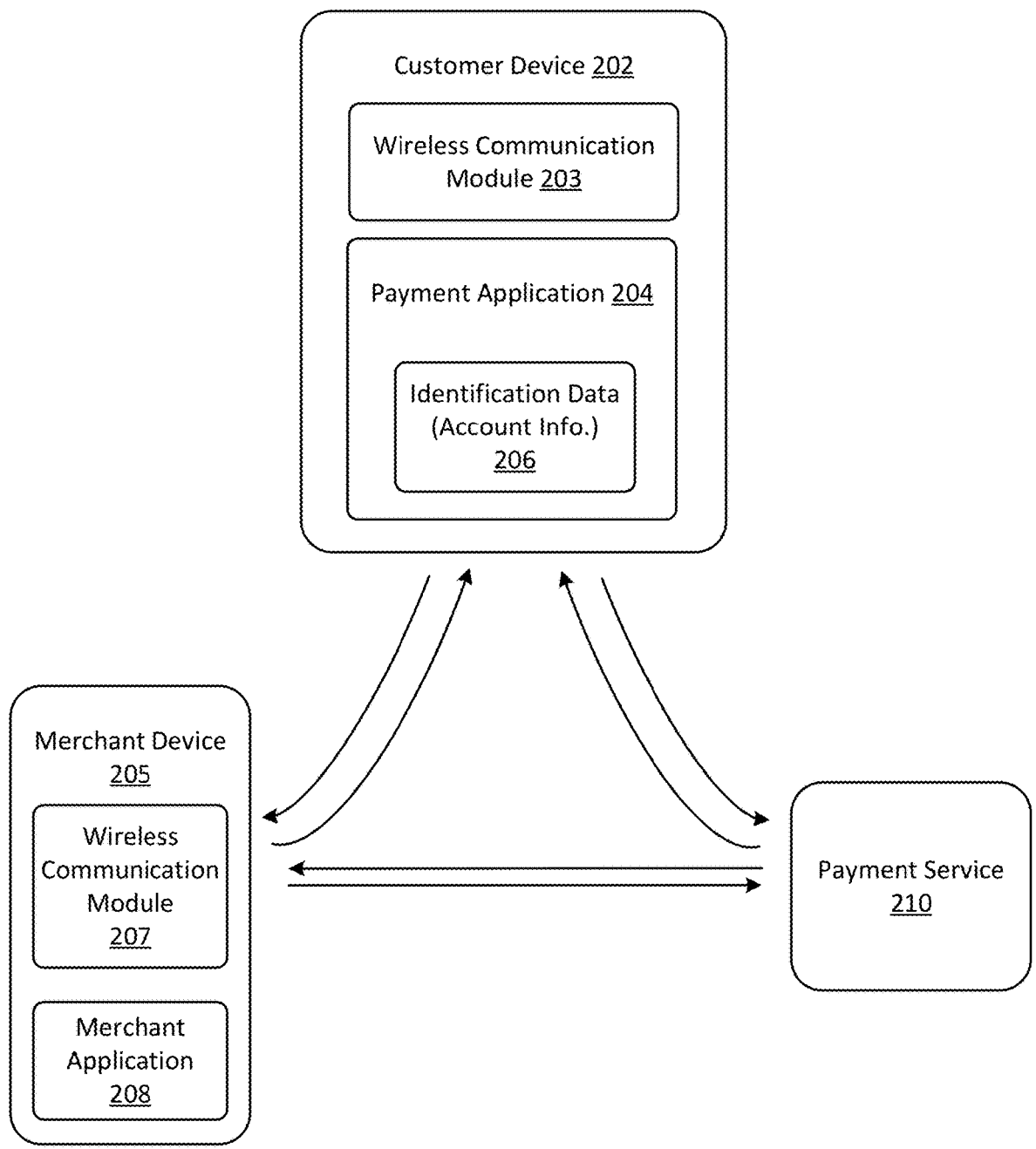
FIG. 2 is a schematic diagram of a customer device, a merchant device, and a payment service according to one example described herein.

FIG. 2 is a schematic diagram 200 of a customer device, a merchant device, and a payment service, according to one example described herein. In one implementation, customer device 202 can correspond to customer device 103 or customer device 158 of FIG. 1 and merchant device 205 can correspond to merchant device 105 of FIG. 1.

Customer device 202 and merchant device 205 may be computing devices with wireless communication modules 203 and 207, respectively, with wireless communication capabilities (e.g., NFC, Bluetooth, cellular data, etc.), allowing wireless communication therebetween. A wireless communication module such as wireless communication module 203 or 207 can be configured with wireless communication capabilities (e.g., NFC, Bluetooth, cellular data, etc.), allowing wireless communication between customer device 202, merchant device 205, and other devices with wireless communication capabilities. In an example, merchant device 205 may have an NFC-enabled chip that communicates with other NFC-enabled devices.

A payment application 204, which can correspond to payment application 120, can be an application provided by a payment service 210, which can correspond to payment service 108 of FIG. 1. Payment application 204 can execute on customer device 202. Merchant device 205 can include a merchant application 208 that is associated with one or more merchant systems and can be used by one or more customers to purchase products or services. Merchant application 208 can execute on merchant device 205. At least one of payment application 204 or merchant application 208 may be accessible through a web browser (e.g., Chrome® or Safari®) on the customer device 202, according to one example. In another example, at least one of payment application 204 or merchant application 208 can be software applications downloadable via an application store (e.g., Google Play Store®, Apple App Store®, etc.). The description herein is with reference to the payment application 204 and merchant application 208 as installed applications; however, it will be understood that these applications as authenticated or unauthenticated applications on a web browser is within the meaning of the term. Furthermore, in alternative examples, functionality described as being performed or provided by either payment application 204 or merchant application 208 can alternatively be performed or provided via a website provided by payment service 210, or any source website or application that provides a portal to send and accept payments for transactions using payment service 210.

Customers can provide identification data 206, such as account information or the like, for accessing or registering with the payment service 210 (e.g., via payment application 204). Once accessed or registered, payment application 204 may remember identification data 206 for subsequent visits (for example, through web browser authentication, web cookies, web history, etc.), allowing access to payment application 204 without again providing identification data.

Figure 3:
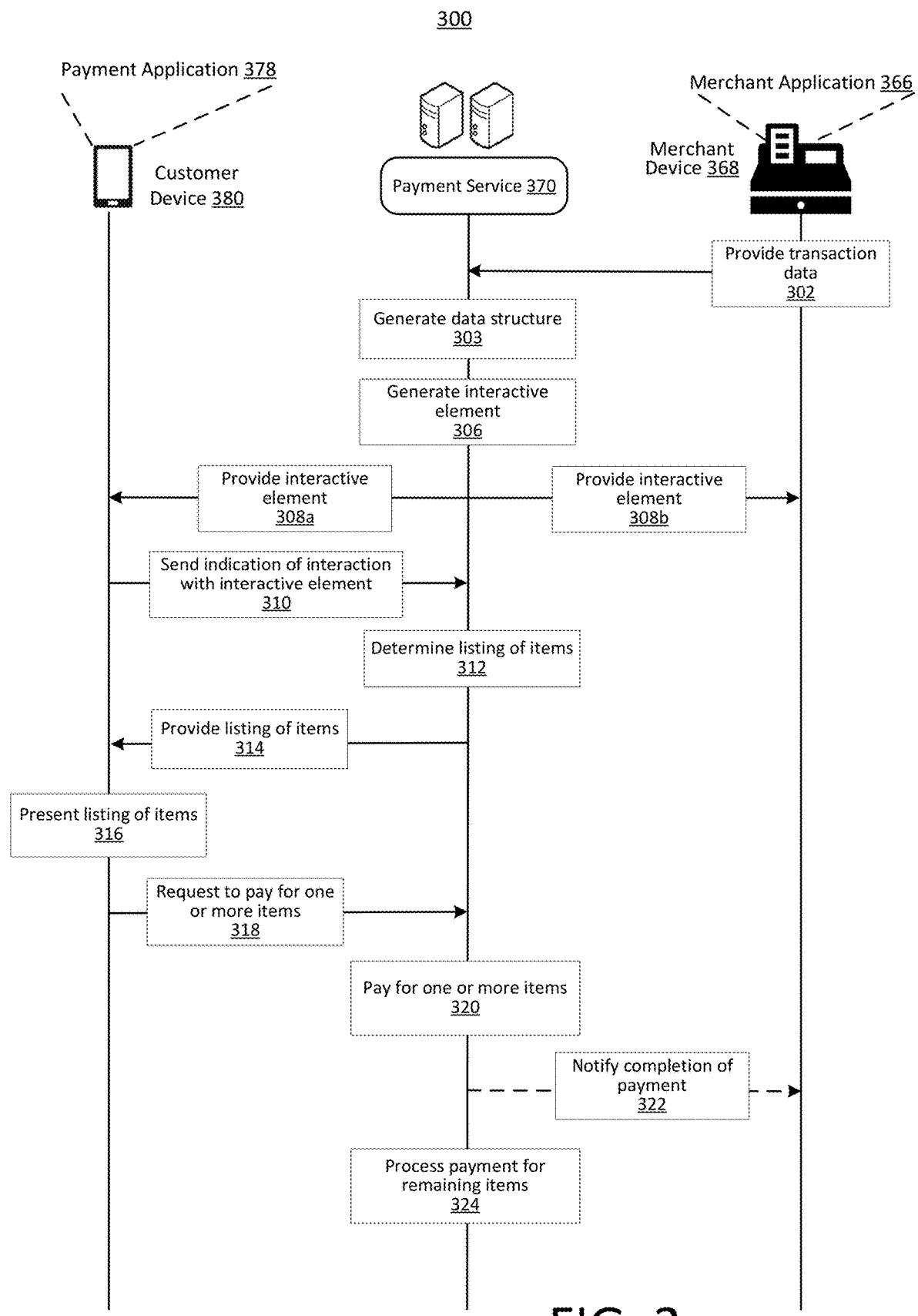
FIG. 3 is a data flow diagram of a method for apportioning payment according to one example described herein.

FIG. 3 is a data flow diagram of a method 300 for apportioning payment according to one example described herein. When one or more users initiate the transaction with a merchant, merchant application 366 residing on merchant device 368 or other merchant computing device can generate transaction data associated with the transaction. A person skilled in the relevant art will recognize that the operations in the method 300 may be re-ordered or modified without parting from the spirit and scope of the present technology. That is, one or more of the steps can be optionally performed or performed in a different other than shown.

Merchant device 368 can correspond to merchant device 102 and merchant application 366 can correspond to merchant application 182 of FIG. 1. The transaction data can include a transaction identifier (id), a merchant identifier, a merchant category class, item(s) to be purchased, a price for each item, an identification of a coupon or discount being used, a total cost, a time when the item(s) was purchased, a store (online store or physical store) where the item(s) was purchased, an identifier of a payment instrument (e.g., payment card number, account credentials, or other payment device identifier), a time, location (e.g., street address, GPS coordinates, IP address, etc.) and date of the transaction, the payment card network 140 associated with the payment instrument, an issuing bank of the payment instrument, a name or account of the customer, contact information of the customer, type of currency, IP address of merchant device 105, IP address of customer device, combinations of the foregoing, and so forth.

Merchant device 368 provides (302) transaction data to payment service 370 for storage and further processing. In some examples, payment service 370 can correspond to payment service 108 of FIG. 1. In various examples, transaction data can be sent from merchant device 368 to payment service 370 in near real time. That is, as new transaction data is generated, such transaction data can be sent to payment service 370. In other examples, the transaction data can be sent in batches, at a particular frequency, after a lapse of a period of time, responsive to a condition being satisfied (e.g., a total cost of a transaction satisfying a threshold, a request to complete a transaction being received, etc.), or the like. In some examples, a portion of transaction data can be sent to payment service 370 and a portion of the transaction data can be stored locally on the merchant device 368.

In an example, payment service 370 can generate (304) a data structure associated with the transaction, which can be stored by the payment service 108. The data structure can be associated with a transaction identifier and can store transaction data for all customers associated with the transaction.

In some examples, payment service 370 generates (306) an interactive element to associate with the transaction. The interactive element can be or include any identifier encoded with data, such as a QR code, a barcode, a RFID tag, a unique identifier, any other interactive code, or the like. In some examples, the interactive element is encoded with data such as a transaction identifier or a resource locator pointing to the data structure associated with the transaction. The interactive element can be static or dynamic, as described above. That is, in some examples, an interactive element can be static, wherein the information embedded therein does not change and is not editable. For example, a static QR code can embed the transaction data of a transaction in the code, and can present the same transaction data to every customer involved in the transaction. In some examples, an interactive element can be dynamic, wherein the information embedded therein can change and may be editable. For example, a dynamic QR code can be updated based on customer interaction or can be used to provide customized information specific to a customer, as described below. The use of interactive elements can provide a technical means to facilitate communication between merchant and customer devices in a payment ecosystem.

In at least one example, the interactive element is provided to the customer device 380 or merchant device 368 for association with a record of the transaction. In at least one example, the interactive element can be presented on or with: a printed bill or receipt associated with the transaction, a checkout user interface (e.g., a user interface that presents data for checking out or completing a transaction), a payment user interface (e.g., a user interface that presents data for obtaining payment data), a completed transaction user interface (e.g., a user interface that presents data indicating a transaction is complete), a digital receipt user interface (e.g., a user interface that presents data associated with the transaction, payment, and the like), a loyalty user interface (e.g., a user interface for receiving or providing customer loyalty data), a feedback user interface (e.g., a user interface for inputting feedback), an RFID tag, or the like.

Payment service 370 can provide (308a) the interactive element to customer device 380 via a text message, email, in-app notification (e.g., presented via a payment application 378), instant application, or other communication methods for displaying on customer device 380 associated with payment application 378. Customer device 380 can correspond to either customer device 103 or 158 and payment application 378 can correspond to payment application 120 of FIG. 1. In some examples, a customer can provide an interactive payment code, which is generated by payment service 370 and displayed on customer device 380, to merchant device 368 for a merchant to scan and accept payment associated with the transaction. For example, a merchant can scan the interactive element (e.g., QR code) displayed on customer device 380, or the customer can send the interactive element (e.g., via a text message) to the merchant. The interactive element can have data embedded therein representative of the apportioned items for the customer and corresponding payment information. The merchant can read the information in the customer-generated code using the merchant device 368, and the merchant device 368 can send the information to a server (e.g., associated with payment service 370) to complete the payment. For example, when the merchant scans the code, the apportioned amount can be deposited in a merchant account and the merchant can check the progress of payment transaction. Alternatively or additionally, payment service 370 can provide (308b) the interactive element to merchant device 368. The merchant device 368 can print a bill or receipt with the interactive element or can present the interactive element on a display of merchant device 368. Accordingly, customer device 380 can receive the interactive element directly from payment service 370 or indirectly from merchant device 368 (e.g., on a printed bill, receipt, or display).

A customer can interact with the interactive element through a sensor, such as a camera or other reader, on customer device 380. Customer device 380 can send an indication of the interaction with the interactive element (310) to payment service 370 that the customer has captured the interactive element. When such indications are received from multiple customer devices, payment service 370 can identify which of the customers have chosen to participate in the payment apportioning process.

Next, payment service 370 determines (312) a listing of items associated with the transaction, based on transaction data associated with the data structure, and payment service 370 provides (314) the listing to customer device 380. Customer device 380 presents (316) the listing in a user interface presented by the payment application 378. The customer can determine which items to "claim" by selecting one or more items from the listing.

In one example, the listing presented to customer can include all purchased items (herein referred to as a "full list"). In some examples, as described above, the user interface presenting the listing of items can be updated in real time or near real time to indicate whether other customers have selected items from the list and which items. As described above, device synchronization or collaboration techniques can be used to ensure the data presented via the user interface is updated in real time or near real time to avoid conflicts. In some examples, two or more customers can select a same item such that the amount owed by each customer is apportioned between or among the number of customers sharing the cost of the item.

In another example, rather than presenting all items associated with a transaction to every involved customer, payment service 370 may provide a customized or personalized list (e.g., a subset of the listing) to respective customers based on information the payment service 370 may know about the customers (e.g., past transaction data or the like), or based on other context data. Such context data can include, for example, prior transaction data associated with the customer(s) or other users of the payment service, customer preference(s), geographic data, computing device data, application data, time of day, date, calendar data, or the like. In some examples, payment service 370 may use machine learning models, statistical models, or the like to determine such customized or personalized listings of items. Payment service 370 can use the context data to identify which items are likely to be associated with one or more customers, and can surface a customized or personalized listing of items for each of the one or more customers. For example, when it is determined that customer is predicted to be responsible for ordering a first item, the first item may be displayed in a listing for the customer but not displayed to other customers. By providing such customized or personalized listings to individual customers, both the amount of data transferred in network and the time spent on processing the item(s) can be reduced, thereby improving the usage of network and computer resources. The customized listings can also make it easier for customers to locate the items they want to pay for from the bill or the receipt.

Still referring to FIG. 3, once the customer selects one or more items from the listing, a request to pay for the selected item(s) can be sent (318) from customer device 380 to payment service 370, to initiate payment for the selected item(s). Such a selection can be performed via an interaction with a user interface presented by the payment application 378. As illustrated in FIG. 3, an indication of the selected item(s) can be provided to the payment service 370 with a request to pay for the selected item(s). In some examples, such an indication can be provided prior to a payment request or without a payment request at all.

In at least one example, the payment request can originate from within the payment application 378. In some examples, an interaction with an interactive element can cause a respective instance of a payment application to open. In some examples, the payment application can be operating in the background of the corresponding customer device such that interaction with an interactive element can cause the payment application to transition to the foreground. In some examples, if a customer interacts with the interactive element and does not have an account with the payment service 370, the payment service 370 can determine such (e.g., by determining that the device identifier of the customer device 380 or the like does not match or otherwise correspond with a user account) and initiate an onboarding process to open a new account for the customer. In some examples, the onboarding process can prompt the customer to download the payment application or can be initiated via a web browser or instant application.

In at least one example, the payment request can indicate to use funds associated with a stored balance of the user account of the customer. In such an example, the payment request can include a payment identifier associated with the customer that can be used to identify the user account of the customer. In some examples, the payment request can indicate a particular account or sub-account from which the funds are to be withdrawn, a currency type (e.g., fiat, cryptocurrency, etc.) or other asset (e.g., stocks, etc.) to use, or the like. In an example where the customer opts to use funds associated with their user account for payment for the selected item(s), payment service 370 can transfer funds between the customer's account and the merchant's account to pay (320) for the items. For instance, funds can be transferred from a stored balance of the customer (e.g., managed or maintained by payment service 370) to a stored balance of the merchant (e.g., managed or maintained by payment service 370). In some examples, the payment service 370 can receive funds from the stored balance of the customer and transfer funds to the stored balance of the merchant, for example, as an intermediary.

As described above, in at least one example, once the customer selects and authorizes the item(s) for payment, the customer device 380 can present a user interface customized with payment information and apportioned payment based on the selected item(s). In some examples, the payment information can be a payment identifier, associated with a user account of a customer, that can be particular to the payment service 370. In such examples, the payment service 370 can use the payment identifier to identify the user account corresponding to the customer and can withdraw funds from a stored balance associated with the user account in an amount apportioned to the customer.

In various examples, payment service 370 can receive customer payments in a variety of currencies, as described herein, can make exchanges between different currencies (e.g., using a separate account owned and managed by the payment service 370 for each currency type), or can provide funds to the merchant account in any desired currency. In other words, payment service 370 can transfer funds between the customer's account and merchant's account to pay (320) for the items.

Furthermore, while the description references the customer being able to pay the merchant through merchant- or payment service-generated codes, in additional or alternative examples, the "scan-to-pay" method described herein may refer to, for example, a process of generating an interactive element on a customer device, and the merchant device 368 reading information in the interactive element using a sensor device, and sending the information to the payment service 370 to initiate a payment. In such examples, when the merchant interacts with the interactive element using their merchant device 368, the payment service 370 can receive an indication of the interaction. The merchant can interact with the interactive element by scanning or otherwise capturing the interactive element, for example, using a sensor such as a camera or other reader device, or can receive the interactive element via a text or other message sent from the customer device. The interactive element can have embedded or encoded data indicating apportionment details (e.g., which item(s) have been selected by the customer) and payment information so when merchant interacts with the interactive element via the merchant device 368, the payment service 370 can process payment for the apportioned amount of the transaction. That is, the payment service 370 can withdraw funds in the apportioned amount from a stored balance of the customer and cause funds in the apportioned amount to be deposited in the merchant account. In some examples, the merchant can see the progress of payment transaction.

After payment has been made by the customer, the payment apportionment may not be complete, and payment service 370 may process (324) payment from one or more other customers. In other words, a remaining balance associated with one or more remaining items associated with the transaction can be paid by one or more other customers (e.g., a second customer) included in the transaction, as described herein. In one example, payment service 370 can notify (322) merchant device 368 that the customer has made the payment. In some examples, payment service 370 may wait for a condition to be satisfied, for example, the entire transaction amount has been paid, before notifying the merchant or merchant device 368 that the customer has made payment.

The method of apportioning payments described herein has many advantages over previous methods, which generally include a large number of manual operations and are not easy to implement, for both customers and merchants. In a restaurant scenario, for example, when multiple customers at a table desire to apportion payment of a transaction, a server may need to track item(s) ordered by individual customers and use a merchant device to generate multiple receipts (e.g., one for an individual customer). When drinks or appetizers will be shared by the customers, the server may need to ask the customers how to divide the payment for the shared items. This payment-apportioning process is demanding on servers, time-consuming, and error-prone, and it generally cannot ensure a fair payment distribution. For instance, customers may disagree on how much tip to provide, or one customer may forget to pay for certain items (e.g., tax or tip), which may require other customers to pay an unfair share.

Advantageously, the integrated payment framework described herein leverages an interactive element (e.g., QR code) and contactless payment to create a payment system for automatic and granular payment apportioning. In the restaurant scenario, rather than asking the server to get involved, an individual customer may scan an interactive transaction code (e.g., QR code) to cause a listing of items from a transaction to be presented on the customer's computing device. The customer can then select the items the customer wishes to pay for and can be presented with a total cost for those items. In some examples, a customized receipt can be automatically generated and presented to individual customers through their interaction with the interactive element. The customized receipt for a customer can include items that the payment service determines (e.g., using machine learning or based on a transaction history) were likely selected or purchased by the customer. An amount of payment (including tip and tax) can be automatically calculated for the customer based on the customer's item selections. Payments for shared items (e.g., food, tip, and tax) can be automatically handled for the customers based on their selections. Tips can be calculated based on a percentage of item costs or user preferences. This can allow the customers to collaborate on payment in a manner that avoids or minimizes disputes. The technique described herein can significantly improve efficiency and accuracy associated with payment apportionment for transactions involving multiple customers.

Figure 4A:
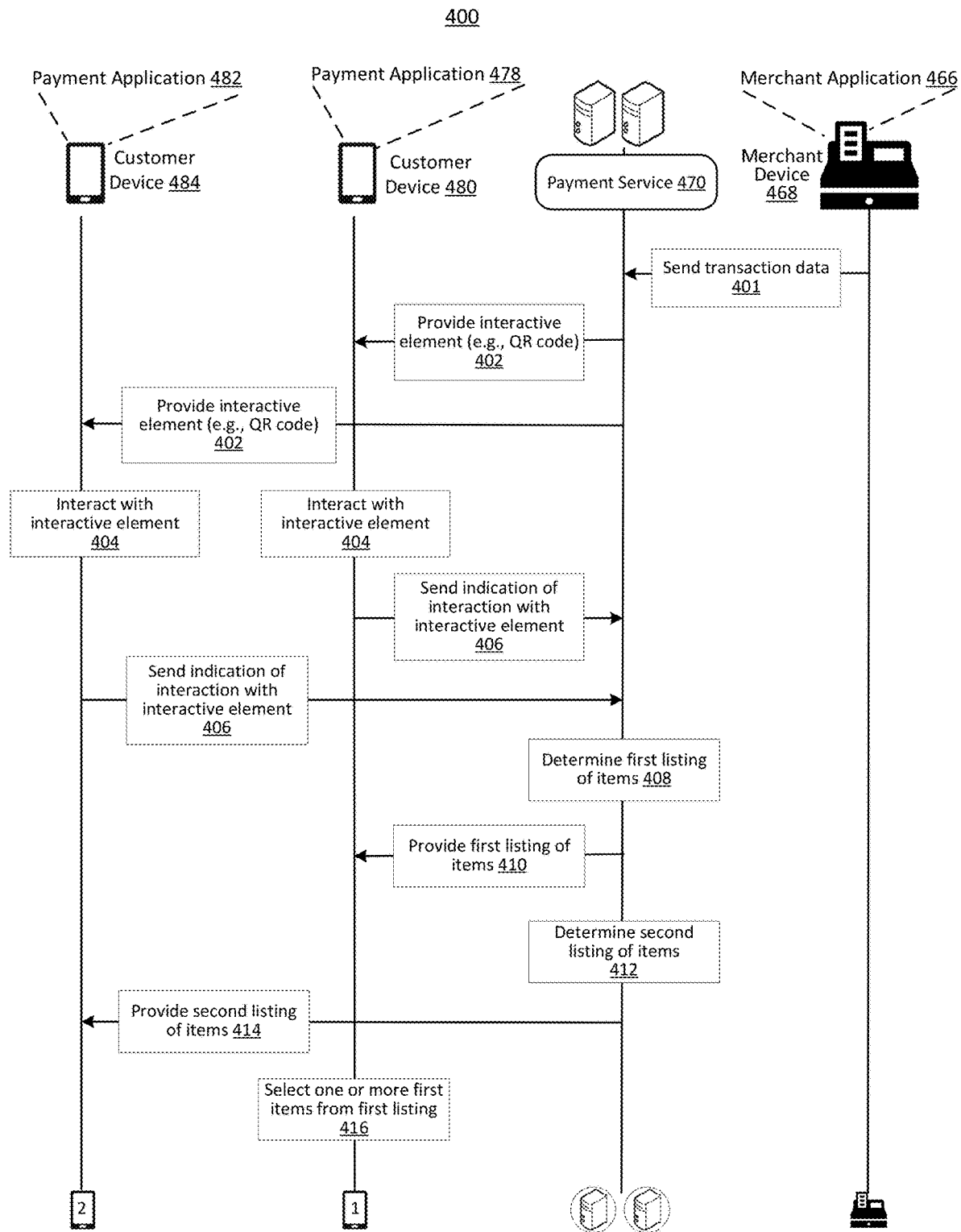
FIGS. 4A-4C are data flow diagrams of a method for apportioning payment according to one example described herein.
Figure 4B:
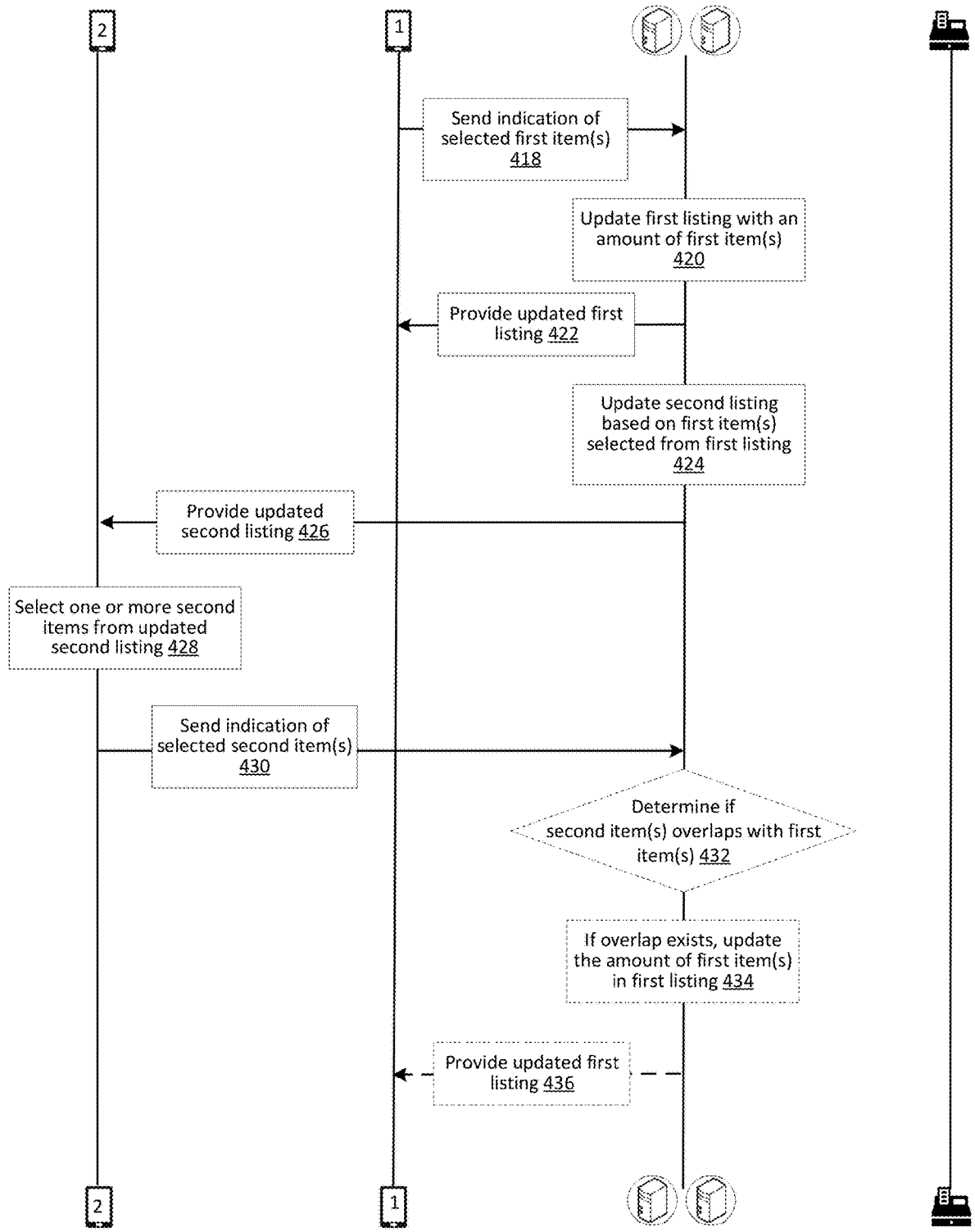
Figure 4C:
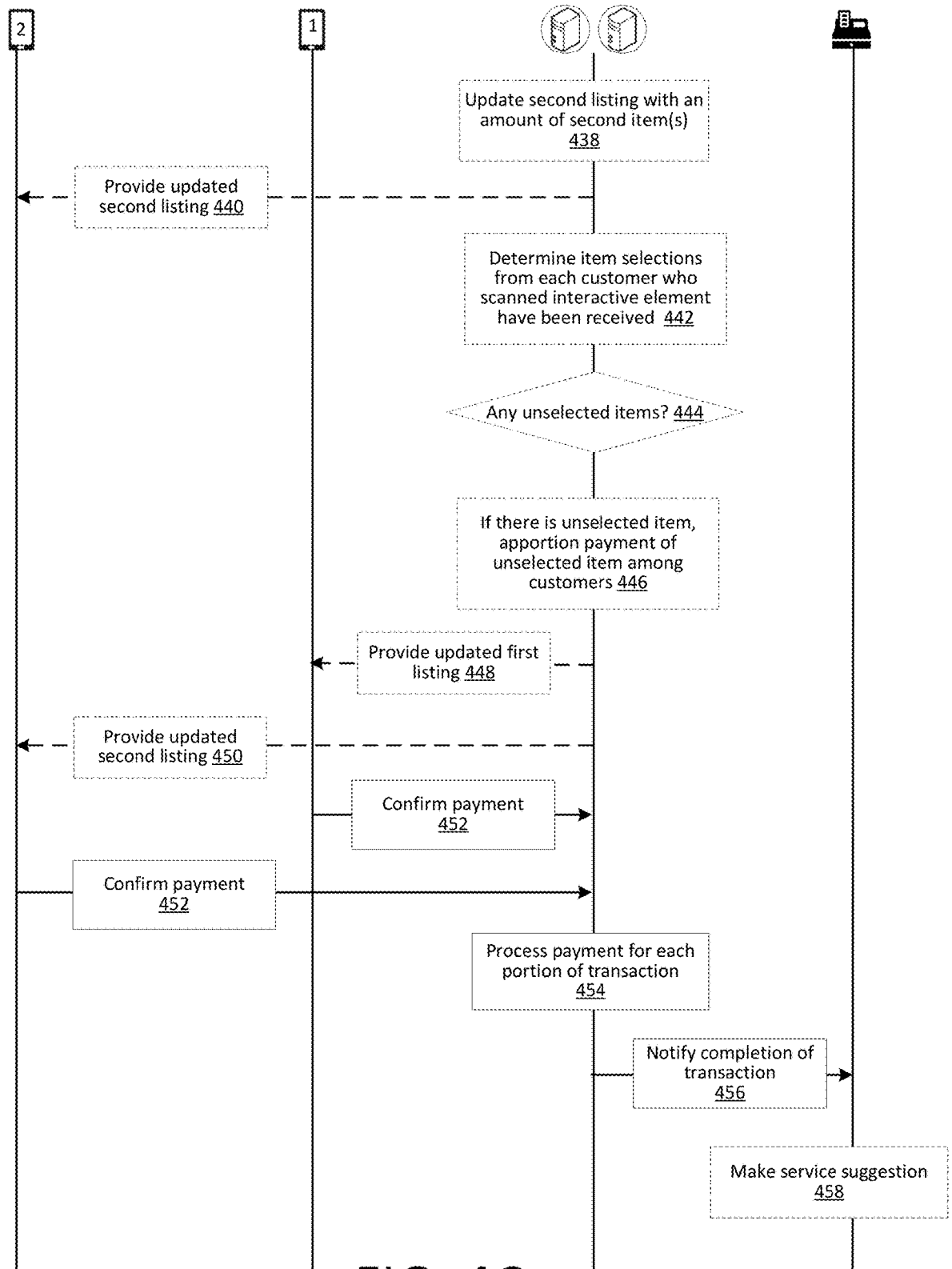

FIGS. 4A-4C are data flow diagrams of a method 400 for apportioning payment according to one example described herein. A person skilled in the relevant art will recognize that the operations in method 400 may be re-ordered or modified without parting from the spirit and scope of the present technology. That is, one or more of the steps can be optionally performed or performed in a different other than shown.

As described above, when a transaction with a merchant is initiated, merchant application 466 residing on merchant device 468 or other merchant computing device can generate transaction data associated with the transaction. The merchant application 466 can correspond to the merchant application 182 and the merchant device can correspond to the merchant device 105 of FIG. 1. In FIG. 4A, merchant device 468 can send (401) the transaction data to payment service 470, where payment service 470 generates and provides (402) an interactive element to multiple customers included in the transaction. In an example, the interactive element can be a QR code, and the QR code can be provided or sent to a first customer, associated with the customer device 480, a second customer associated with the customer device 484, and any other customers involved in the transaction (not shown). The customer devices 480 and 484 can correspond to the customer devices 105 and 158 of FIG. 1. In some examples, the interactive element can first be provided to merchant device 468, which can display the interactive element or generate a printed bill, receipt, or other record containing the interactive element. One or more of the customers can choose whether to interact, for example, via a capture or scan, with the interactive element. An interaction with the interactive element can initiate a payment apportioning process. As depicted, the first and second customers can interact (404) with the interactive element, e.g., using sensors or other cameras on their respective customer devices 480 and 484. In some examples, the sensor can be integrated into or accessed by an application executing on the computing device of the customer and the listing can be presented via a user interface presented by the application. In some examples, the sensor can be a native device and the listing can be presented via a user interface presented by the application, a web browser, an instant application (e.g., a portion of the full application), a progressive web application, or the like. The customer devices 480 and 484 can then send (406) to payment service 470 indications of interactions with the interactive element. The payment service 470 can correspond to the payment service 108 of FIG. 1.

In some examples, an interaction with an interactive element can cause a respective instance of a payment application to open. In some examples, the payment application can be operating in the background of the corresponding customer device such that interaction with an interactive element can cause the payment application to transition to the foreground. Each customer device 480 and 484 are shown as being associated with different instances of the payment application 478 and 482, which can correspond to the payment application 120 of FIG. 1. In some examples, if a customer interacts with the interactive element and does not have an account with the payment service 470, the payment service 470 can determine such (e.g., by determining that the device identifier of the customer device or the like does not match or otherwise correspond with a user account) and initiate an onboarding process to open a new account for the customer. In some examples, the onboarding process can prompt the customer to download the payment application or can be initiated via a web browser or instant application.

Payment service 470 can then determine a listing of purchased items for an individual customer who captured the interactive element. In one example, the listing is a full list of all items purchased in the transaction. In another example, the listing is customized for each individual customer or group of customers (e.g., family, couple, etc.). The customized listing can include, for example, a subset of items from the full list that were likely chosen for purchase by the customer, as determined by payment service 470. Payment service 470 may identify which item(s) are likely to be associated with a customer and should be included in the subset listing based on the customer's prior purchases, preferences, and other context data, as described above. For instance, if a customer ordered a salad in her previous two visits to a restaurant during lunch hours, the payment service 470 may determine that she likely ordered the same salad during lunch in the current transaction. The customized listing can be specific to the individual customer (or a group of customers). Further, as customers interact with or select items from the listings, updated listings can be provided to the customers, as described above. In some examples, a dynamic interactive element (e.g., QR code) can be used to generate the customized listings and the updates.

In some examples, payment service 470 can generate a customized listing for a customer using a machine learning model. The machine learning model can be configured to receive a variety of parameters as input, including, for example, a full listing of the transaction items, the customer's historical transaction data (e.g., purchase preferences), merchant data (e.g., type or name of merchant), date, time, location, or any combination thereof. The machine learning model can provide as output a listing of items from the transaction that likely belong to or were obtained by the customer. For example, output from the machine learning model can include a score indicating a likelihood that one or more items are associated with one or more of the customers. The customized listing generated and displayed for a customer can include the listing determined by the machine learning model. The first and second listings (for the first customer and the second customer, respectively) can be the same when the two listings contain the full list of purchased items. Alternatively, the first and second listings can be different when each listing is customized to include items that were likely chosen for purchase by each respective customer. The customized first and second listings can overlap when the purchased items include an item that was likely chosen to be shared by the customers.

In FIG. 4A, payment service 470 generates one or more listings and provides the listings to the customers. For example, payment service 470 can determine (408) a first listing of items for the first customer and can provide (410) the first listing to the first customer. As such, the first listing can be presented via a user interface of the instance of the payment application 478 executing on the customer device 480. Payment service 470 can also determine (412) a second listing of items for the second customer and can provide (414) the second listing to the second customer. As such, the second listing can be presented via a user interface of the instance of the payment application 482 executing on the customer device 484.

The first and second customers can interact with their respective listings to collaborate on payment of the items. The first customer can select (416) one or more first items from the first listing that the first customer would like to pay for or purchase. Referring now to FIG. 4B, an indication that the one or more first items have been selected by the first customer can be sent (418) to payment service 470 from customer device 480 associated with the first customer. In response, payment service 470 can automatically determine an amount associated with the selected first item(s). In some examples, the payment service 470 can determine the amount based on one or more of a discount, a coupon, a membership, a tax, a tip, or the like. In some examples, the tip can be determined based on the location of the first customer, general tip rules (e.g., a certain percentage based on the number of customers or a total amount of the purchase), or user preferences (e.g., a percentage selected by a customer). Payment service 470 can update (420) the first listing of the first customer with the determined amount and can provide (422) the updated first listing to the first customer. In one example, payment service 470 can cause customer device 480 to present payment method options to the first customer and can allow the first customer to proceed with payment for the selected first item(s). This can be efficient and time-saving for the first customer, but can leave the first customer unaccountable for any unselected first items. In another example, payment service 470 can notify or request the first customer to wait for other customers to complete their item selections before the first customer can proceed with payment, even if the first customer has provided payment instructions. Waiting in this manner can help ensure that all items from a transaction are properly apportioned to the customers. In some examples, payment service 470 can allow the payment for the first customer to proceed after a threshold time or after some or all other customers have submitted their item selections.

In some examples, in addition to updating the first listing based on the items selected by the first customer, payment service 470 can also update (424) the second listing, based on the items selected by the first customer, and can provide (426) the updated second listing to the second customer. By being able to view or consider the selections by the first customer, the second customer may be reminded of an item shared with the first customer, find an item ignored by the first customer, or choose to make selections based on selections made by the first customer. Being able to view the other customer's selections (e.g., in real time) can allow the customers to collaborate on payment during the payment apportioning process. In some examples, annotations of one customer's selections can be displayed in a user interface to another customer, as depicted below in FIGS. 5F-5H.

Still referring to FIG. 4B, the second customer can select (428) one or more second items from the updated second listing, and customer device 484 can send (430) an indication of the selected one or more second items to payment service 470. In one example, each of the first and second listings can include a full item list. Upon the first item(s) being selected by the first customer, the second customer may select second item(s), which can be different from the first item(s). In another example, each of the first and second listings can be a customized listing specific to each individual customer. In such a case, the first and second listings may include different items to be selected by the respective customers, and therefore may help ensure that the entire payment will be apportioned among different customers. Regardless of whether full item listings or customized listings are provided, it can be possible for the first customer and the second customer to select the same item, e.g., a shared item.

Next, payment service 470 can determine (432) whether any of the selected second item(s) overlap with the selected first item(s). Such an overlap can indicate that the first and second customers selected the same item, and thus each of the two customers can share the cost of the item (e.g., each customer pays half price for the item). In some examples, payment service 470 can send a message to the customers to confirm that the overlap is intentional or not erroneous. Additionally or alternatively, the customers can specify how the cost for the shared or overlapped items are be apportioned (e.g., 50:50 or 75:25). Payment service 470 can further update (434) the previously calculated amount of the first item(s) in the first listing and provide (436) the updated first listing to the first customer. If another customer also selects the same item for sharing, the amount paid by both the first customer and second customer can be decreased further (e.g., from half price to one-third of the full price), and the first and second listings can both be updated and distributed accordingly. In some examples, payment service 470 can allow one or more customers to specify the amount they wish to pay and then evenly distribute any remaining cost. Alternatively or optionally, the payment service 470 can divide a total cost for the overlapped items by the number of customers who selected the items. If five customers selected the same item, for example, each of the five customers may be assigned one-fifth of the cost for the item.

Referring to FIG. 4C, based on the selection of the one or more second items, payment service 470 can automatically determine an amount of the selected second item(s) for the second customer. In some examples, the amount of the selected second item(s) can be determined based at least in part on the second item(s) selected or a determination whether one or more of the second item(s) is to be apportioned between two or more customers. In some examples, the payment service 470 can determine the amount based on one or more of a discount, a coupon, a membership, a tax, a tip, or the like. In some examples, the tip can be determined based on the location of the first customer, general tip rules (e.g., a certain percentage based on the number of customers or a total amount of the purchase), or user preferences (e.g., a percentage selected by a customer). Payment service 470 can update (438) the second listing with the amount and provide (440) the updated second listing to the second customer.

When there are customers other than the first customer and the second customer included in the transaction, the collaboration steps described above (e.g., in FIGS. 4A and 4B) can also be performed between the first customer, second customer, and the other customers.

Eventually, payment service 470 can determine (442) that item selections from customers who interacted with the interactive element have been received. From all the received item selections, payment service 470 can determine (444) if any items are left unselected or unclaimed. In some examples, if there is an unselected item(s), payment service 470 can determine an amount of the unselected item(s), and apportion (446) the determined amount among the customers (e.g., customers who scanned the QR code). In such a case, a newly updated first listing can be provided (448) to the first customer and a newly updated second listing can be provided (450) to the second customer. The new listings can include an additional amount of the unselected item(s) apportioned to the customers. In one example, the amount of the unselected item(s) can be evenly apportioned to customers who interacted with the interactive element. In some examples, the payment service 470 can send a notification to the customer devices to alert the customers that one or more items have not yet been selected or remain unclaimed. In some examples, the payment service 470 can refuse to accept payment or refuse to process payment until all items have been selected or claimed.

In some examples, a new item may be ordered after the payment apportioning process has been initiated or performed. In response to detecting the unselected or new item, a new payment apportioning process can be triggered in an effort to apportion the cost of the unselected or new item to the customers. In some examples, if a new item is added to the transaction after the payment apportioning process has been initiated, the process 400 can return to step 444. If the new item is added to the transaction after the payment apportioning process has been performed, the process 400 can return to step 401.

Still referring to FIG. 4C, using the payment "collaboration" features described herein, the customers have now selected the item(s) they would like to pay for, and payment service 470 has populated each customer's portion of the total cost and notified each customer of the amount owed for their portion. In response, the first customer, the second customer, and any other customers involved in the transaction can initiate or confirm (452) payment for their portion. For instance, customer device 480 may display a confirmation graphical user interface (GUI) that prompts the first customer to initiate or confirm the payment of the selected first item(s). Upon receiving the confirmation, payment service 470 can process (454) payment for each portion of the transaction for each respective customer, using the fund transfer techniques described herein or other payment processing techniques, and can notify (456) the merchant device 468 that the transaction has been completed.

While payment using funds transfers from stored balances of user accounts is described as an option for "contactless" payments, in some examples, individual users can use additional or alternative payment mechanisms to remit payment for their portion of the transaction. For example, in some instances, a user can provide a payment instrument for payment. In some examples, the merchant can facilitate the payment by causing an interaction between the payment instrument and a reader device. In some examples, a customer can facilitate the payment by causing an interaction between the payment instrument and their customer device (which can have a reader device embedded therein). In some examples, either the merchant or the customer can use card-on-file technology to facilitate the payment. In some examples, merchants can accept cash, checks, gift cards, or other payment mechanisms for processing portions of transactions as described herein. In examples where different payment mechanisms are used in a single transaction, the merchant can facilitate processing of individual portions of a transaction using the merchant application 466.

In various examples, techniques described herein can allow one or more customers to pay with cash, check, gift card, or another payment mechanism. For example, when a customer does not have a computing device or merely wants to use cash to cover a portion of the transaction, the customer can ask for help to deduct the customer's items or associated cost from the payment. This can be achieved, for example, by having another customer use a computing device to select items that will be paid by the customer with cash. The remaining items on the receipt can be available for selection and payment by the other customer(s) using the techniques described herein. In another example, a customer who captured an interactive element using the computing device can select cash as a payment-apportioning option on the customer's computing device, such that the customer can select items from the receipt and use cash for payment. When the customer selects "pay cash" and an amount of cash the customer would like to contribute, this amount can be automatically deducted from the total amount of the payment or can be deducted in response to an input via the merchant application 466 indicating cash payment was received. In general, when one or more customers chooses to pay with cash, payment service 470 can identify the item(s) that will be paid for using the cash (e.g., based on context data or input from the customers). In another example, after every non-cash paying customer has selected their items, the remaining items can be identified by the payment service 470 as being items that will be paid for using cash.

In some examples, data related to payment apportioning can be transmitted to the merchant, and the merchant can use such data to improve its products or customer service. For instance, customer item selections may optionally be used by the merchant to suggest (458) certain products for purchase or for sharing. For example, when multiple customers regularly share the cost of an item using the systems and methods described herein, the merchant can identify the item to customers as being "great for sharing."

As illustrated in process 400, the cost for all purchased items has been successfully apportioned to individual customers without any calculation errors, embarrassing arguments, or other errors or disputes. The accurate and efficient apportionment can involve multiple customers who are able to utilize their customer devices (or other computing devices) to collaborate on payment for a transaction. The bill or receipt associated with the transaction can be presented on the computing devices such that individual customers can select items or edit the payment on the fly and other customers can see the selections or edits in real time. For example, when a full list is presented to individual customers and the first customer selects the first item, then the second can conclude that the first item belongs to the first customer, and the second can select other items from the list. As other customers see the selections from the first customer and the second, the other customers can select remaining items. Advantageously, the bill or receipt can be annotated in real time, for example, with each item being marked as selected or unselected. In some examples, an item can be marked as "shared," in an effort solicit payments for the item from multiple customers. Real time updates to the receipt or payment can facilitate immediate collaboration among the customers.

The processes described above with reference to FIGS. 3 and 4 are non-limiting examples. In some examples, each step shown and referenced in a parenthetical may be required to perform processes described. In some examples, one or more steps may be optional or may be performed in a different order. While some steps are visually depicted as optional, any one of the steps described can be optional.

Figure 5A:
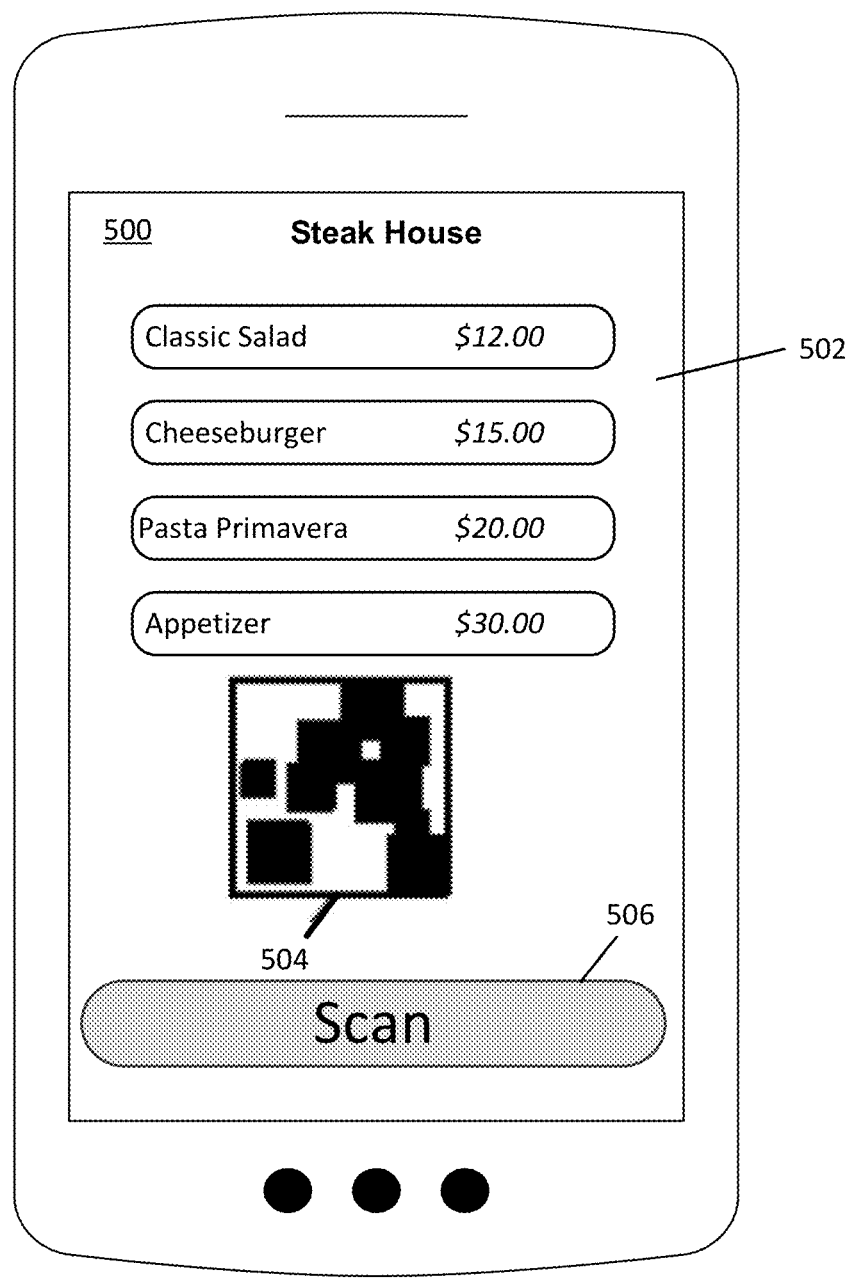
FIGS. 5A-5I illustrate graphical user interfaces for implementing payment apportioning according to one example described herein.
Figure 5B:
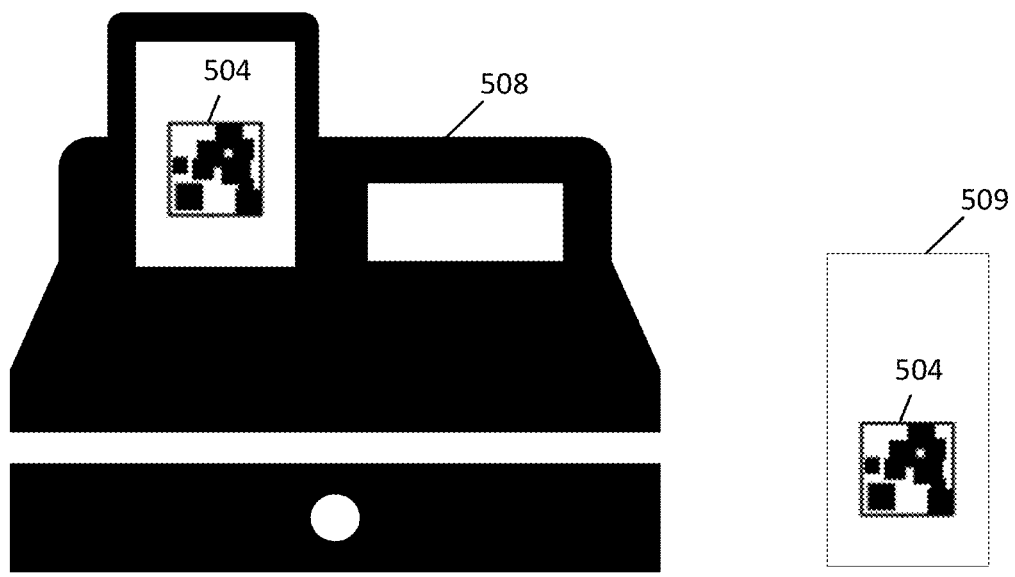

FIG. 5A illustrates a graphical user interface (GUI) 500 shown on a computing device associated with a customer, in accordance with one example embodiment. GUI 500 can be displayed on a first computing device of a first customer associated with a transaction involving a merchant, "Steak House." The transaction can be associated with one or more second customers. GUI 500 includes a bill 502 associated with an interactive element, e.g., a QR code 504. The bill 502 is displayed on a customer device, but could be displayed on a merchant device in alternative examples. The QR code 504 can be generated based on transaction data by a payment service, as described herein. The first customer can use a native sensor or other image capturing component associated with an application to capture, scan (506), or otherwise interact with the QR code 504. As shown in FIG. 5B, the QR code 504 can additionally or alternatively be presented on a display of a merchant device 508 or on a printed bill 509. According to some examples, interacting with QR code 504 may provide shortcut controls provided by the operating system executing on the computing device. Interacting with QR code 504 may open a payment application associated with the QR code 504, as described herein.

In some examples, the payment application can be operating in the background of the corresponding customer device such that interaction with an interactive element can cause the payment application to transition to the foreground. In some examples, if a customer interacts with the interactive element and does not have an account with the payment service, the payment service can determine such (e.g., by determining that the device identifier of the customer device or the like does not match or otherwise correspond with a user account) and initiate an onboarding process to open a new account for the customer.

Figure 5C:
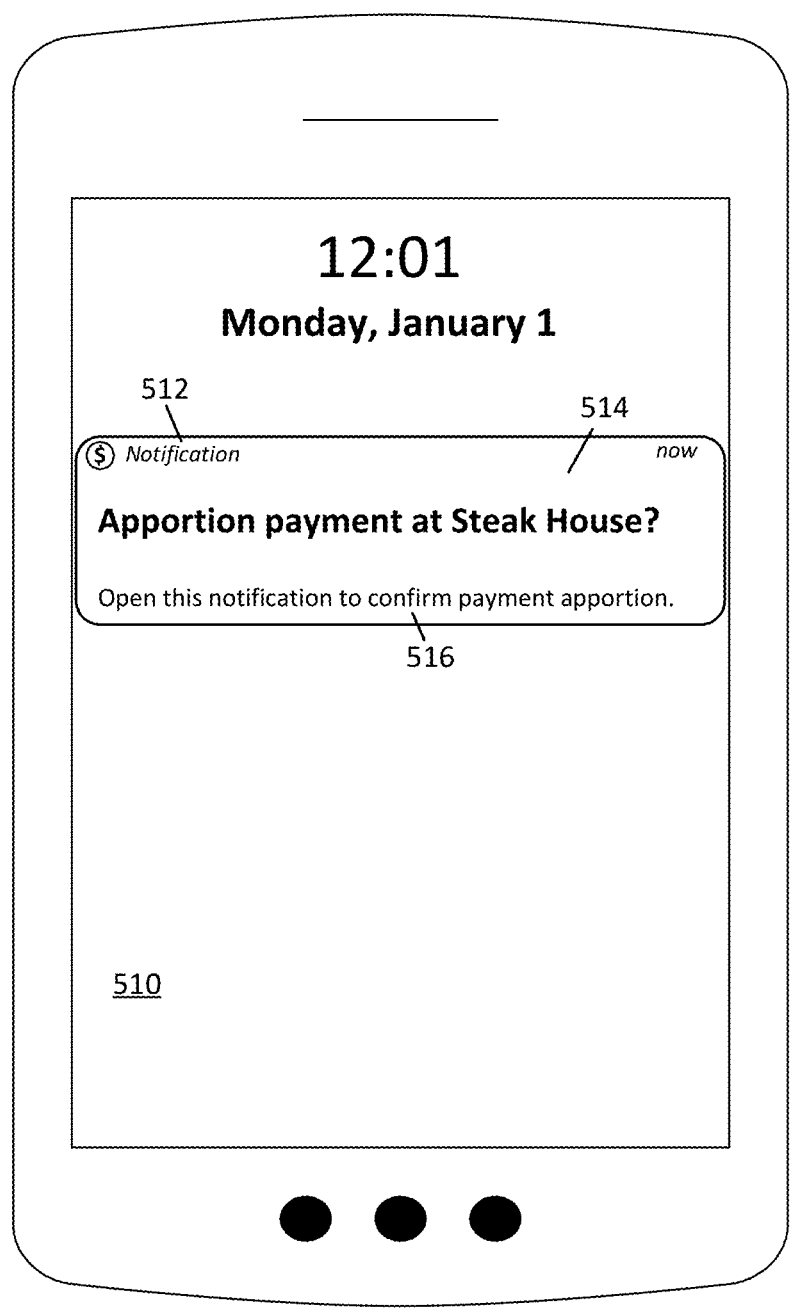

FIG. 5C illustrates a GUI 510 shown on a first customer device associated with a first customer, in accordance with one example embodiment. GUI 510 may display a notification 512 on a computing device of a first customer. Notification 512 may be displayed on the customer device after the first customer (or other customers) has interacted with an interactive element (e.g., the QR code 504). Additionally or alternatively, notification 512 may be pushed to the customer device once the transaction has been initiated. Notification 512 may indicate or otherwise display data associated with a recent transaction that can be apportioned. In the depicted example, notification 512 displays an indication 514 of the merchant associated with the transaction (e.g., a "Steak House"). Notification 512 may further display an indication 516 that a payment apportioning procedure can be initiated. According to some examples, interacting with notification 512 may provide shortcut controls provided by the operating system executing on the computing device. Interacting with notification 512 may open a payment application associated with notification 512. The payment application can cause a start page of the payment apportioning process (e.g., as shown in FIG. 5D) to be displayed for the first customer, according to some examples.

Figure 5D:
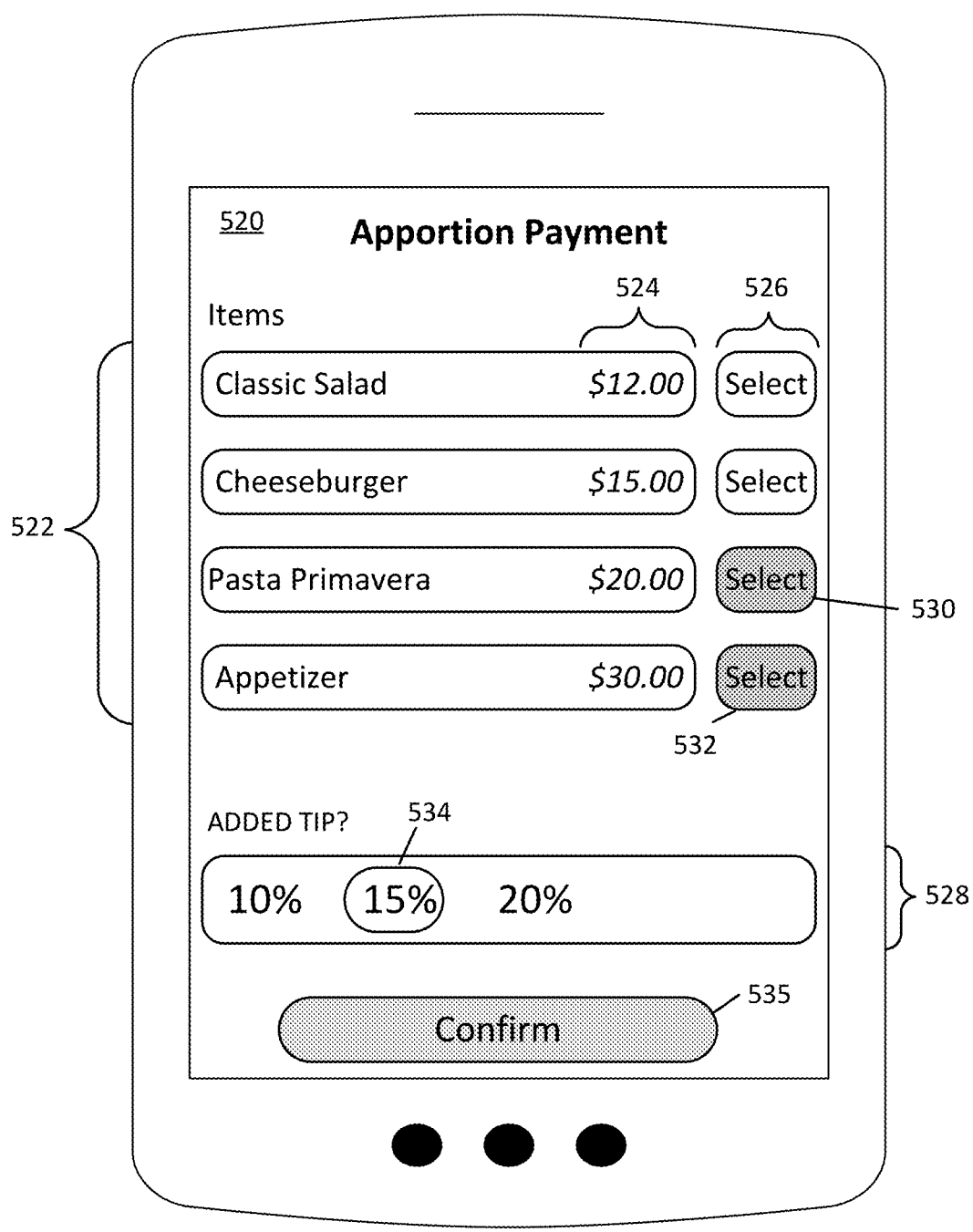

FIG. 5D illustrates a GUI 520 shown on a first customer device associated with a first customer, in accordance with one example embodiment. GUI 520 may be displayed on the first computing device after GUI 510 (e.g., after the QR Code 514 has been captured). GUI 520 may include a listing 522 of items purchased associated with the transaction. The listing 522 can be a full list of all items from the transaction or may be a customized list for the first customer, as described herein. Each row of the listing 522 identifies an item and a price 524 for the item. GUI 520 may include buttons 526, or other user interface elements, that allow each of the items to be selected by the first customer. Selecting one of the buttons 526 can provide an indication that the first customer would like to pay for the corresponding item.

GUI 520 may further include a tip tool 528 that, according to some examples, can include suggested tip percentages that are selectable by the customer. Once selected, the tip tool 528 can display for the customer a calculated tip amount based on the selected percentage. Tip tool 528 may also allow the customer to manually enter a tip amount without selecting a suggested tip percentage. In the example of FIG. 5D, the first customer has selected "Pasta Primavera" 530 and "Appetizer" 532 for payment by the first customer. The first customer has also selected a 15% tip 534. The first customer can confirm one or more selections by selecting a confirm button 535. In response to the customer's selections, the payment service can automatically determine an amount owed by the first customer, as shown in FIG. 5E.

Figure 5E:
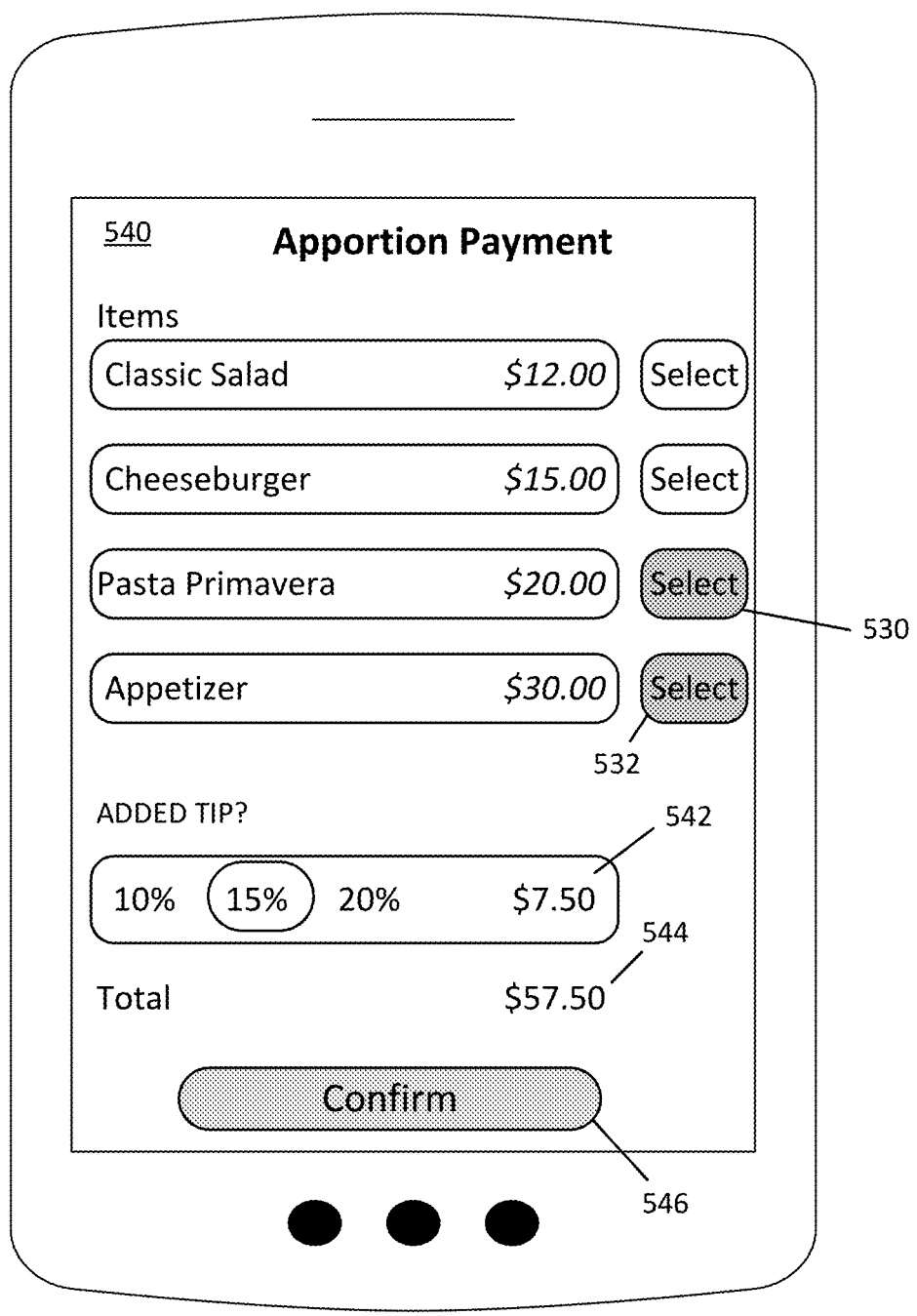

FIG. 5E illustrates a graphical user interface 540 that presents a tip amount 542 (i.e., $7.50) and a total amount 544, based on the first customer's selected items and tip percentage. The total amount 544 in this example is a sum (i.e., $57.50) of the tip amount (i.e., $7.50) and cost of the selected items 530 and 532 (i.e., $50.00 total). While taxes are not included in this example for simplicity, it is understood that payment service can calculate an amount owed in taxes and can add the tax amount to the total amount 544. Likewise, the payment service can adjust the total amount 544 according to discounts, coupons, or other adjustments that may apply to the first customer. The payment service can make such adjustments based at least in part on a determination that a user account associated with the first customer has one or more discounts, coupons, or other adjustments associated therewith. Additionally or alternatively, total amount 544 may dynamically change based on selections made by other customers associated with the transaction (e.g., if another customer chooses to apportion the Appetizer 532). GUI 540 may further include a confirm button 546, or other user interface element, that, when selected, may transmit a confirmation (e.g., confirmation 552) to the payment service. Such a confirmation can initiate a payment for the selected item(s). In one example, other data such as customer account data or user credentials associated with the first customer may be transmitted to the payment service. The item selection(s) of the first customer can be transmitted to the payment service which can push the update to customer devices associated with other customer(s) when the first customer selects the items or selects the confirm button 546. This can enable the other customer(s) to view the first customer's selections in real time or near real time.

In some examples, a user can upload a printed receipt for the transaction that has been scanned or photographed by a customer's computing device. For example, the first customer can take a picture of the printed receipt, and the payment service can generate a user interface that includes an image of the receipt and one or more selectable portions that allow the user to select items on the receipt. Descriptions or costs for the transaction items can be determined or verified through optical character recognition (OCR), as needed.

Figure 5F:
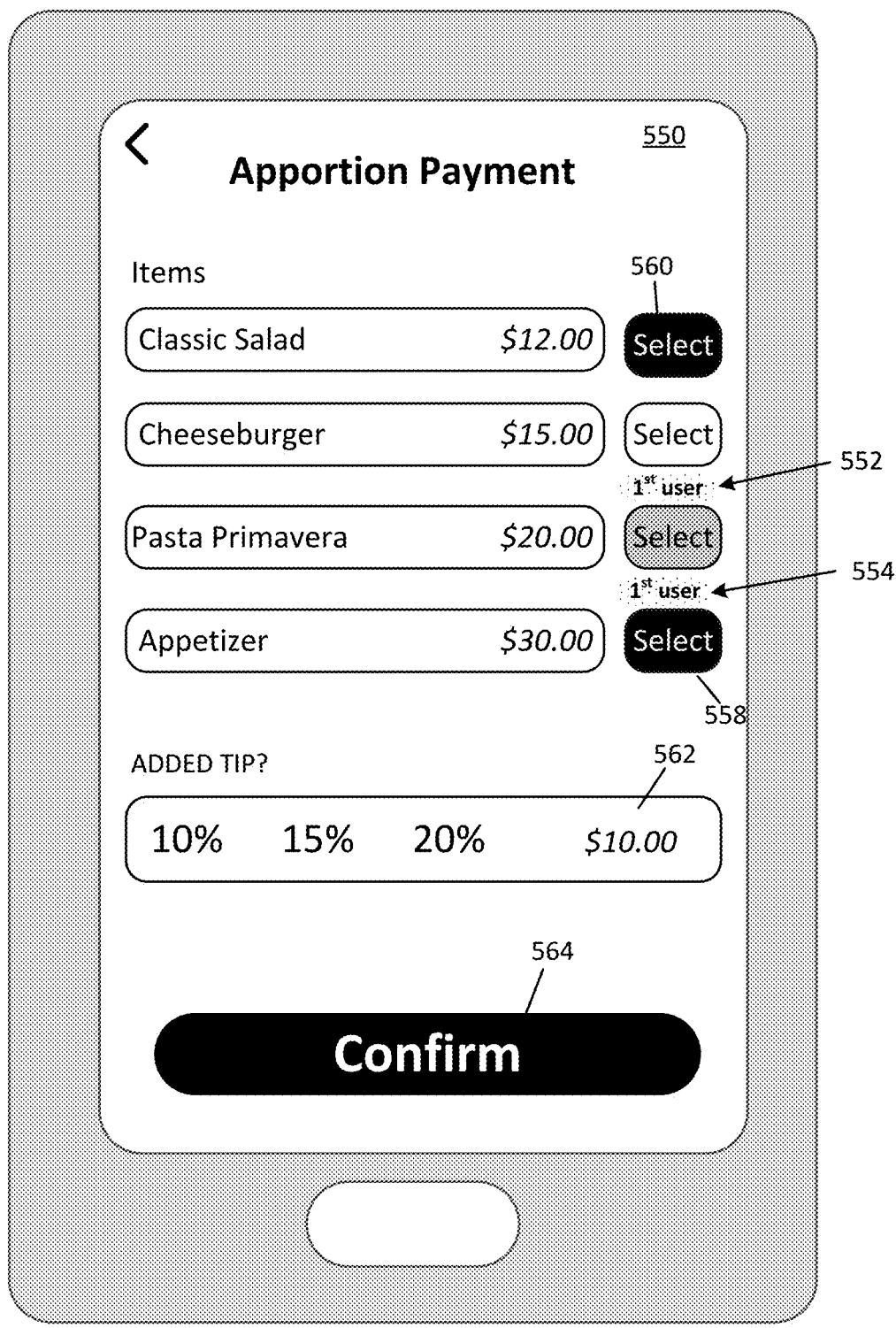

FIG. 5F illustrates a graphical user interface 550 shown on a second customer device associated with a second customer, in accordance with one example embodiment. Similar to the first customer, the second customer in this example has also received and scanned the QR code from FIG. 5B to join the payment apportioning process. GUI 550 includes two annotations of "$1^{st}$ user" 552 and 554 to respectively indicate that "Pasta Primavera" and "Appetizer" have been selected by the first customer. Based on annotation 554, the second customer may decide to select the appetizer 558 since the second customer shared that item with the first customer. The second customer may also choose to pay for the classic salad 560 that he ordered. The second customer may further add a $10.00 tip 562. The second customer may then click the "confirm" button 564 to notify the payment service that the second customer has finished selecting items and is ready to submit payment. Payment service in this example may recognize that the first customer and the second customer both selected Appetizer 532 and may therefore determine that there is overlap between the item selections of the first customer and the item selections of the second customer. As a result, payment service can communicate with the customer devices for the first and second customers, for example, to provide updated user interfaces that present adjusted amounts owed by the first customer and the second customer.

Figure 5G:
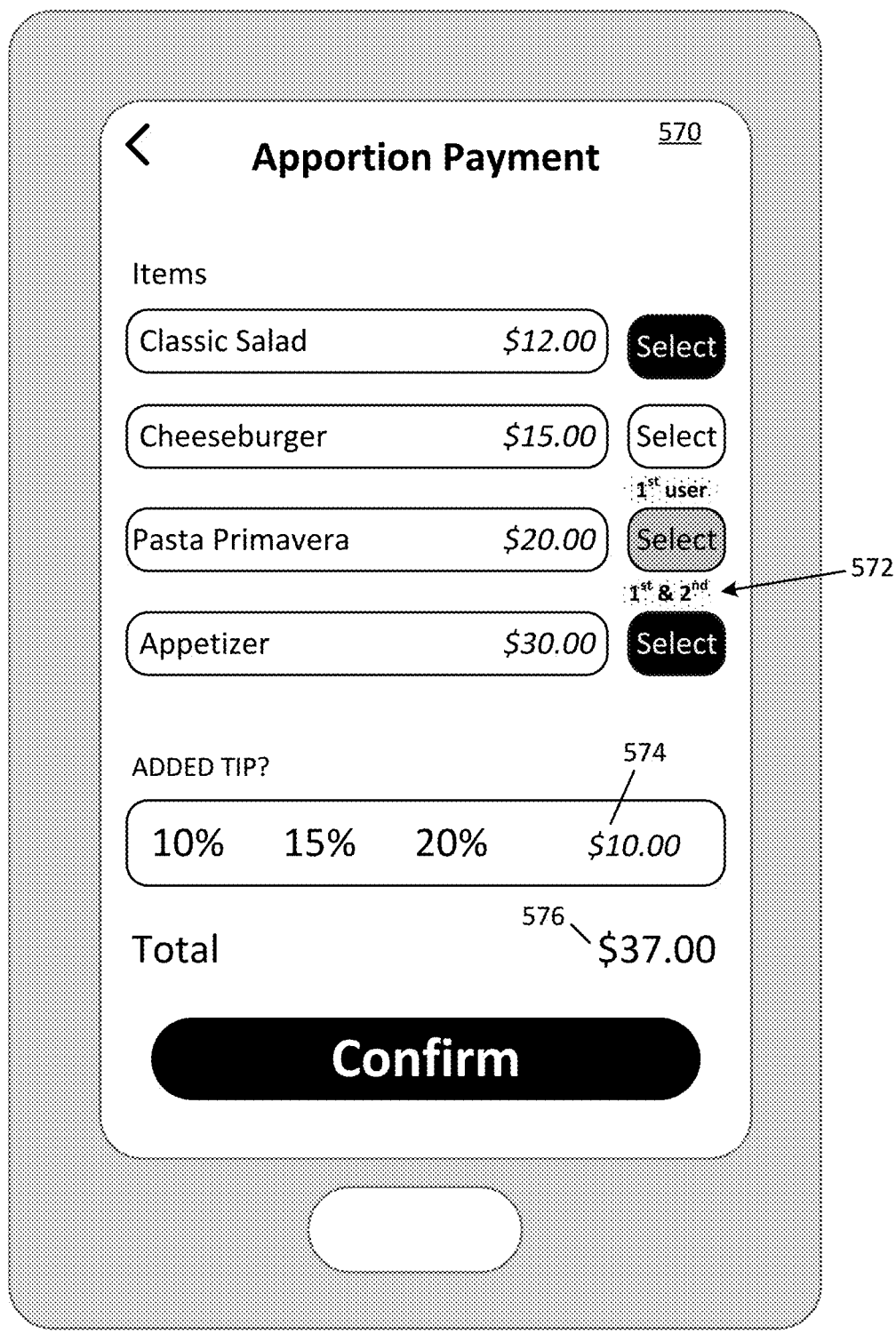

FIG. 5G illustrates a graphical user interface 570 shown on the second customer device associated with the second customer, in accordance with one example embodiment.

GUI 570 may be displayed on the second customer device after the second user has selected items for payment (e.g., using GUI 550). In the depicted example, payment service provided an annotation 572 to indicate that the Appetizer was selected by both the first customer and the second customer. The payment service has also determined that the cost of the Appetizer should be apportioned between the first and second customers. Accordingly, the GUI 570 indicates that a total amount 576 owed by the second customer is $37, which includes the cost of the Classic Salad, half the cost of the Appetizer, and a tip 574. The second user chose to enter the tip 574 manually in this example, such that the amount of the tip 574 is not a percentage of the cost of the selected items and does not change when item selections are changed.

Figure 5H:
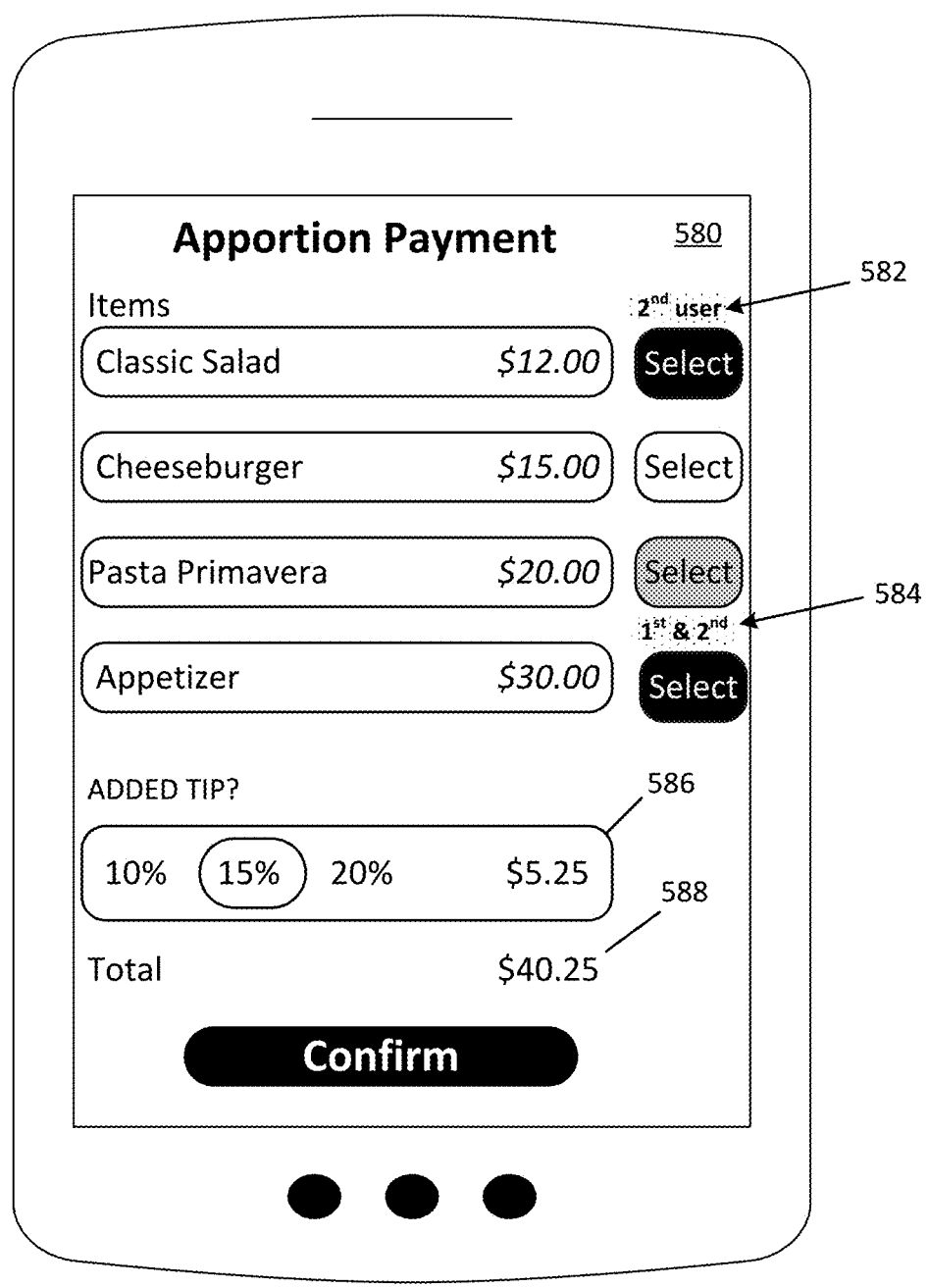

FIG. 5H illustrates a graphical user interface 580 shown on the first customer device associated with the first customer, in accordance with one example embodiment. GUI 580 may be displayed on the first customer device after the second user has selected items for payment (e.g., using GUI 550). GUI 580 includes annotations 582 and 584 to identify items selected by the second customer. Because the second customer chose to share the cost of the Appetizer with the first customer, the payment service reduced the first customer's cost of the appetizer by $15.00. This change in the cost of the Appetizer also reduces a tip amount 586 from $7.50 (as shown in FIG. 5E) to $5.25, such that a total amount 588 owed by the first customer is reduced to $40.25. Advantageously, the payment service can intelligently determine and adjust the amounts that are owed by individual customers as the customers select items for payment or otherwise collaborate on the payment.

Figure 5I:
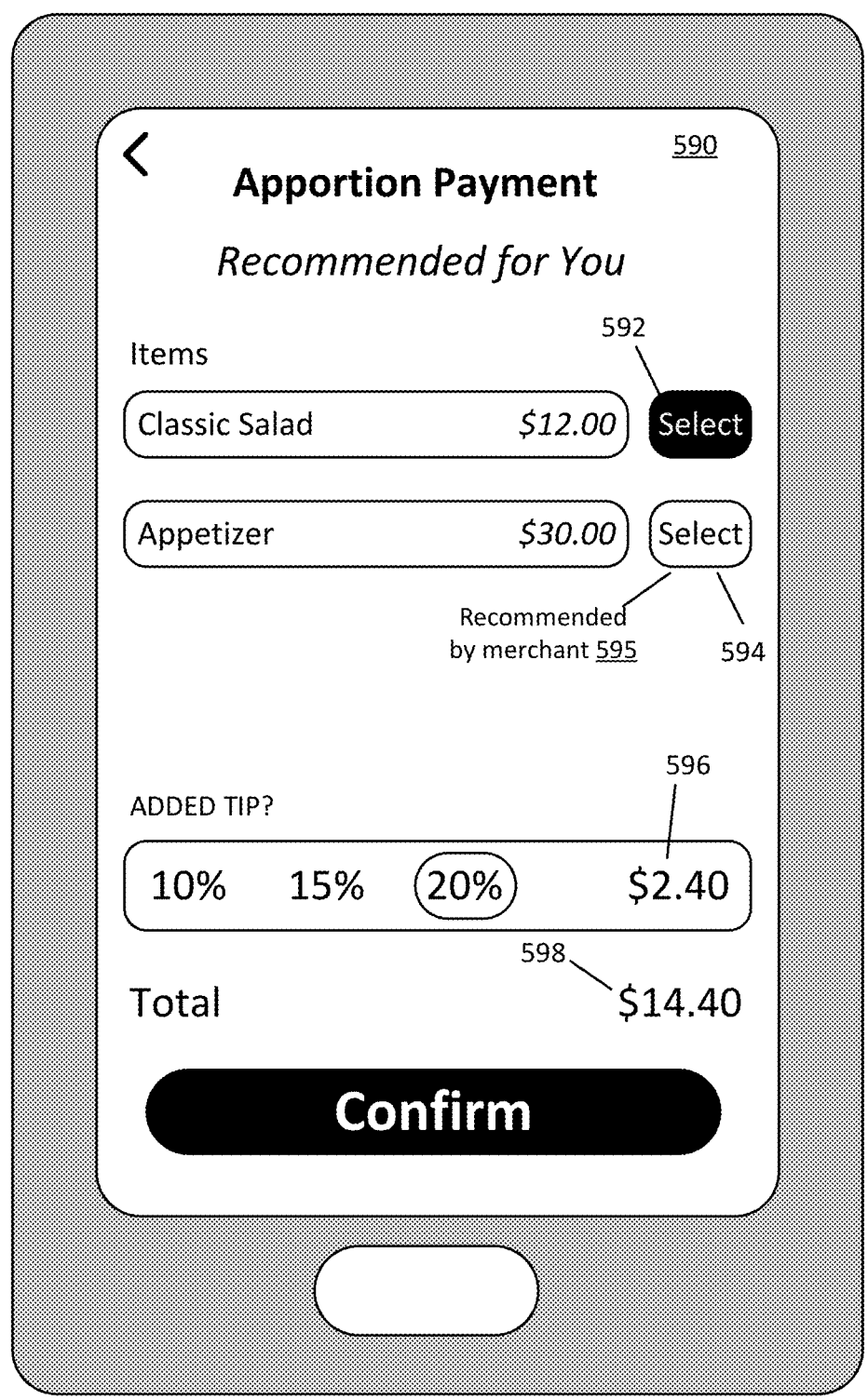

FIG. 5I illustrates a graphical user interface 590 displayed on the second customer device associated with the second customer, in accordance with another example embodiment. Compared to GUI 550 in FIG. 5F, GUI 590 shows a customized or personalized listing of items specific to the second customer. The personalized listing can be determined based on context data or through use of machine learning, as described herein. As highlighted at 595 of FIG. 5I, one or more of the items presented to and selected by the second customer can be recommended using machine learning or other technique. For example, an item relevant to the second customer can be recommended based on one or more machine learning models that are trained using data related to historical transactions of the second customer, other users, or the like, historical data indicating how the second customer, other users, or the like previously apportioned transactions, transaction times, locations of transactions, and the like. For example, historical transaction data can indicate that the second customer usually orders a salad or sandwich for lunch at this restaurant or similar restaurants. As such, the payment service can predict that the second customer ordered a salad. The historical transaction data can also indicate that the second customer often shares an appetizer with other customers. Accordingly, the personalized listing includes only the salad and appetizer in this example (e.g., as opposed to the full listing in GUI 550). As shown in GUI 590, the second customer may select 592 only the salad and a tip 596, which are summed to an amount in 598. If the second customer also selects the appetizer 594, the cost of the appetizer 594 can be apportioned to the second customer or other customers, as described herein and shown in FIGS. 5D-5I.

The GUIs described above with reference to FIGS. 5A-5I are non-limiting examples of GUIs that can be presented to facilitate techniques described herein. It should be appreciated that different configurations or different data can be presented via the GUIs. "Buttons," "controls," or other user interface elements referenced herein can be any type of user interface element. In some examples, such user interface elements can be interactable such that interaction therewith can provide an input.

Figure 6:
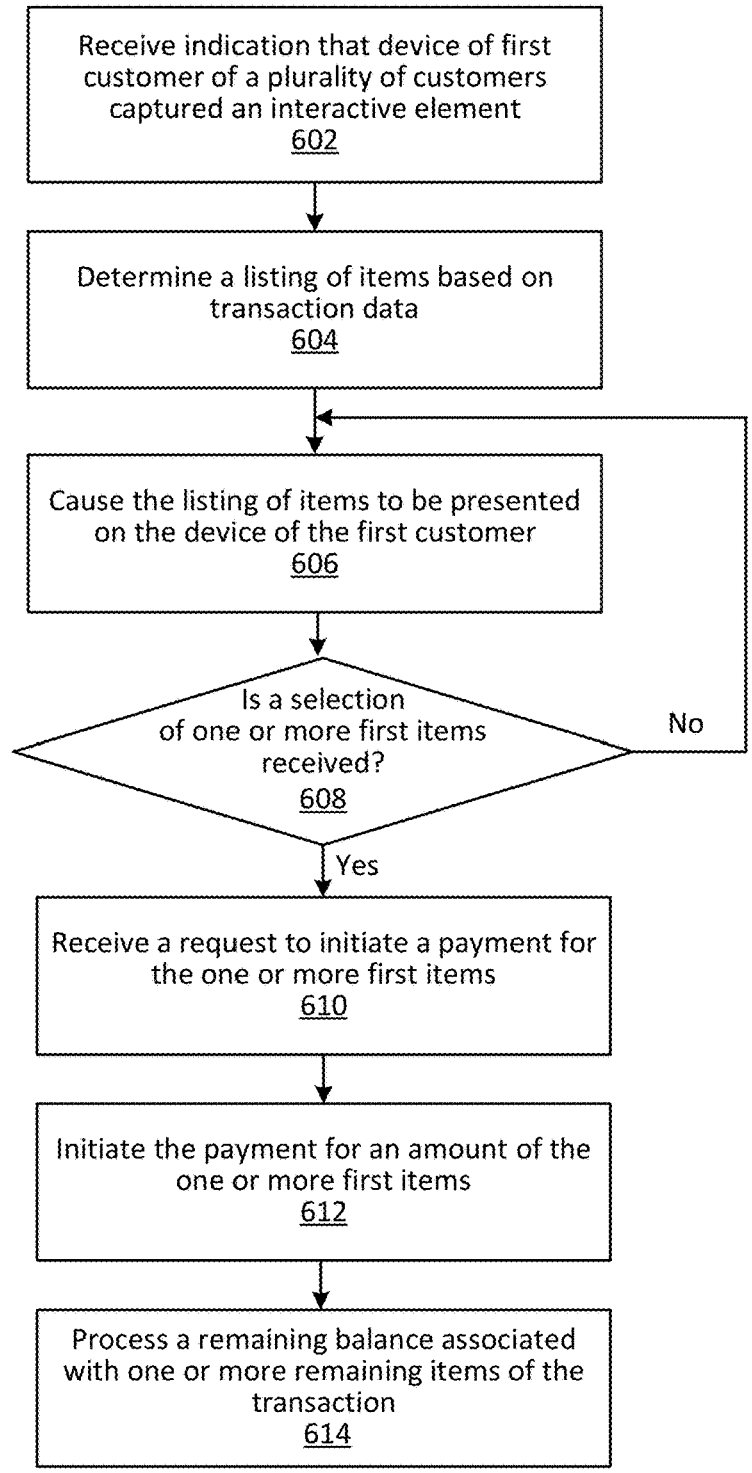
FIG. 6 is a flow chart of a method of apportioning a payment for a transaction among multiple customers according to one example described herein.

FIG. 6 is a flow chart 600 of a method of apportioning a payment for a transaction among multiple customers, in accordance with one example embodiment. A person skilled in the relevant art will recognize that the operations in flow chart 600 may be re-ordered or modified without parting from the spirit and scope of the present technology. That is, one or more of the steps can be optionally performed or performed in a different order than shown.

In step 602, a payment service receives an indication that a device of a first customer of a plurality of customers interacted with an interactive element associated with a transaction. The interactive element can be or include a QR code, barcode, radio frequency identification (RFID) tag, or other transaction code, encoded with data as described herein. In step 604, the payment service determines a listing of items based at least in part on transaction data associated with the transaction. In one example, the listing of items includes each item purchased by the plurality of customers in the transaction. In another example, the listing of items includes a subset of items specific to the first customer. In such a case, determining the listing of items can include identifying the subset of items based on data associated with the first customer, and context data associated with the interaction, as described herein. The payment service can surface the subset of items that is specific to the first customer. The subset of items can be or include the one or more first items.

In response to receiving the indication, in step 606, the payment service may cause the listing of items, which can be determined using machine learning model(s) or the like, to be presented via a user interface of a payment application executable by the device of the first customer. In some examples, the listing of items includes one or more of the items relevant to the first customer that are recommended by a machine learning model. For example, an item relevant to the first user can be recommended based on one or more machine learning models that are trained as described above.

In some examples, an interaction with an interactive element can cause a respective instance of a payment application to open. In some examples, the payment application can be operating in the background of the corresponding customer device such that interaction with an interactive element can cause the payment application to transition to the foreground. In some examples, if a customer interacts with the interactive element and does not have an account with the payment service, the payment service can determine such (e.g., by determining that the device identifier of the customer device or the like does not match or otherwise correspond with a user account) and initiate an onboarding process to open a new account for the customer. In some examples, the onboarding process can prompt the customer to download the payment application or can be initiated via a web browser or instant application.

In step 608, the payment service determines if a selection of one or more first items has been received from the first user via the user interface. If no such selection has been received, the method 600 can return to step 606, to wait for the first customer's selection. In some examples, if the first customer does not provide item selections after a predetermined time (e.g., five or ten minutes), the payment service can determine how to allocate the selection/payment associated with the first customer. For example, the payment service can automatically select one or more first items for the first customer (e.g., based on a machine learning model) and send the selections to the first customer. Alternatively or additionally, the payment service can treat the items that were not selected by the first customer as unclaimed items and can assign the cost of the unclaimed items to the rest of the customers associated with the transaction. Otherwise, in step 610, after the selection of the one or more first items has been received, the payment service may receive a request to initiate a payment for the one or more first items. In step 612, the payment service initiates the payment for a cost of the one or more first items using funds associated with an account of the first customer.

In step 614, the payment service processes a remaining balance associated with one or more remaining items from the transaction. For instance, a second customer of the plurality of customers may select one or more second items, and the payment service can initiate a payment for an amount of the one or more second items using funds associated with an account of the second customer. The payment service may determine whether there is an overlap between the first items and second items and, if so, can adjust the cost of the one or more first items for the first customer. If there is an unclaimed item after each of the plurality of customers has made their item selections, the payment service can distribute the cost of the unclaimed items to one or more of the customers. Such distribution can occur before or after payment has been processed for one or more of the customers. If payments have already been made, one or more additional payments can be made to cover the cost of the unclaimed items. Additionally or alternatively, in some examples, one customer can select items for payment by another customer. For example, the user interface on a customer device can allow a customer to select items for multiple customers, such that each customer can be assigned to pay for a different item or combination of items.

In some examples, instead of having multiple customers join or actively participate in the payment apportioning process (e.g., using the payment application executing on their customer devices), one customer can take the lead (e.g., as a primary user or control user) and assign transaction items to the customers involved in the transaction. For example, as shown in FIG. 5D above, a first customer be identified as a control user. The first customer can select his/her own item(s) and select other items for other users. The item selection and corresponding costs can be presented to other customers to obtain their approvals and allocate the items accordingly. If one or more other users do not agree with the original allocation plan, the first customer can adjust the payment apportioning, as needed.

Figure 7:
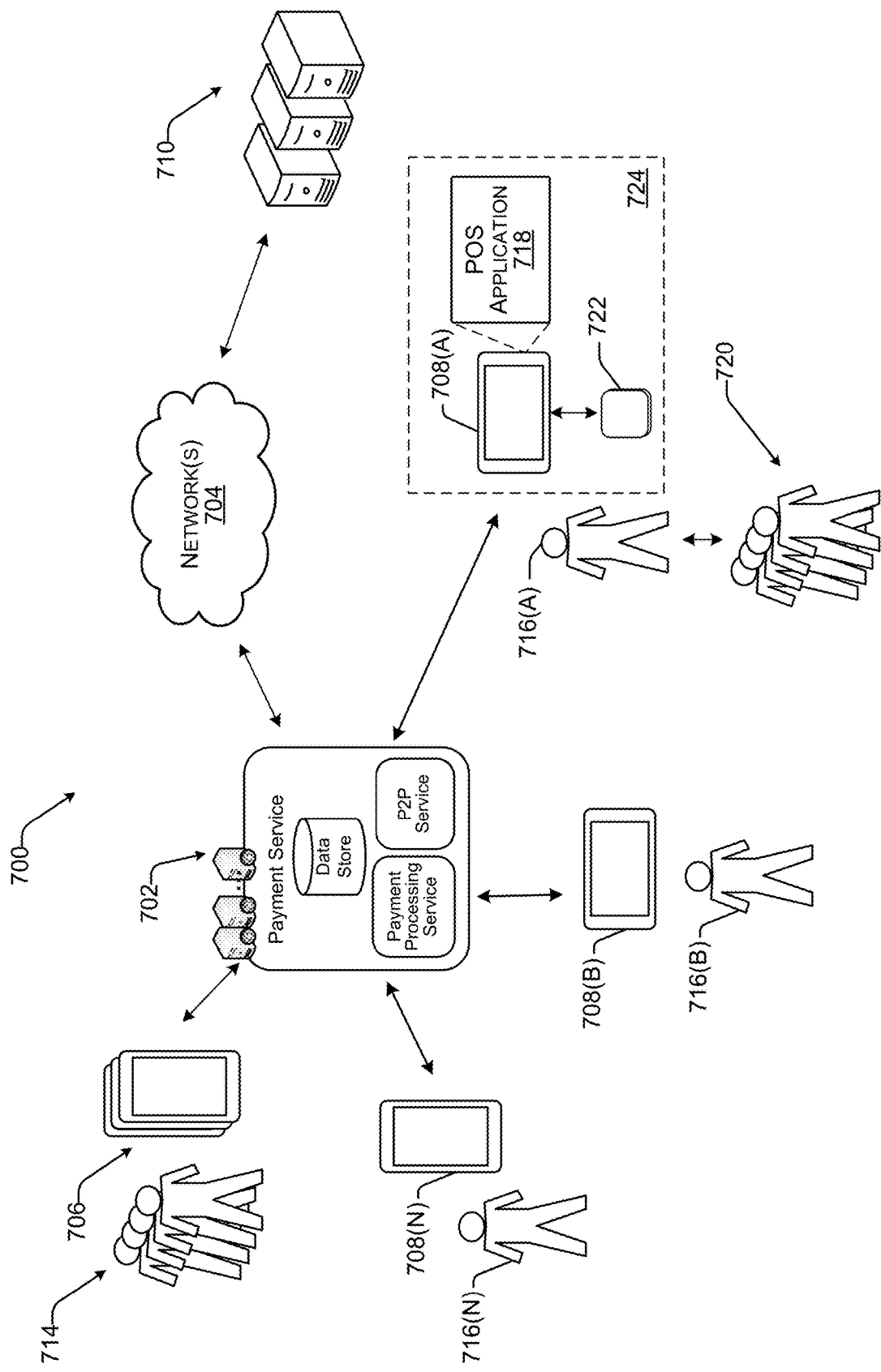
FIG. 7 is a schematic diagram of an environment for apportioning items in a transaction according to one example described herein.

FIG. 7 illustrates an example environment 700 for apportioning items in a transaction between or among customers via detected interactions with interactive elements. The environment 700 includes server(s) 702 that can communicate over a network 704 (e.g., corresponding to network 110) with user devices 706 (which, in some examples can be merchant devices 708 (individually, 708(A)-708(N))) and/or server(s) 710 associated with third-party service provider(s). The server(s) 702 can be associated with a service provider (e.g., corresponding to payment service 108) that can provide one or more services for the benefit of users 714 (e.g., including merchant 102 and customers 104 and 156), as described below. Actions attributed to the service provider can be performed by the server(s) 702.

The environment 700 can include a plurality of user devices 706 (e.g., including customer devices 103 and 158 or merchant device 105), as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

As described above, in at least one example, the users 714 can include merchants 716 (individually, 716(A)-716(N)) (e.g., including merchant 102). In an example, the merchants 716 can operate respective merchant devices 708 (e.g., including merchant device 105), which can be user devices 706 configured for use by merchants 716. For the purpose of this discussion, a "merchant" can be any entity that offers items (e.g., goods or services) for purchase or other means of acquisition (e.g., rent, borrow, barter, etc.). The merchants 716 can offer items for purchase or other means of acquisition via brick-and-mortar stores, mobile stores (e.g., pop-up shops, food trucks, etc.), online stores, combinations of the foregoing, and so forth. In some examples, at least some of the merchants 716 can be associated with a same entity but can have different merchant locations and/or can have franchise/franchisee relationships. In additional or alternative examples, the merchants 716 can be different merchants. That is, in at least one example, the merchant 716(A) is a different merchant than the merchant 716(B) and/or the merchant 716(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 708 can have an instance of a POS application 718 (e.g., merchant application 182) stored thereon. The POS application 718 can configure the merchant device 708 as a POS terminal, which enables the merchant 716(A) to interact with one or more customers 720 (e.g., including customers 104 and 156). As described above, the users 714 can include customers, such as the customers 720 shown as interacting with the merchant 716(A). For the purpose of this discussion, a "customer" can be any entity that acquires items from merchants. While only two customers 720 are illustrated in FIG. 7, any number of customers 720 can interact with the merchants 716. Further, while FIG. 7 illustrates the customers 720 interacting with the merchant 716(A), the customers 720 can interact with any of the merchants 716.

In at least one example, interactions between the customers 720 and the merchants 716 that involve the exchange of funds (from the customers 720) for items (from the merchants 716) can be referred to as "transactions." In at least one example, the POS application 718 can determine transaction data associated with the POS transactions. Transaction data can include payment information, which can be obtained from a reader device 722 (e.g., corresponding to reader device 164) associated with the merchant device 708(A), user authentication data, purchase amount information, point-of-purchase information (e.g., item(s) purchased, date of purchase, time of purchase, etc.), etc. The POS application 718 can send transaction data to the server(s) 702 such that the server(s) 702 can track transactions of the customers 720, merchants 716, and/or any of the users 714 over time. Furthermore, the POS application 718 can present a UI to enable the merchant 716(A) to interact with the POS application 718 and/or the service provider via the POS application 718.

In at least one example, the merchant device 708(A) can be a special-purpose computing device configured as a POS terminal (via the execution of the POS application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the merchant device 708(A), such as a microphone port, a headphone port, an audio-jack, a data port, or other suitable port. In additional or alternative examples, the reader device 722 can be coupled to the merchant device 708(A) via another wired or wireless connection, such as via a Bluetooth®, BLE, and so on. Additional details are described below with reference to FIG. 10. In some examples, the reader device 722 can read information from alternative payment instruments including, but not limited to, wristbands and the like.

In some examples, the reader device 722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710 (e.g., for payment card network 140), as described below. In this manner, the POS terminal and reader device 722 may collectively process transaction(s) between the merchants 716 and customers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the customers 720. In additional or alternative examples, the POS terminal can have a display integrated therein for presenting information to the customers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a customer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a customer 720 slides a card, or other payment instrument, having a magnetic strip through a reader device 722 that captures payment data contained in the magnetic strip. A dip is a card-present transaction where a customer 720 inserts a payment instrument having an embedded microchip (i.e., chip) into a reader device 722 first. The dipped payment instrument remains in the payment reader until the reader device 722 prompts the customer 720 to remove the card, or other payment instrument. While the payment instrument is in the reader device 722, the microchip can create a one-time code which is sent from the POS system 724 to the server(s) 710 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 720 may tap or hover his or her payment instrument (e.g., card, electronic device such as a smart phone running a payment application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 724, the server(s) 702, and/or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s) 704. The server(s) 702 may send the transaction data to the server(s) 710. As described above, in at least one example, the server(s) 710 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 710 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 710 associated therewith), and a payment authorization message is communicated from the issuer to the POS device via a path opposite of that described above, or via an alternate path.

As described above, the server(s) 710, which can be associated with payment service provider(s), may determine whether the transaction is authorized based on the transaction data, as well as information relating to parties to the transaction (e.g., the customer 720 and/or the merchant 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a merchant application and/or other functional components for communicating with the POS system 724 and/or the server(s) 710 to authorize or decline transactions.

Based on the authentication notification that is received by the POS system 724 from server(s) 702, the merchant 716(A) may indicate to the customer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the merchants 716 via the POS application 718. In additional or alternative examples, each service can be associated with its own access point (e.g., application, web browser, etc.).

The service provider can offer payment processing services for processing payments on behalf of the merchants 716, as described above. For example, the service provider can provision payment processing software, payment processing hardware and/or payment processing services to merchants 716, as described above, to enable the merchants 716 to receive payments from the customers 720 when conducting POS transactions with the customers 720. For instance, the service provider can enable the merchants 716 to receive cash payments, payment card payments, and/or electronic payments from customers 720 for POS transactions and the service provider can process transactions on behalf of the merchants 716.

As the service provider processes transactions on behalf of the merchants 716, the service provider can maintain accounts or balances for the merchants 716 in one or more ledgers. For example, the service provider can analyze transaction data received for a transaction to determine an amount of funds owed to a merchant 716(A) for the transaction. In at least one example, such an amount can be a total purchase price less fees charged by the service provider for providing the payment processing services. Based on determining the amount of funds owed to the merchant 716(A), the service provider can deposit funds into an account of the merchant 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 716(A) to a bank account of the merchant 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the merchant 716(A) can access funds prior to a scheduled deposit. For instance, the merchant 716(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 716(A) can have a payment instrument that is linked to the stored balance that enables the merchant to access the funds without first transferring the funds from the account managed by the service provider to the bank account of the merchant 716(A).

In at least one example, the service provider may provide inventory management services. That is, the service provider may provide inventory tracking and reporting. Inventory management services may enable the merchant 716(A) to access and manage a database storing data associated with a quantity of each item that the merchant 716(A) has available (i.e., an inventory). Furthermore, in at least one example, the service provider can provide catalog management services to enable the merchant 716(A) to maintain a catalog, which can be a database storing data associated with items that the merchant 716(A) has available for acquisition (i.e., catalog management services). In at least one example, the catalog may include a plurality of data items and a data item of the plurality of data items may represent an item that the merchant 716(A) has available for acquisition. The service provider can offer recommendations related to pricing of the items, placement of items on the catalog, and multi-party fulfilment of the inventory.

In at least one example, the service provider can provide business banking services, which allow the merchant 716(A) to track deposits (from payment processing and/or other sources of funds) into an account of the merchant 716(A), payroll payments from the account (e.g., payments to employees of the merchant 716(A)), payments to other merchants (e.g., business-to-business) directly from the account or from a linked debit card, withdrawals made via scheduled deposit and/or instant deposit, etc. Furthermore, the business banking services can enable the merchant 716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 716. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 712 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 714 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 716. In at least one example, the service provider can recommend and/or generate content items to supplement omni-channel presences of the merchants 716. That is, if a merchant of the merchants 716 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 714 to set schedules for scheduling appointments and/or users 714 to schedule appointments.

In some examples, the service provider can provide restaurant management services to enable users 714 to make and/or manage reservations, to monitor front-of-house and/or back-of-house operations, and so on. In such examples, the merchant device(s) 708 and/or server(s) 702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein.

In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server (s) 710). That is, the service provider can offer IDV services to verify the identity of users 714 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 714 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) and/or the server(s) 710 via the network(s) 704. In some examples, the merchant device(s) 708 are not capable of connecting with the service provider (e.g., the server(s) 702) and/or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the merchant device(s) 708) and/or the server(s) 702 until connectivity is restored and the payment data can be transmitted to the server(s) 702 and/or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with one or more server computing devices 702 of the service provider. That is, techniques described herein are directed to a specific implementation—or, a practical application—of utilizing a distributed system of user devices 706 that are in communication with one or more server computing devices 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
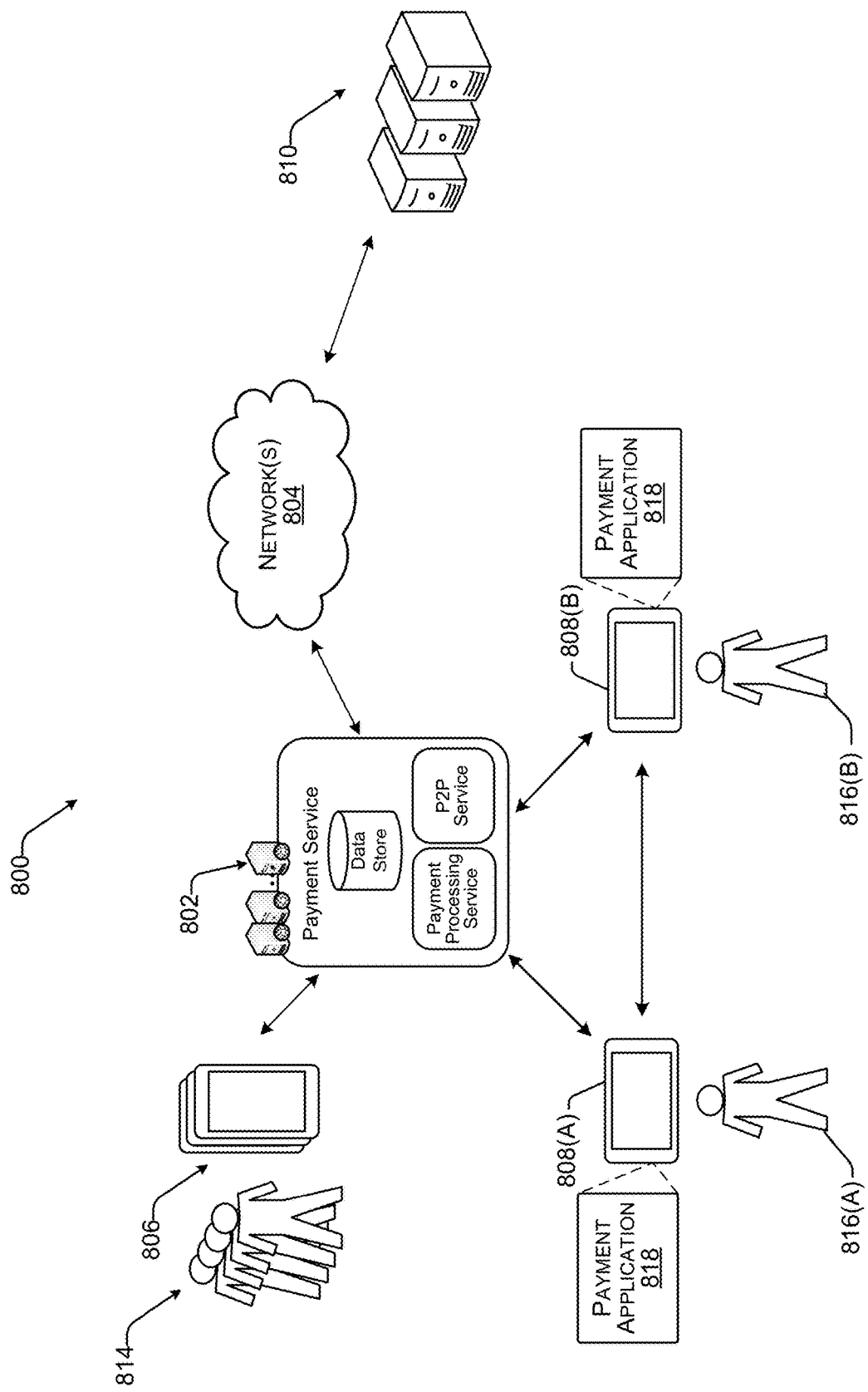
FIG. 8 is a schematic diagram of an environment for apportioning items in a transaction according to one example described herein.

FIG. 8 illustrates an example environment 800 for apportioning items in a transaction between or among customers via detected interactions with interactive elements. The environment 800 includes server(s) 802 that can communicate over a network 804 (e.g., corresponding to the network 110) with user devices 806 (which, in some examples can be user devices 808 (individually, 808(A), 808(B)) and/or server(s) 810 associated with third-party service provider(s) (e.g., the card payment network 140). The server(s) 802 can be associated with a service provider (e.g., for payment service 108) that can provide one or more services for the benefit of users 814 (e.g., including merchant 102 and customers 104 and 156), as described below. Actions attributed to the service provider can be performed by the server(s) 802. In some examples, the service provider referenced in FIG. 7 can be the same or different than the service provider referenced in FIG. 8.

The environment 800 can include a plurality of user devices 806 (e.g., including customer devices 103 and 158 or merchant device 105), as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment application 818 (or other access point) (e.g., payment application 120) installed on devices 806 configured for operation by users 814. In an example, an instance of the payment application 818 executing on a first device 808(A) operated by a payor (e.g., user 816(A)) can send a request to the service provider to transfer an asset (e.g., fiat currency, non-fiat currency, cryptocurrency, securities, gift cards, and/or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 9:
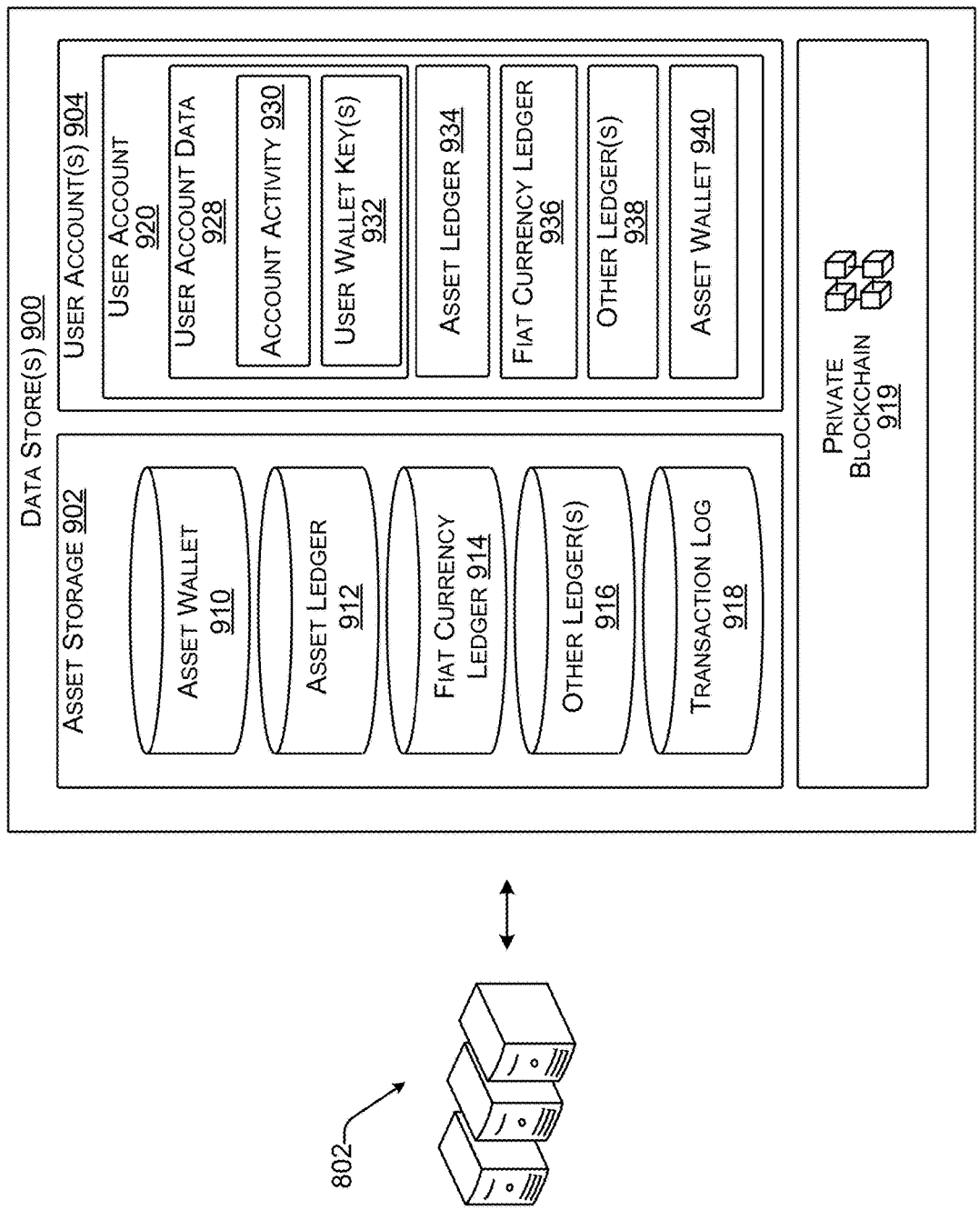
FIG. 9 is a schematic diagram of a data store according to one example described herein.

In some examples, the service provider can utilize a ledger system to track transfers of assets between users 814. FIG. 9, below, provides additional details associated with such a ledger system. The ledger system can enable users 814 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment application 818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 818 executing on the user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 806 (e.g., mobile device or conventional personal computer (PC)) based on instructions transmitted to and from the server(s) 802 (which, in such an example can be called a "messaging server"). In some instances, the messaging application can include a payment application with messaging capability that enables users of the payment application to communicate with one another. In such instances, the payment application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 814 to transfer fiat currency, non-fiat currency, cryptocurrency, securities, or other assets, or portions thereof, to other users 814. In at least one example, individual users can be associated with user accounts. Additional details associated with user accounts and the transfer of assets between users 814 are described below with reference to FIG. 9.

Furthermore, the service provider of FIG. 8 can enable users 814 to perform banking transactions via instances of the payment application 818. For example, users can configure direct deposits or other deposits for adding assets to their various ledgers/balances. Further, users 814 can configure bill pay, recurring payments, and/or the like using assets associated with their accounts. In addition to sending and/or receiving assets via peer-to-peer transactions, users 814 buy and/or sell assets via asset networks such as cryptocurrency networks, securities networks, and/or the like.

FIG. 9 illustrates example data store(s) 900 that can be associated with the server(s) 802. Data store 900 can be or include data store 128.

In at least one example, the data store(s) 900 can store assets in an asset storage 902, as well as data in user account(s) 904, merchant account(s), and/or customer account(s). In at least one example, the asset storage 902 can be used to store assets managed by the service provider of FIG. 8. In at least one example, the asset storage 902 can be used to record whether individual of the assets are registered to users. For example, the asset storage 902 can include an asset wallet 910 for storing records of assets owned by the service provider of FIG. 8, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 810 can be associated therewith. In some examples, the asset wallet 910 can communication with the asset network via one or more components associated with the server(s) 802.

The asset wallet 910 can be associated with one or more addresses and can vary addresses used to acquire assets (e.g., from the asset network(s)) so that its holdings are represented under a variety of addresses on the asset network. In examples where the service provider of FIG. 8 has its own holdings of cryptocurrency (e.g., in the asset wallet 910), a user can acquire cryptocurrency directly from the service provider of FIG. 8. In some examples, the service provider of FIG. 8 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 902 may contain ledgers that store records of assignments of assets to users 814. Specifically, the asset storage 902 may include asset ledger 910, fiat currency ledger 914, and other ledger(s) 916, which can be used to record transfers of assets between users 814 of the service provider and/or one or more third-parties (e.g., merchant network(s), payment card network(s), ACH network(s), equities network(s), the asset network, securities networks, etc.). In doing so, the asset storage 902 can maintain a running balance of assets managed by the service provider of FIG. 8. The ledger(s) of the asset storage 902 can further indicate some of the running balance for each of the ledger(s) stored in the asset storage 902 is assigned or registered to one or more user account(s) 904.

In at least one example, the asset storage 902 can include transaction logs 918, which can include records of past transactions involving the service provider of FIG. 8. In at least one example, transaction data, as described herein, can be stored in association with the transaction logs 918.

In some examples, the data store(s) 900 can store a private blockchain 919. A private blockchain 919 can function to record sender addresses, recipient addresses, public keys, values of cryptocurrency transferred, and/or can be used to verify ownership of cryptocurrency tokens to be transferred. In some examples, the service provider of FIG. 8 can record transactions taking place within the service provider of FIG. 8 involving cryptocurrency until the number of transactions has exceeded a determined limit (e.g., number of transactions, storage space allocation, etc.). Based at least in part on determining that the limit has been reached, the service provider of FIG. 8 can publish the transactions in the private blockchain 919 to a public blockchain (e.g., associated with the asset network), where miners can verify the transactions and record the transactions to blocks on the public blockchain. In at least one example, the service provider of FIG. 8 can participate as miner(s) at least for its transactions to be posted to the public blockchain.

In at least one example, the data store(s) 900 can store and/or manage accounts, such as user account(s) 904, merchant account(s), and/or customer account(s). In at least one example, the user account(s) 904 may store records of user accounts associated with the users 814. In at least one example, the user account(s) 904 can include a user account 920, which can be associated with a user (of the users 814). Other user accounts of the user account(s) 904 can be similarly structured to the user account 920, according to some examples. In other examples, other user accounts may include more or less data and/or account information than that provided by the user account 920. In at least one example, the user account 920 can include user account data 928, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 928 can include account activity 930 and user wallet key(s) 932. The account activity 930 may include a transaction log for recording transactions associated with the user account 920. In some examples, the user wallet key(s) 932 can include a public-private key-pair and a respective address associated with the asset network or other asset networks. In some examples, the user wallet key(s) 932 may include one or more key pairs, which can be unique to the asset network or other asset networks.

In addition to the user account data 928, the user account 920 can include ledger(s) for account(s) managed by the service provider of FIG. 8, for the user. For example, the user account 920 may include an asset ledger 934, a fiat currency ledger 936, and/or one or more other ledgers 938. The ledger(s) can indicate that a corresponding user utilizes the service provider of FIG. 8 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 8.

In some examples, the asset ledger 934 can store a balance for each of one or more cryptocurrencies (e.g., Bitcoin, Ethereum, Litecoin, etc.) registered to the user account 920. In at least one example, the asset ledger 934 can further record transactions of cryptocurrency assets associated with the user account 920. For example, the user account 920 can receive cryptocurrency from the asset network using the user wallet key(s) 932. In some examples, the user wallet key(s) 932 may be generated for the user upon request. User wallet key(s) 932 can be requested by the user in order to send, exchange, or otherwise control the balance of cryptocurrency held by the service provider of FIG. 8 (e.g., in the asset wallet 910) and registered to the user. In some examples, the user wallet key(s) 932 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 8 and the value is credited as a balance in asset ledger 934), by purchasing currency in the form associated with the account using currency in a different form (e.g., buying a value of cryptocurrency from the service provider of FIG. 8 using a value of fiat currency reflected in fiat currency ledger 206, and crediting the value of cryptocurrency in asset ledger 934), or by conducting a transaction with another user (customer or merchant) of the service provider of FIG. 8 wherein the account receives incoming currency (which can be in the form associated with the account or a different form, in which the incoming currency may be converted to the form associated with the account). In some examples, the user account data 928 can include preferences for maintaining balances of individual of the ledgers. For example, the service provider of FIG. 8 can automatically debit the fiat currency ledger 936 to increase the asset ledger 934, or another account associated with the user whenever the cryptocurrency balance (e.g., of the asset ledger 934) falls below a stated level (e.g., a threshold). Conversely, in some embodiments, the service provider of FIG. 8 can automatically credit the fiat currency ledger 936 to decrease the asset ledger 934 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 8 (i.e., an external account). In at least one example, the user can transfer all or a portion of a balance of the cryptocurrency stored in the third-party cryptocurrency wallet to the service provider of FIG. 8. Such a transaction can require the user to transfer an amount of the cryptocurrency in a message signed by user's private key to an address provided by the service provider of FIG. 8. In at least one example, the transaction can be sent to miners to bundle the transaction into a block of transactions and to verify the authenticity of the transactions in the block. Once a miner has verified the block, the block is written to a public, distributed blockchain where the service provider of FIG. 8 can then verify that the transaction has been confirmed and can credit the user's asset ledger 934 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 8. As described above, in some examples, the service provider of FIG. 8 can acquire cryptocurrency from a third-party source (e.g., associated with the third-party server(s) 118). In such examples, the asset wallet 910 can be associated with different addresses and can vary addresses used to acquire cryptocurrency so that its holdings are represented under a variety of addresses on a blockchain. When the service provider of FIG. 8 has their own holdings of cryptocurrency, users can acquire cryptocurrency directly from the service provider of FIG. 8. In some examples, the service provider of FIG. 8 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 8 has its own cryptocurrency assets, cryptocurrency transferred in a transaction (e.g., data with address provided for receipt of transaction and a balance of cryptocurrency transferred in the transaction) can be stored in the asset wallet 910. In at least one example, the service provider of FIG. 8 can credit the asset ledger 934 of the user. Additionally, while the service provider of FIG. 8 recognizes that the user retains the value of the transferred cryptocurrency through crediting the asset ledger 934, any person that inspects the blockchain will see the cryptocurrency as having been transferred to the service provider of FIG. 8. In some examples, the asset wallet 910 can be associated with many different addresses. In such examples, any person that inspects the blockchain may not easily associate all cryptocurrency stored in asset wallet 910 as belonging to the same entity. It is this presence of a private ledger that is used for real-time transactions and maintained by the service provider of FIG. 8, combined with updates to the public ledger at other times, that allows for extremely fast transactions using cryptocurrency to be achieved. In some examples, the "private ledger" can refer to the asset ledger 910, which in some examples, can utilize the private blockchain 919, as described herein. The "public ledger" can correspond to a public blockchain associated with the asset network.

In at least one example, a user's asset ledger 934, fiat currency ledger 936, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 934. In some examples, a user can receive fiat currency or another currency in the form of payment for a transaction with another user. In at least one example, at least a portion of such funds can be converted into cryptocurrency by the service provider of FIG. 8 and used to fund the asset ledger 934 of the user.

As addressed above, in some examples, users can also have other accounts maintained by the service provider of FIG. 8. For example, a user can also have an account in U.S. dollars, which can be tracked, for example, via the fiat currency ledger 936. Such an account can be funded by transferring money from a bank account at a third-party bank to an account maintained by the service provider of FIG. 8 as is conventionally known. In some examples, a user can receive fiat currency in the form of payment for a transaction with another user. In such examples, at least a portion of such funds can be used to fund the fiat currency ledger 936.

In some examples, a user can have one or more internal payment cards registered with the service provider of FIG. 8. Internal payment cards can be linked to one or more of the accounts associated with the user account 920. In some embodiments, options with respect to internal payment cards can be adjusted and managed using an application (e.g., the payment application 818).

In at least one example, as described above, each ledger can correspond to an account of the user that is managed by the service provider of FIG. 8. In at least one example, individual of the accounts can be associated with a wallet or a stored balance for use in payment transactions, peer-to-peer transactions, payroll payments, etc.

In at least one example, the user account 920 can be associated with a asset wallet 940. The asset wallet 940 of the user can be associated with account information that can be stored in the user account data 928 and, in some examples, can be associated with the user wallet key(s) 932. In at least one example, the asset wallet 940 can store data indicating an address provided for receipt of a cryptocurrency transaction. In at least one example, the balance of the asset wallet 940 can be based at least in part on a balance of the asset ledger 934. In at least one example, funds availed via the asset wallet 940 can be stored in the asset wallet 940 or the asset wallet 910. Funds availed via the asset wallet 910 can be tracked via the asset ledger 934. The asset wallet 940, however, can be associated with additional cryptocurrency funds.

In at least one example, when the service provider of FIG. 8 includes a private blockchain 919 for recording and validating cryptocurrency transactions, the asset wallet 940 can be used instead of, or in addition to, the asset ledger 934. For example, at least one example, a merchant can provide the address of the asset wallet 940 for receiving payments. In an example where a customer is paying in cryptocurrency and the customer has their own cryptocurrency wallet account associated with the service provider of FIG. 8, the customer can send a message signed by its private key including its wallet address (i.e., of the customer) and identifying the cryptocurrency and value to be transferred to the merchant's asset wallet 940. The service provider of FIG. 8 can complete the transaction by reducing the cryptocurrency balance in the customer's cryptocurrency wallet and increasing the cryptocurrency balance in the merchant's asset wallet 940. In addition to recording the transaction in the respective cryptocurrency wallets, the transaction can be recorded in the private blockchain 919 and the transaction can be confirmed. A user can perform a similar transaction with cryptocurrency in a peer-to-peer transaction as described above. In at least one example, the cryptocurrency wallet account 930 can be funded by a balance transfer from a third-party cryptocurrency wallet, as described above. Such a transaction can require a user to transfer an amount of cryptocurrency in a message signed by the user's private key to an address of the cryptocurrency wallet account 930. The transferred amount of cryptocurrency can then be within the cryptocurrency wallet account 930 for use in later transactions.

While the asset ledger 934 and/or asset wallet 940 are each described above with reference to cryptocurrency, the asset ledger 934 and/or asset wallet 940 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 8 is an aspect of the technology disclosed that enables technical advantages of increased processing speed and improved security.

Figure 10:
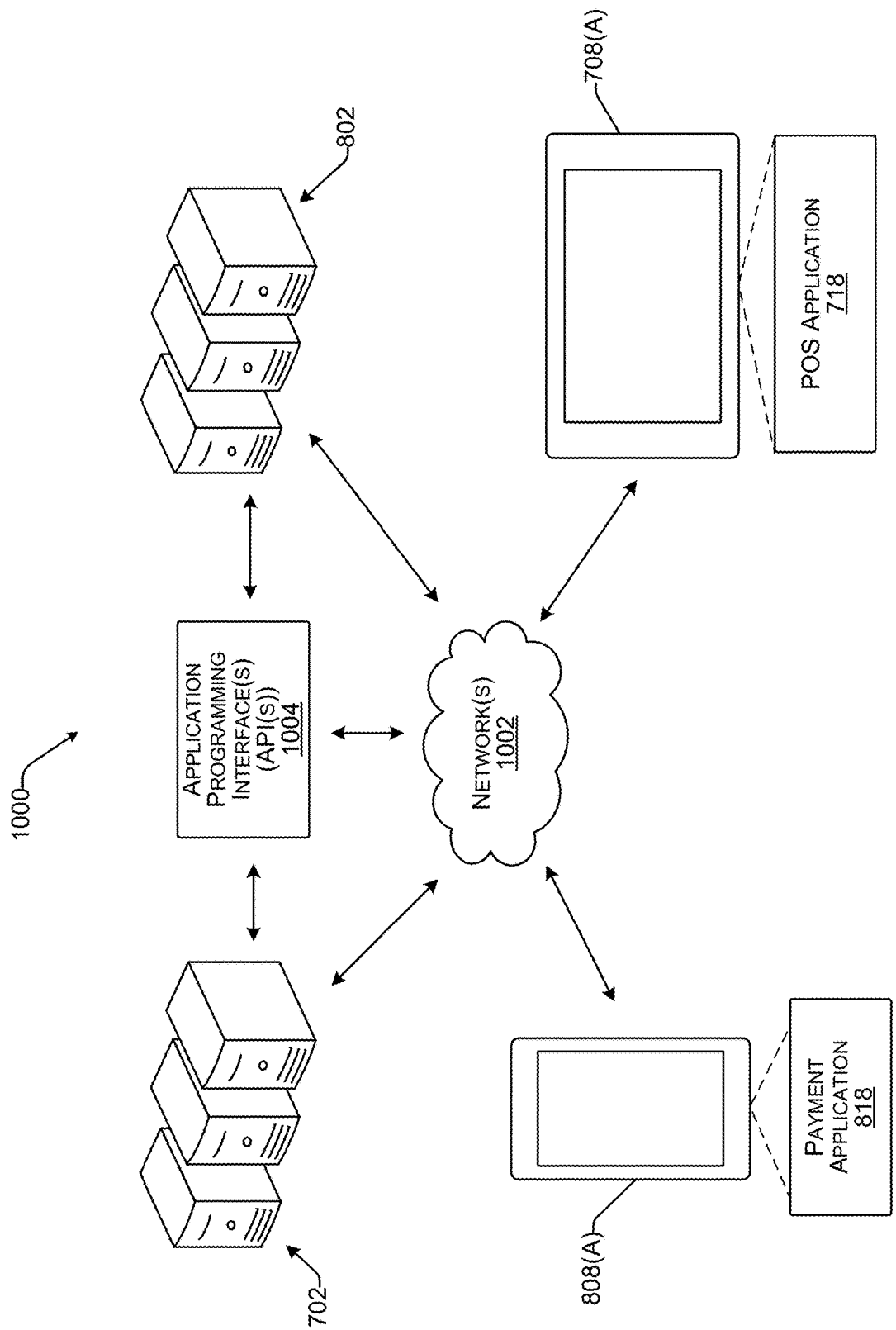
FIG. 10 is a schematic diagram of an environment for enabling payments at point-of-sale according to one example described herein.

FIG. 10 illustrates an example environment 1000 wherein the environment 700 and the environment 800 can be integrated to enable payments at the point-of-sale using assets associated with user accounts in the peer-to-peer environment of FIG. 8. As illustrated, each of the components can communicate with one another via one or more networks 1002. In some examples, one or more APIs 1004 or other functional components can be used to facilitate such communication.

In at least one example, the example environment 1000 can enable contactless payments, via integration of peer-to-peer payment, or other payment making, platform(s) and payment processing platform(s), are described herein. For the purpose of FIG. 10, the environment 700 can refer to a payment processing platform and the environment 800 can refer to a peer-to-peer payment, or payment making, platform. In an example, such an integration can enable a customer to participate in a transaction via their own computing device instead of interacting with a merchant device of a merchant, such as the merchant device 708(A). In such an example, the POS application 718, associated with a payment processing platform and executable by the merchant device 708(A) of the merchant, can present a Quick Response (QR) code, or other code or interactive element that can be used to identify a transaction (e.g., a transaction code), in association with a transaction between the customer and the merchant. The QR code, or other transaction code, can be provided to the POS application 718 via an API associated with the peer-to-peer payment platform. In an example, the customer can utilize their own computing device, such as the user device 808(A), to capture the QR code, or the other transaction code, and to provide an indication of the captured QR code, or other transaction code, to server(s) 702 and/or server(s) 802.

Based at least in part on the integration of the peer-to-peer payment platform and the payment processing platform (e.g., via the API), the server(s) 702 and/or 802 associated with each can exchange communications with each other— and with a payment application 818 associated with the peer-to-peer payment platform and/or the POS application 718—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 808(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 718 and the payment application 818, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 708(A) can present a QR code, or other transaction code, that can be associated with a peer-to-peer payment platform. The customer can use a camera associated with the user device 808(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 718 can cause a text message with a resource locator (e.g., uniform resource locator (URL)) that can be associated with a peer-to-peer payment platform to be sent to the user device 808(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 808(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 718 of a merchant device 708(A) at a brick-and-mortar store of a merchant to a payment application 818 of a user device 808(A) of a customer to enable the customer to participate in a transaction via their own computing device. For instance, in a "scan to pay" example as described above, based at least in part on capturing the QR code, or other transaction code, via the user device 808(A), the payment processing platform can provide transaction data to the peer-to-peer payment platform for presentation via the payment application 818 on the user device 808(A). In some examples, the customer can watch items being added to their cart (e.g., via a user interface presented via the payment application). As an item is added to a virtual cart by the merchant—via the POS application 718 on the merchant device 708(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 818 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 808(A) during or after payment of the transaction.

In some examples, based at least in part on capturing the QR code, or other transaction code, the payment processing platform can provide transaction data to the peer-to-peer payment platform for presentation via the payment application 818 on the computing device of the customer, such as the user device 808(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 818 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 718, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 818 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 11:
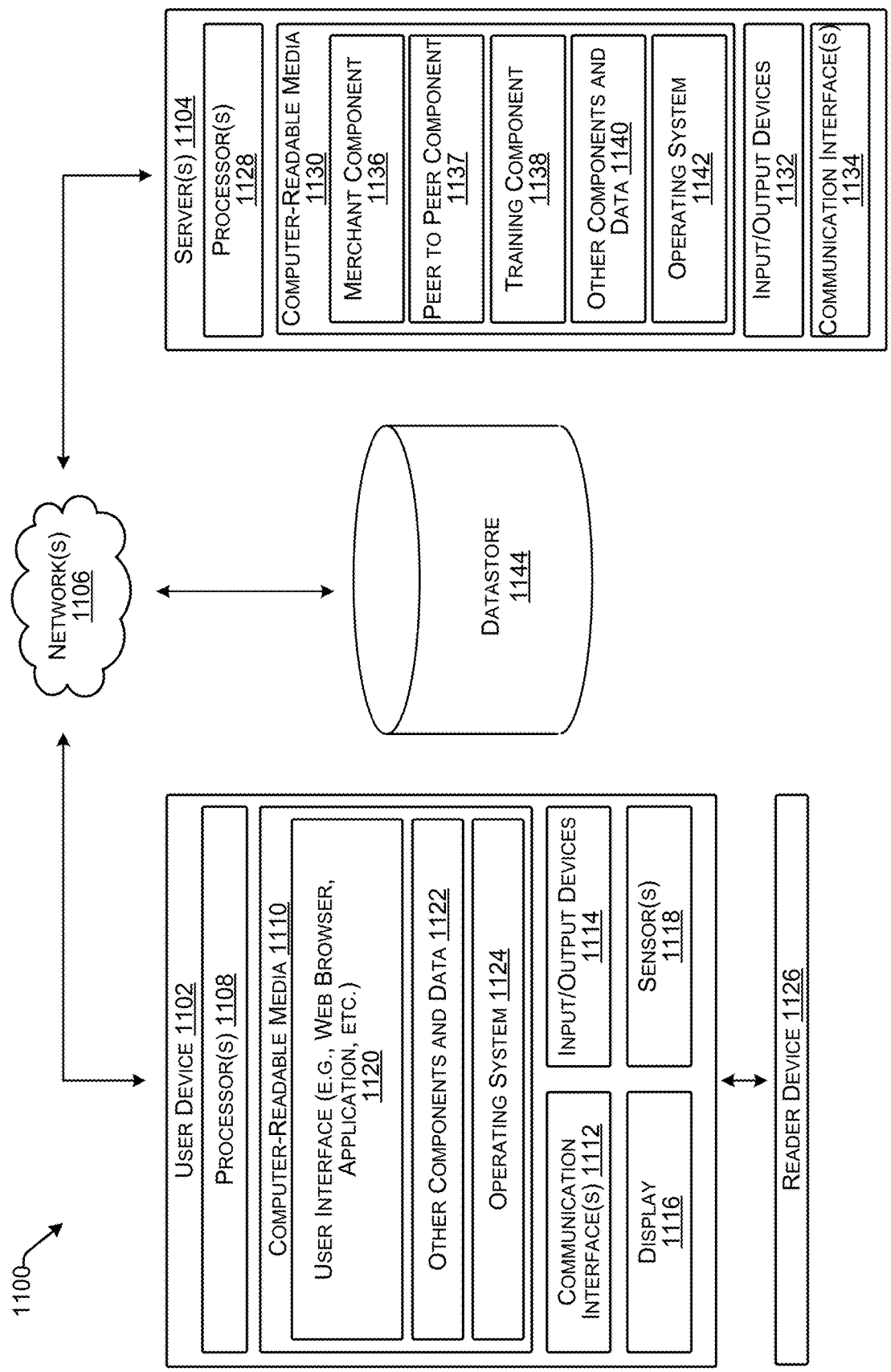
FIG. 11 is an illustrative block diagram illustrating a system for performing techniques described herein.

FIG. 11 depicts an illustrative block diagram illustrating a system 1100 for performing techniques described herein. The system 1100 includes a user device 1102 (e.g., customer device 103 or merchant device 105), that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 1. Further, it is understood that servers 1104 can include or provide the payment service 108.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 (e.g., as shown in FIGS. 5A-5I) to enable users to interact with the user device 1102, and thus the server(s) 1104 and/or other networked devices. In at least one example, the user interface 1120 can be presented via a web browser, or the like. In other examples, the user interface 1120 can be presented via an application, such as a mobile application or desktop application, which can be provided by a service provider associated with the server(s) 1104, or which can be an otherwise dedicated application. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

Depending on the type of the user device 1102, the computer-readable media 1110 can also optionally include other functional components and data, such as other components and data 1122, which can include programs, drivers, etc., and the data used or generated by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital information thereon. In at least one example, the display 1116 can be an augmented reality display, a virtually reality display, or any other display able to present and/or project digital information. In some examples, the display 1116 can have a touch sensor associated with the display 1116 to provide a touch-screen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 can include sensor(s) 1118. The sensor(s) 1118 can include a GPS device able to indicate location information. Further, the sensor(s) 1118 can include, but are not limited to, an accelerometer, gyroscope, compass, proximity sensor, camera, microphone, and/or a switch. Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126 (e.g., the reader device 164), for reading payment instruments and/or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 can include a read head for reading a magnetic strip of a payment card, and further can include encryption technology for encrypting the information read from the magnetic strip. Additionally or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1126 may also include a biometric sensor to receive and process biometric characteristics and process them as payment instruments, given that such biometric characteristics are registered with the payment service system 100 and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more components and/or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one component for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1112, which may provide a clock signal indicating a time. Furthermore, the reader chip may perform functionality to control the network interface, which may interface with the network(s) 1106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal (e.g., a merchant device), as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units, and can include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory and/or removable and non-removable media implemented in any type of technology for storage of information, such as computer-readable instructions, data structures, program components, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider and/or payment processing service. Functional components stored in the computer-readable media 1130 can optionally include a merchant component 1136, a peer-to-peer component 1137, a training component 1138, and one or more other components and data 1140.

The merchant component 1136 can be configured to receive transaction data from POS systems. The merchant component 1136 can transmit requests (e.g., authorization, capture, settlement, etc.) to payment service server computing device(s) to facilitate POS transactions between merchants and customers. The merchant component 1136 can communicate the successes or failures of the POS transactions to the POS systems.

The peer-to-peer component 1137 can be configured to receive transaction data associated with P2P transactions. The peer-to-peer component 1137 can transfer funds between user accounts to facilitate P2P transactions. The peer-to-peer component 1137 can communicate successes or failures of such P2P transactions to individual user devices.

The training component 1138 can be configured to train models using machine learning mechanisms. For example, a machine learning mechanism can analyze training data to train a data model that generates an output, which can be a recommendation, a score, and/or another indication. Machine learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine learning models can be stored in a datastore associated with the user device(s) 1102 and/or the server(s) 1104 for use at a time after the data models have been trained (e.g., at runtime).

The one or more other components and data 1140 can provide or include a transaction apportionment service and related data, as described herein. Further, the one or more other components and data 1140 can include programs, drivers, etc., and the data used or generated by the functional components. Further, the server(s) 1104 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1130 can additionally include an operating system 1142 for controlling and managing various functions of the server(s) 1104.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1102 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1144 that can be configured to store data that is accessible, manageable, and updatable. In some examples, the datastore 1144 can be integrated with the user device 1102 and/or the server(s) 1104. In other examples, as shown in FIG. 11, the datastore 1144 can be located remotely from the server(s) 1104 and can be accessible to the server(s) 1104. The datastore 1144 can comprise multiple databases and/or servers connected locally and/or remotely via the network(s) 1106.

In at least one example, the datastore 1144 (e.g., the data store 128) can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1144 can store additional or alternative types of data as described herein.

The foregoing description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on a non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, or information created during methods according to described examples include magnetic or optical disks, solid state memory devices, flash memory, USB devices provided with non-volatile memory, networked storage devices, and so on.

Devices implementing methods according to these disclosures can comprise hardware, firmware or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

What is claimed is:

1. A method, implemented at least in part by one or more computing devices of a payment service, comprising:
   receiving, through a communication interface of the one or more computing devices of the payment service, from a merchant device of a merchant, transaction data associated with a transaction, wherein the transaction is between the merchant and at least a first customer and a second customer;
   generating, by at least one processor of the one or more computing devices of the payment service, an interactive element based at least in part on the transaction data associated with the transaction involving the at least the first customer and the second customer;
   receiving, through the communication interface of the one or more computing devices of the payment service, data indicative of interactions with the interactive element on a first device of the first customer, the data being a request for at least a portion of the transaction data;
   in response to receiving the request for the at least the portion of the transaction data, sending a communication by the payment service through the communication interface to configure the first device of the first customer to display a record splitting interface that includes a listing of items from the at least the portion of the transaction data, the record splitting interface being interactive to enable selection of individual items from the listing of items for payment;
   updating, in real-time, the record splitting interface to indicate additional selection of one or more of the items on a second device of the second customer for payment, wherein updating the record splitting interface in real-time enables collaboration between the first customer and the second customer for apportioning the payment for the items and annotates each of the items as being selected by at least one of the first customer and the second customer for the payment, each of the individual items being selectable by more than one user;
   receiving, by the payment service, a selection of the individual items in the listing of items in the record splitting interface from the first device;
   apportioning, by the payment service, amounts for the individual items based on the selection of the individual items via the record splitting interface and the additional selection via the second device;
   based on the selection of the individual items in the listing of items in the record splitting interface, sending, through the communication interface of the one or more computing devices of the payment service and to the first device and the second device of the second customer, annotations showing the individual items in the listing of items selected by the first customer and the apportioned amounts for the individual items;
   receiving, by the communication interface of the one or more computing devices, from the first device a payment initiation request to initiate payment for the apportioned amounts; and
   initiating payments for the apportioned amounts, by the communication interface of the one or more computing devices, using respective funds associated with respective accounts of the first customer and the second customer.

2. The method of claim 1, wherein the listing of items is determined based on context data associated with the first customer or the second customer.

3. The method of claim 1, wherein the interactive element is associated with the record, the record comprising one or more of an order, a bill, a receipt, or a user interface associated with the transaction presented via the merchant device.

4. A method, implemented at least in part by at least one processor of one or more computing devices of a payment service, comprising:
   receiving, through a communication interface of the one or more computing devices of the payment service, from a merchant device of a merchant, transaction data associated with a transaction, wherein the transaction is between the merchant and a plurality of customers;
   generating, by the at least one processor of the one or more computing devices of the payment service, an interactive element for a record associated with the transaction;
   receiving, through the communication interface of the one or more computing devices of the payment service, a first request for at least a portion of the transaction data from a first device of a first customer of the plurality of customers;
   in response to receiving the first request for the at least the portion of the transaction data, sending a communication by the payment service through the communication interface to configure the first device of the first customer to display a record splitting interface that includes items associated with at least the portion of the transaction data;
   updating, in real-time, the record splitting interface to indicate additional selection of one or more of the items on a second device of a second customer for payment, wherein updating the record splitting interface in real-time enables collaboration between the first customer and the second customer for apportioning the payment for the items and annotates each of the items as being selected by at least one of the first customer and the second customer for the payment, each of the items being selectable by more than one user;

apportioning, by the payment service, amounts for the items via the record splitting interface based on at least the additional selection;

sending, through the communication interface of the one or more computing devices of the payment service, real-time annotations to the first device and the second device showing corresponding selection of at least the items and the apportioned amounts of the items;

receiving, by the communication interface of the one or more computing devices, from the first device, a request to initiate a payment for at least a first individual item represented in the at least the portion of the transaction data selected by at least one of the first customer or the second customer; and initiating the payment for an amount of the at least the first individual item using funds associated with an account of the first customer, wherein a remaining balance associated with one or more remaining items, including the apportioned amount of the individual item selected by the second customer, associated with the transaction is payable by at least the second customer of the plurality of customers.

5. The method of claim 4, further comprising:

determining a listing of the items based at least in part on the transaction data associated with the transaction, wherein the listing of items comprises items ordered by the plurality of customers in the transaction.

6. The method of claim 4, further comprising:

generating a data structure associated with the transaction, wherein the data structure stores the transaction data associated with the transaction, and wherein the record is generated based on the transaction data and comprises one or more of an order, a bill, a receipt, or a user interface associated with the transaction.

7. The method of claim 5, wherein a portion of the listing of items comprises a subset of items ordered by the plurality of customers in the transaction, and wherein the portion of the listing of items is specific to the first customer, the method further comprising:

determining context data associated with the first customer, wherein the context data relates to one or more of prior transactions for the first customer, a location of the first customer, or a time of day; and determining, using a machine learning model using the context data as an input, the portion of the listing of items based at least in part on the context data.

8. The method of claim 4, wherein the interactive element comprises a quick response (QR) code or a barcode.

9. The method of claim 4, further comprising:

receiving a second request for at least a portion of the transaction data, the second request is from a second device that is associated with the second customer;

in response to receiving the second request, causing the record splitting interface to be presented on the second device including at least a second portion of the transaction data;

receiving a selection of the at least the individual item selected by the second customer from at least the second portion of the transaction data by the second customer;

receiving, from the second device of the second customer, a request to initiate a payment for the at least the individual item selected by the second customer; and initiating the payment for an amount of the at least the individual item selected by the second customer using funds associated with an account of the second customer.

10. The method of claim 9, further comprising:

determining that the at least the first individual item and the at least the individual item selected by the second customer is a common item;

determining that a cost of the common item is to be shared by the first customer and the second customer; and determining the amount of the at least the first item and the amount of the at least the second item based on the shared cost of the at least one item in common.

11. The method of claim 9, wherein:

the at least the portion of the transaction data comprises one or more annotations identifying the at least the first individual item as having been selected for payment by the first customer, and the at least the individual item selected by the second customer is specific to the second customer.

12. The method of claim 5, further comprising:

determining that at least one item from the listing of transaction items has not been selected for payment by any customer from the plurality of customers; and distributing a cost of at least one item from the listing of transaction items that has not been selected among the plurality of customers, wherein initiating the payment for the amount of the one or more first items using funds associated with the account of the first customer comprises updating the payment amount based on the distributed cost of the at least one item that has not been selected.

13. A payment system configured to process transactions, the payment system comprising:

at least one processor; and non-transitory processor executable instructions including instructions stored thereon, the instructions configure the payment system to:

receive, from a merchant device of a merchant, transaction data associated with a transaction, wherein the transaction is between the merchant and a plurality of customers;

generate an interactive element for a record associated with the transaction;

receive a first request for at least a portion of the transaction data from a first device of a first customer of the plurality of customers;

in response to receiving the first request for the at least the portion of the transaction data configure the first device of the first customer to display a record splitting interface that includes items associated with at least the portion of the transaction data;

update, in real-time, the record splitting interface to indicate additional selection of one or more of the items on a second device of a second customer for payment, wherein updating the record splitting interface in real-time enables collaboration between the first customer and the second customer for apportioning the payment for the items and annotates each of the items as being selected by at least one of the first customer and the second customer for the payment, each of the items being selectable by more than one user;

apportion amounts for the items via the record splitting interface based on at least the additional selection;

send, through a communication interface of one or more computing devices of the payment system, real-time annotations to the first device and the second device showing corresponding selection of at least the items and the apportioned amounts of the items;

receive, from the first device, a request to initiate a payment for at least a first individual item represented in the at least the portion of the transaction data selected by at least one of the first customer or the second customer; and initiate the payment for an amount of the at least the first individual item using funds associated with an account of the first customer, wherein a remaining balance associated with one or more remaining items, including the apportioned amount of the individual item selected by the second customer, associated with the transaction is payable by at least the second customer of the plurality of customers.

14. The payment system of claim 13, wherein the payment system is further configured to determine a listing of the items based at least in part on the transaction data associated with the transaction, wherein the listing of items comprises items ordered by the plurality of customers in the transaction.

15. The payment system of claim 13, wherein the payment system is further configured to:
generate a data structure associated with the transaction;
wherein the data structure stores the transaction data associated with the transaction, and wherein the record is generated based on the transaction data and comprises one or more of an order, a bill, a receipt, or a user interface associated with the transaction.

16. The payment system of claim 14, wherein the listing of items comprises each item ordered by the plurality of customers in the transaction.

17. The payment system of claim 14, wherein the portion of the listing of items comprises a subset of items ordered by the plurality of customers in the transaction, and wherein the portion of the listing of items is specific to the first customer, and wherein the payment system is further configured to:
determine context data associated with the first customer, wherein the context data relates to one or more of prior transactions for the first customer, a location of the first customer, or a time of day; and
determine, using a machine learning model using the context data as an input, the portion of the listing of items based at least in part on the context data.

18. The payment system of claim 13, wherein the interactive element comprises at least one of a quick response (QR) code or a barcode.

19. The method of claim 4, further comprising:
wherein the record splitting interface enables the first customer to select individual items from the at least the portion of a listing of the items associated with the transaction for payment.

* * * * *